US010858545B2

(12) United States Patent
Halahmi et al.

(10) Patent No.: US 10,858,545 B2
(45) Date of Patent: Dec. 8, 2020

(54) SHRINK WRAP LABELS FOR SHAPED ARTICLES

(71) Applicant: Polysack Flexible Packaging Ltd., D.N. Negev (IL)

(72) Inventors: Izhar Halahmi, Hod Hasharon (IL); Nitai Alush-aben, Beit Yitzhak (IL)

(73) Assignee: Polysack Flexible Packaging Ltd., D.N. Negev (IL)

( * ) Notice: Subject to any disclaimer, the term of this patent is extended or adjusted under 35 U.S.C. 154(b) by 0 days.

(21) Appl. No.: 16/569,699

(22) Filed: Sep. 13, 2019

(65) Prior Publication Data
US 2020/0087540 A1  Mar. 19, 2020

Related U.S. Application Data

(60) Provisional application No. 62/731,756, filed on Sep. 14, 2018.

(51) Int. Cl.
| C08F 2/46 | (2006.01) |
| C08G 61/04 | (2006.01) |
| C09J 4/06 | (2006.01) |
| C09J 7/29 | (2018.01) |
| C09J 7/30 | (2018.01) |
| C09J 5/06 | (2006.01) |
| B29C 65/00 | (2006.01) |
| B29C 65/02 | (2006.01) |
| B65C 3/16 | (2006.01) |

(52) U.S. Cl.
CPC ............... *C09J 4/06* (2013.01); *B29C 65/02* (2013.01); *B29C 66/73715* (2013.01); *B65C 3/166* (2013.01); *C09J 5/06* (2013.01); *C09J 7/29* (2018.01); *C09J 7/30* (2018.01); *C09J 2203/334* (2013.01); *C09J 2205/31* (2013.01); *C09J 2423/006* (2013.01); *C09J 2425/006* (2013.01); *C09J 2427/006* (2013.01); *C09J 2433/00* (2013.01); *C09J 2467/006* (2013.01)

(58) Field of Classification Search
CPC ............... C08F 2/50; C08F 2/46; C08G 61/04
USPC .................................................. 522/1; 520/1
See application file for complete search history.

(56) References Cited

U.S. PATENT DOCUMENTS

| 423,557 | A | 3/1890 | Hahn |
| 3,718,712 | A | 2/1973 | Tushaus |
| 3,978,274 | A | 8/1976 | Blum |
| 5,489,454 | A | 2/1996 | Peiffer et al. |
| 6,649,259 | B1 | 11/2003 | Hu et al. |
| 7,935,401 | B2 | 5/2011 | Opuszko et al. |
| 9,234,108 | B1 | 1/2016 | Sloan |
| 2004/0200566 | A1 | 10/2004 | Bellafore et al. |
| 2004/0204524 | A1 | 10/2004 | Baumgart et al. |
| 2006/0228481 | A1* | 10/2006 | Gros ..................... C08F 251/02 427/299 |
| 2008/0023131 | A1* | 1/2008 | Pressley ................ C08F 4/40 156/273.7 |
| 2015/0322307 | A1 | 11/2015 | Masuko et al. |
| 2015/0375450 | A1 | 12/2015 | Pedercini et al. |
| 2016/0152010 | A1 | 6/2016 | Mitchell et al. |
| 2016/0326387 | A1 | 11/2016 | Arita |
| 2017/0283116 | A1 | 10/2017 | Mitchell et al. |
| 2018/0018906 | A1 | 1/2018 | Dellevigne |
| 2020/0087540 | A1 | 3/2020 | Halahmi |

FOREIGN PATENT DOCUMENTS

| EP | 0229910 A2 | 7/1987 |
| EP | 0525729 | 2/1993 |
| EP | 1468924 | 10/2004 |
| EP | 1640275 | 3/2006 |
| EP | 1908691 | 4/2008 |
| EP | 2269911 | 1/2011 |
| WO | WO 2002/067758 A1 | 9/2002 |
| WO | WO 2007/015244 A1 | 2/2007 |
| WO | WO 2007/015245 A2 | 2/2007 |
| WO | WO 2018/187203 A1 | 10/2018 |

OTHER PUBLICATIONS

Reynolds, Campbell goes for product visibility, Package Case Study, Apr. 4, 2016, pp. 1-4, Packaging World, http://www.packworld.com/print/63414.
Klockner, Comparative Analysis of Polymer Roll-Fed Shrink-Label Substrates, 2015, pp. 1-10, Klockner Pentaplast Group, Gordonsville, USA.
Gartz, et al., Sleeve Films—TD or MD orienting process, Apr. 2010, Bruckner Maschinenbau.
International Search Report for PCT Application No. PCT/IB2019/000998 dated Feb. 12, 2020.
Nase, M., et al, "Adhesive properties of heat-sealed EVAc/PE films in dependence on recipe, processing, and sealing parameters", Journal of Adhesion Science and Technology, 2014, vol. 28, No. 12, pp. 1149-1166.
Vandenburg, HJ, Et Al., "A simple solvent selection method for accelerated solvent extraction of additives from polymers", The Analyst., 1999, vol. 124, pp. 707-1720.

* cited by examiner

Primary Examiner — Jessica Whiteley
(74) Attorney, Agent, or Firm — Fay Sharpe LLP

(57) ABSTRACT

Methods for applying high shrink wrap labels to a shaped article are disclosed. The leading edge of the label is bonded to the article. A seaming agent is applied, and the label is wrapped around the article. The seaming agent is then exposed to radiation to cure the seaming agent, and the label is then exposed to heat to cause heat-shrinking. The label is made of a film with at least one external layer that has a Hildebrand solubility parameter. The seaming agent includes a component having a Hildebrand solubility parameter that is within 2.2 $MPa^{1/2}$ or within 4.4 $calories^{1/2} \cdot cm^{-3/2}$ of the Hildebrand solubility parameter of the external layer of the film. The seaming agent also has a viscosity of at least 1 centipoise and less than 1000 centipoise when measured at any temperature between ambient temperature and 60° C. Articles including such affixed high shrink wrap labels are also disclosed.

22 Claims, 15 Drawing Sheets

400

SHRINK WRAP LABELS FOR SHAPED ARTICLES

CROSS-REFERENCE TO RELATED APPLICATIONS

This application claims priority to U.S. Provisional Patent Application Ser. No. 62/731,756, filed on Sep. 14, 2018, which is incorporated by reference in its entirety.

BACKGROUND

The present disclosure relates to shrink wrap labels for shaped articles. Also included are methods for fixing the shrink wrap labels to shaped articles, such as to containers of various sizes and configurations. Various seaming agents (i.e. adhesive compositions) and systems for performing such methods are also provided. Additionally disclosed are containers or other articles comprising such heat-shrink labels.

Multiple methods are known in the art for affixing a shrink film label to an article such as a container. Generally, the shrink film label is made in the form of a cylindrical sleeve around a mandrel. The container is then inserted into the sleeve (or vice versa) and subsequently exposed to heat, which causes the sleeve to shrink and fit tightly against the container. Additional methods which can increase the speed, safety, environmental impact and quality of shrink labeling processes are desired.

BRIEF DESCRIPTION

Disclosed herein are methods for labeling shaped articles (such as containers) using high shrink wrap labels. These methods apply the label directly to the article from a supply or film roll, and do not require the intermediate step of forming a sleeve on a mandrel or forming a long tube and cutting the tube into sleeves. This increases speed and reduces capital costs, as well as improving safety and reducing environmental impact. A label film is wrapped around an article and the edges are welded together without the need to apply external pressure on the seam, using a liquid seaming agent. The label film and at least one component of the seaming agent have very similar Hildebrand solubility parameters, as described further within.

Disclosed in various embodiments are methods for applying a high shrink wrap label directly from a supply or film roll to a shaped article, comprising: providing a high shrink wrap label having a leading edge and a trailing edge; bonding the leading edge of the high shrink wrap label to the shaped article (pick up); applying a seaming agent to the leading edge of the high shrink wrap label or the trailing edge of the high shrink wrap label; and wrapping the high shrink wrap label around the shaped article until the trailing edge overlaps the leading edge. In the overlapping area, the seaming agent swells the film and flows along the seam in such a manner as to close the unsupported areas of the seam, like a zipper. This flow, together with swelling, creates a suction force (due to diffusion of monomers and/or solvent from the seaming agent into the label film, causing a negative internal pressure inside the seam). The result is the attraction of the leading and trailing edges towards each other, without any external forces (zipper mechanism).

Continuing, the methods include exposing the seam to radiation (to initiate photo-induced polymerization and/or cross-linking of the seaming agent and the swollen film); and heat-shrinking the high shrink wrap label. The high shrink wrap label is made of a single-layer film or a multi-layer film having at least one external layer with a Hildebrand solubility parameter. The seaming agent includes at least one component having a Hildebrand solubility parameter that is within 2.2 $MPa^{1/2}$ or within 4.4 $calories^{1/2} \cdot cm^{-3/2}$ of the Hildebrand solubility parameter of the film or the external layer of the multi-layer film. The seaming agent also has a viscosity of at least 1 centipoise and up to about 1000 centipoise (cPs) when measured at a temperature between ambient temperature and about 60° C. The component of the seaming agent having the aforementioned Hildebrand solubility parameter can be a monomer and/or solvent. This component is usually a molecule that is small enough to diffuse into the external layer of the film, and swell the layer within about 0.5 seconds, preferably within about 0.2 seconds, or even within about 0.06 seconds.

The seam may have an immediate welding strength (IWS) of at least 2 grams within a delta time period of about 0.5 seconds or less, preferably about 0.2 seconds or less, or even about 0.1 seconds or less, when measured on a seam area of 250 $mm^2$ of the associated film, as described further herein. Usually, seams having an IWS of about 4 grams or greater (so they do not open when loaded by 4 grams) at a delta time period of about 0.2 seconds or less (or about 0.1 seconds or less, and even about 0.06 seconds or less) will have a seam quality of at least 3, while those having between 2-4 grams IWS will have a seam quality of at least 2, and those having less than 2 grams IWS will open in a manner not acceptable in the commercial marketplace.

The radiation may be any radiation range that has at least one peak wavelength in the range of about 300 nm to about 500 nm. Such radiation can be broad band (e.g. mercury lamp) or narrow band (e.g. LED). The seam may be exposed to radiation at an average power density of at least 0.2 $W/cm^2$ as measured on the surface of the shaped article. The power density can be measured, for example, using a radiometer such as the LEDCure™ radiometer offered by EIT within any combination of the four response bands available (340-392 nm, 360-412 nm, 370-422 nm, or 380-432 nm). The seam may be exposed to radiation for a time period of about 0.05 seconds to about 5 seconds, preferably about 0.5 seconds to about 3 seconds. The combination of power density and exposure time should provide an exposure of about 0.5 $W \cdot sec/cm^2$ to about 4 $W \cdot sec/cm^2$.

The leading edge of the high shrink wrap label may be bonded to the shaped container using a hot melt adhesive, a pressure-sensitive adhesive, or a radiation-curable adhesive (pick up, to allow initiation of wrapping around process).

The seaming agent used herein preferably has a viscosity of at least 1 centipoise (cP), including at least 5 cP, or from about 10 centipoise (cP) to about 1000 cP, or from about 5 cP to about 300 cP, or from about 10 cP to about 450 cP, or from about 10 cP to about 250 cP when measured at ambient temperature or any temperature up to about 60° C. If the viscosity is greater than about 1000 cP, the seaming agent may have difficulty in completing the seaming action before the label is presented for radiation curing. If the viscosity is too low, the diffusion of monomer and/or solvent into the label film may proceed too quickly, and the label film may lose its transparency in the seam area or may rupture or may suffer holes. This is not acceptable in the commercial marketplace.

The heat-shrinking may be performed by steam shrink or by hot air shrink, or more generally by any method which can cause the label to shrink onto the article within a few seconds (typically between 5 to 15 seconds). The heat-shrinking may occur at a temperature of about 80° C. or greater, or about 95° C. or greater, or from about 95° C. to about 125° C. The high shrink wrap label may shrink by about 25% to about 75%.

A typical seam has a width of about 3 mm to about 10 mm. The seaming agent may be applied in an amount of about 0.2 milligrams (mg) to about 5 mg per square centimeter of seam area, including from about 0.3 mg to about 4 mg, or most preferably about 0.4 mg to about 2 mg per square centimeter of seam area. The seaming agent may be applied by spraying, drop-on-demand jetting, ink jetting, stamping, transfer from a rotating roller or rod, stamping, brushing, injecting from nozzle or needle, or ultrasonic spraying.

In some particular embodiments, the seaming agent may comprise: from about 20 wt % to about 99 wt % of an acrylic or methacrylic acid ester or amide or carbamate monomer having a molecular weight lower than 300 daltons (Da) and having good compatibility with the label film; 0 to about 75 wt % of an acrylic or methacrylic acid ester or amide or carbamate or any other oligomer or polymer having a molecular weight greater than 300 daltons (Da) and having good compatibility with the monomer; a photoinitiator; 0 to about 40 wt % of a tackifying agent or polymer; 0 to about 50 wt % of an organic solvent; and optionally an adhesion promoter.

The acrylic or methacrylic acid ester or amide or carbamate monomer with a molecular weight of less than 300 Da desirably has a Hildebrand solubility parameter that matches an external layer of the label film, i.e. is ±2.2 MPa$^{1/2}$ of the Hildebrand solubility parameter of the external layer. This means the monomer is very likely to be able to swell and dissolve the label film within a period of about 0.5 seconds or less, more desirably about 0.2 seconds or less, and even about 0.06 seconds or less, at a temperature of about 23° C. to about 60° C. to allow welding to obtain a seam with a seam quality of 2, 3, or 4.

The acrylic or methacrylic acid ester or amide or carbamate oligomer or other oligomer or polymer with a molecular weight of greater than 300 Da and having good compatibility with the monomer serves multiple purposes. This kind of compound can slow the diffusion of the lower-weight monomers (<300 Da) and/or the solvent, so the risk of film loss of clarity and rupture is minimized. Usually. higher molecular weight oligomers have higher functionality (more than one active group per molecule) and thus improved cross-link density, as well as curing speed. The improved cross-link density improves the ability of the cross linked seam to withstand shrink forces at elevated temperatures, including steam. This family of compounds increases the cross linking density, so that unwanted migration of monomer residues into the shaped article from cross linked seam is minimized. Finally, these higher-molecular weight oligomers improve the curing speed, allowing high production speeds with lower radiation power consumption.

The tackifying agent, a non-reactive oligomer, can also slow the diffusion of the lower-weight monomer (<300 Da) and/or the solvent, so the risk of film loss of clarity and rupture is minimized. The tackifying agent also improves the flexibility of the seam because it is not reactive and lowers cross-link density without increasing monomer or solvent content, and so functions as a solid plasticizer. This avoids cracking during high shrinkage. The tackifying agent also reduces the content of low molecular weight ingredients in the seaming agent, which are undesirable since they can more easily migrate from the label into the shaped article.

The organic solvent, like the monomer, has a Hildebrand solubility parameter that matches an external layer of the label film, i.e. is ±2.2 MPa$^{1/2}$ of the Hildebrand solubility parameter of the external layer. This means the solvent is very likely to be able to swell and dissolve the high-shrink label film within a period of about 0.5 seconds or less, more desirably about 0.2 seconds or less, and even about 0.06 seconds or less, at a temperature of about 23° C. to about 60° C. to allow welding to obtain a seam with a seam quality of 2, 3, or 4. The organic solvent can improve penetration of the seaming agent ingredients into the external layer of the label film, causing swelling and development of immediate welding strength if the low-molecular weight monomer is unable to do so within 0.5 seconds. The photoinitiator induces polymerization and cross-linking of the seaming agent upon exposure to radiation.

Specific compositions are contemplated for the seaming agent, depending on the material of which the high shrink wrap label is made. For example, the high shrink wrap label may comprise a polyolefin. Polyolefins typical to high shrink labels include cyclic olefin copolymers (COC) and cyclic olefin polymers (COP), including films having multiple layers of polyolefins, and/or a layer that is made of a blend of COC/COP with another polyolefin such as polyethylene, polypropylene, and copolymers thereof.

In particular embodiments for polyolefin high shrink label films, the seaming agent may comprise (A) an acrylic or methacrylic acid ester or amide or carbamate containing a cyclic hydrocarbon group (such as isobornyl acrylate), (B) an acrylic or methacrylic acid ester or amide or carbamate containing a hydrocarbon group having a maximum of 20 carbon atoms (such as hexyl acrylate or ethyl hexyl acrylate, lauryl acrylate, stearyl acrylate, or 4-tert-butylcyclohexyl acrylate), or (C) an acrylic or methacrylic acid ester or amide or carbamate containing an aromatic hydrocarbon or heterocyclic group having a maximum of 20 carbon atoms (such as perillyl alcohol ester with acrylic or methacrylic acid). More desirably, the hydrocarbon or heterocyclic groups have a maximum of 15 carbon atoms. These molecules are monomers having a molecular weight of less than 300 Da and good compatibility with the label film, so as to be able to swell and dissolve the label film. Desirably, these monomers dissolve the label film within a period of about 0.5 seconds or less, or about 0.2 seconds or less, or about 0.1 seconds or less, or about 0.06 seconds or less.

In other embodiments, the shrink wrap label film may comprise at least one outer layer that comprises a cyclic olefin polymer (COP) or a cyclic olefin copolymer (COC) or a blend of COC or COP with another polyolefin. For such labels, the seaming agent may comprise a monomer selected from the group consisting of (A) isobornyl acrylate, (B) isobornyl methacrylate, (C) cyclohexyl acrylate, (D) ethyl hexyl acrylate, (E) ethyl hexyl methacrylate, (F) tert-butyl cyclohexyl acrylate, (G) trimethyl cyclohexyl acrylate, (H) alkyl acrylates, (I) alkyl methacrylates, (J) tricyclodecanedimethanol acrylate, (K) styrene, (L) vinyltoluene, (M) benzyl acrylate, (N) lauryl acrylate, (O) isodecyl acrylate, (P) phenoxy benzyl acrylate, (Q) ethoxylated aryl acrylate, (R) alkylated phenyl acrylate, and (S) phenyl acrylate. These monomers have a molecular weight lower than 300 daltons (Da) and good compatibility with the label film so as to be able to swell and dissolve the label film. Desirably, these monomers dissolve the label film within a period of about 0.5 seconds or less, or about 0.2 seconds or less, or about 0.1 seconds or less, or about 0.06 seconds or less.

Continuing, when the shrink wrap label comprises a cyclic olefin polymer (COP) or a cyclic olefin copolymer (COC), the seaming agent may additionally comprise an oligomer or polymer selected from the group consisting of (A) urethane acrylate, (B) urethane methacrylate, (C) acrylic or methacrylic esters of glycols or diols or polyhydric alcohols, (D) acrylic or methacrylic esters of alkoxylated diols or polyols or polyhydric alcohols, (E) oligomers of acrylic or methacrylic esters, (F) polyvinylbutyral, (G) hydrocarbon resins, (H) polyterpenes, (I) rosin derivatives, (J) polyesters, (K) polystyrene, (L) styrene homopolymers, copolymers, terpolymers and block co-polymers, (M) epoxy acrylates, (N) epoxy methacrylates, (O) phenoxy resins, (P) acrylated or methacrylated dendritic alcohols, (Q) ethoxylated diglycidyl ether of bisphenol A diacrylate; (R) polyacrylates of hyperbranched alcohols; (S) blends of urethane acrylate and monomer, such as Genomer 4188/EHA; and (T) blends of inert resin and monomer such as Genomer 6043/M22.

The seaming agent may also comprise a solvent selected from the group consisting of a linear or cyclic or aromatic hydrocarbon having a maximum of 20 carbon atoms (such as limonene, pinene, hexane, heptane, cyclohexane, decane, pentane, alkyl cyclohexane, or decalin, xylene, or toluene); a terpene alcohol; an alkyl ester; an alkyl amide; turpentines; isoparaffins; and paraffins. These solvents have a molecular weight lower than 300 daltons (Da) and good compatibility with the label film. Desirably, these monomers dissolve the label film within a period of about 0.5 seconds or less, or about 0.2 seconds or less, or about 0.1 seconds or less, or about 0.06 seconds or less.

In other specific embodiments for COP or COC films, the seaming agent may comprise: from about 25 wt % to about 98 wt % of a monomer having a molecular weight lower than 300 daltons (Da) and having good compatibility with the label film; from 0 to about 50 wt % of an oligomer or polymer; 0 to about 50 wt % of an organic solvent having good compatibility with the label film; and from about 0.5 wt % to about 15 wt % of a photoinitiator. Seams made with seaming agents according to these specific embodiments will have a seam quality of 2, 3, or 4 (as defined further herein). Desirably, the monomers and/or solvents dissolve the label film within a period of about 0.5 seconds or less, or about 0.2 seconds or less, or about 0.1 seconds or less, or about 0.06 seconds or less.

In further specific embodiments for COP or COC films, when the shrink wrap label shrinks more than 25% and less than 75%, the seaming agent may comprise: from about 20 wt % to about 98 wt % of a monomer having a molecular weight lower than 300 daltons (Da) and having good compatibility with the label film; from 0 to about 45 wt % of an oligomer or polymer; from 0 wt % to about 30 wt % of an organic solvent having good compatibility with the label film; from about 1 wt % to about 15 wt % of a photoinitiator; and from 0 wt % to about 20 wt % of a tackifying agent. Seams made with seaming agents according to these specific embodiments will have a seam quality of 2, 3, or 4 (as defined further herein). Desirably, the monomers and/or solvents dissolve the label film within a period of about 0.5 seconds or less, or about 0.2 seconds or less, or about 0.1 seconds or less, or about 0.06 seconds or less.

In further specific embodiments for COP or COC films, when the shrink wrap label shrinks more than 25% and less than 50%, the seaming agent may comprise: from about 20 wt % to about 98 wt % of a monomer having a molecular weight lower than 300 daltons (Da) and having good compatibility with the label film; from 0 to about 45 wt % of an oligomer or polymer; from 0 wt % to about 25 wt % of an organic solvent having good compatibility with the label film; from about 1 wt % to about 15 wt % of a photoinitiator; and from 0 wt % to about 20 wt % of a tackifying agent. Seams made with seaming agents according to these specific embodiments will have a seam quality of 2, 3, or 4 (as defined further herein). Desirably, the monomers and/or solvents dissolve the label film within a period of about 0.5 seconds or less, or about 0.2 seconds or less, or about 0.1 seconds or less, or about 0.06 seconds or less.

In further specific embodiments for COP or COC films, when the shrink wrap label shrinks more than 25% and less than 40%, the seaming agent may comprise: from about 20 wt % to about 98 wt % of a monomer having a molecular weight lower than 300 daltons (Da) and having good compatibility with the label film; from 0 to about 45 wt % of an oligomer or polymer; from 0 wt % to about 15 wt % of an organic solvent having good compatibility with the label film; from about 1 wt % to about 15 wt % of a photoinitiator; and from 0 wt % to about 20 wt % of a tackifying agent. Seams made with seaming agents according to these specific embodiments will have a seam quality of 2, 3, or 4 (as defined further herein). Desirably, the monomers and/or solvents dissolve the label film within a period of about 0.5 seconds or less, or about 0.2 seconds or less, or about 0.1 seconds or less, or about 0.06 seconds or less.

In other embodiments, the shrink wrap label may be a single-layer film or a multi-layer film having at least one external layer comprising PS, PETG, or PVC. PS is an abbreviation for a group of polymers that includes polystyrene, styrene copolymers and terpolymers, styrene block copolymers, and blends of polystyrene with other polymers. PETG is an abbreviation for polyethylene terephthalate glycol-modified, and PVC is an abbreviation for polyvinyl chloride.

For such shrink wrap labels made of PS, PETG, or PVC, the seaming agent may comprise a monomer that is an acrylic or methacrylic ester, amide, or carbamate having (a) a cyclic ether containing group, such as tetrahydrofurfuryl or 5-ethyl-1,3-dioxane-5-methanol or dioxane; or (b) an alkoxylated (e.g. ethoxylated or propoxylated) aromatic or aliphatic or cycloaliphatic group, such as alkoxylated phenyl acrylate or ethoxylated trimethylol propane triacrylate. The seaming agent can alternatively, or additionally, comprise a monomer that is (c) a monoacrylate or diacrylate or triacrylate or polyacrylate or methacrylate of an alkyl diol or polyol, such as hexanediol diacrylate, butanediol diacrylate, or trimethylolpropane triacrylate; (d) a vinyl lactam; (e) an acrylamide or methacrylamide; (f) vinyl pyrrolidone or a similar nitrogen heterocyclic unsaturated monomer; (g) a vinyl morpholine; (h) a lactone or lactam having an acrylate, methacrylate, or vinyl group; (i) a phenyl or alkyl phenol acrylate or methacrylate; (j) an ethoxylated or propoxylated phenyl or alkyl phenol acrylate or methacrylate; or (k) a mono- or di- or tri-hydroxyl acid acrylate or methacrylate; (l) an urethane acrylate or methacrylate; (m) an allyl ether; (n) a vinyl ester; (o) a mono-, di-, tri-, tetra-, or poly-acrylate or -methacrylate of a polyhydric alcohol, including an ethoxylated or propoxylated polyhydric alcohol; or (p) 2-(2-ethoxyethoxy)ethyl acrylate (EOEOEA). Examples of such monomers are: tetrahydrofurfuryl acrylate (THFA) or caprolactone-modified THFA, cyclic trimethylolpropane formal acrylate (CTFA), isobornyl acrylate, isobornyl methacrylate, alkoxylated phenol acrylate such as phenol (EO)4 acrylate or ethoxylated phenoxy ethyl acrylate, hexanediol diacrylate, butanediol diacrylate, butanediol dimethacrylates, alkoxylated aliphatic or cycloaliphatic diol diacrylate or dimethacrylate such as 1,6-Hexanediol $(EO)_n$ Diacrylate, tricyclodecanedimethanol diacrylate (TCDDA), ethoxylated cyclohexane dimethanol diacrylate (EO-CHMDA), hydroxy pivalic acid neopentyl glycol diacrylate or caprolactone-modified hydroxy pivalic acid neopentyl glycol diacrylate, hydroxypivalyl pivalate diacrylate (HPPDA), and caprolactone acrylate. These monomers have a molecular weight lower than 300 daltons (Da) and good compatibility with the label film so as to be able to swell and dissolve the label film within a period of about 0.5 seconds or less, or about 0.2 seconds or less, or about 0.1 seconds or less, or about 0.06 seconds or less.

Continuing, for shrink wrap labels comprising PS, PETG, or PVC, the seaming agent may comprise an oligomer or polymer selected from the group consisting of (A) urethane acrylate, (B) urethane methacrylate, (C) acrylic or methacrylic esters of glycols or diols or polyhydric alcohols (such as glycerol triacrylate, trimethylol propane triacrylate, dipentaerythritol hexaacrylate, caprolactone-modified dipentaerythritol hexaacrylate, pentaerythritol tetraacrylate, di(trimethylolpropane) tetraacrylate, dipentaerythritol pentaacrylate, polyacrylate of dendritic alcohol, or propoxylated glycerol triacrylate), (D) acrylic or methacrylic esters of alkoxylated diols or polyols or polyhydric alcohols, (E) oligomers of acrylic esters, (F) polyvinylbutyral, (G) hydrocarbon resins, (H) polyterpenes, (I) rosin derivatives, (J) polyesters, (K) epoxy resins; (L) epoxy acrylates, (M) epoxy methacrylates, (N) phenoxy resins, (O) a resin containing a diglycidyl ether of bisphenol-A, (P) polystyrene, (Q) styrene block copolymers or terpolymers, (R) terpene phenols, (S) polyester acrylates or methacrylates, (T) polyurethane, (U) polyesteramide, (V) oligomers of acrylic or methacrylic acids or esters or amides (including copolymers and terpolymers thereof), and (W) homopolymers, copolymers, terpolymers, or block copolymers of an acrylic acid ester or methacrylic ester; (X) ethoxylated diglycidyl ether of bisphenol A diacrylate; (Y) polyacrylates of hyperbranched alcohols; (Z) blends of urethane acrylate and monomer, such as Genomer 4188/EHA; and (AA) blends of inert resin and monomer such as Genomer 6043/M22.

In additional embodiments, for shrink wrap labels containing PS, PETG, or PVC, the seaming agent may comprise a solvent selected from the group consisting of ethers, cyclic ethers, esters, amides, glycol ethers, ketones, aromatics, halogenated alcohols, and halogenated hydrocarbons. Examples of suitable solvents are tetrahydrofuran (THF), toluene, acetone, methyl ethyl ketone, diethyl ether, dioxane, halogenated ketones, ethyl acetate, hydroxyacetone, and acetonitrile. These solvents have a molecular weight lower than 300 daltons (Da) and good compatibility with the label film so as to be able to swell and dissolve the label film within a period of about 0.5 seconds or less, or about 0.2 seconds or less, or about 0.1 seconds or less, or about 0.06 seconds or less to obtain a seam with a seam quality of 2, 3, or 4.

In more particular embodiments, for high shrink wrap labels comprising PS, PETG, or PVC, the seaming agent may comprise: from about 25 wt % to about 98 wt % of a monomer able to swell and dissolve the label film; from 0 wt % to about 75 wt % of an oligomer or polymer; 0 to about 50 wt % of an organic solvent; and from about 0.5 wt % to about 15 wt % of a photoinitiator. Seams made with seaming agents according to these specific embodiments will have a seam quality of 2, 3, or 4. Desirably, the monomers and/or solvents dissolve the label film within a period of about 0.5 seconds or less, or about 0.2 seconds or less, or about 0.1 seconds or less, or about 0.06 seconds or less.

For high shrink wrap labels comprising PS, PETG, or PVC, where the high shrink wrap label high shrinks more than 25% and less than 50%, the seaming agent may comprise: from about 15 wt % to about 90 wt % of a monomer able to swell and dissolve the label film; 0 to about 75 wt % of an oligomer or polymer; 0 to about 20 wt % of an organic solvent; from about 0.5 wt % to about 15 wt % of a photoinitiator; and 0 to about 20 wt % of a tackifying agent. Seams made with seaming agents according to these specific embodiments will have a seam quality of 2, 3, or 4 (as defined further herein). Desirably, the monomers and/or solvents dissolve the label film within a period of about 0.5 seconds or less, or about 0.2 seconds or less, or about 0.1 seconds or less, or about 0.06 seconds or less.

For high shrink wrap labels made of PS, PETG, or PVC, where the high shrink wrap label high shrinks more than 25% and less than 40%, the seaming agent may comprise: from about 10 wt % to about 90 wt % of a monomer able to swell and dissolve the label film; 0 to about 80 wt % of an oligomer or polymer; 0 to about 10 wt % of an organic solvent; from about 0.5 wt % to about 15 wt % of a photoinitiator; and 0 to about 20 wt % of a tackifying agent. Seams made with seaming agents according to these specific embodiments will have a seam quality of 2, 3, or 4 (as defined further herein). Desirably, the monomers and/or solvents dissolve the label film within a period of about 0.5 seconds or less, or about 0.2 seconds or less, or about 0.1 seconds or less, or about 0.06 seconds or less.

Also disclosed are articles with heat-shrink labels that are made according to the methods of the present disclosure, particularly containers having curved sides or contour.

Also disclosed are shaped containers with a high shrink wrap label that has a welded seam.

Also described herein are high shrink wrap labels that have a welded seam made by joining two edges of a film with a seaming agent; wherein an external layer of the film (whether it is a single-layer film or a multi-layer film) has a Hildebrand solubility parameter, and the seaming agent includes at least one component (e.g. monomer or solvent) having a Hildebrand solubility parameter that is within 2.2 $MPa^{1/2}$ or within 4.4 $calories^{1/2} \cdot cm^{-3/2}$ of the Hildebrand solubility parameter of the film layer, and the seaming agent has a viscosity of about 10 to about 300 centipoise when measured at any temperature between ambient temperature and 60° C. The at least one component usually has a molecular weight of 300 Da or less. Desirably, the seam can achieve an Immediate welding strength of at least 2 grams, more desirably at least 4 grams and even more desirably at least 6 grams within a delta period of about 0.2 seconds to about 0.06 seconds.

Also disclosed herein are methods for identifying such welded seams formed from two edges of a high shrink label film and a seaming agent. The shrunk label is removed from the article or container as necessary. Next, the seam area is cleaned by polishing to remove any ink or coating, and the two edges are separated. The separated label seam is then (A) placed in a closed chamber, and then heated to a temperature of about 200° C. The gas phase is collected and analyzed by gas chromatography. The gas phase derived from the seam will comprise at least three different signature molecules that each (A) have a molecular weight of 230 Da or less, (B) have an aliphatic alkane or alkene backbone containing at least three carbon atoms, (C) contain only one or two acid groups, only one or two ester groups, only one aldehyde group, or only one epoxide group, and (D) do not contain any aromatic, cyclic, or heterocyclic groups.

Also disclosed in various embodiments are liquid radiation-curable seaming agents having an immediate welding strength of greater than 2 grams within less than 0.5 seconds on an associated label film, and having at least one component with a Hildebrand solubility parameter that is within 2.2

$MPa^{1/2}$ or within 4.4 calories$^{1/2}\cdot cm^{-3/2}$ of a Hildebrand solubility parameter of an external layer of the associated label film, and having the ability to form a seam that has a seam quality of at least 2 after heat shrinkage of greater than 25%.

Also disclosed herein are kits, comprising: a high shrink wrap label made of a film having at least one layer with a Hildebrand solubility parameter; and a seaming agent including a component having a Hildebrand solubility parameter that is within 2.2 $MPa^{1/2}$ or within 4.4 calories$^{1/2}\cdot cm^{-3/2}$ of the Hildebrand solubility parameter of the at least one film layer, and having a viscosity of at least 1 centipoise and less than 1000 centipoise when measured at any temperature between ambient temperature and about 60° C.

Finally, also disclosed herein are seaming agents comprising: from about 40 wt % to about 98 wt % of at least one monomer having a molecular weight of less than 300 Da; from about 14 wt % to about 59 wt % of at least one oligomer or polymer having a molecular weight of greater than 300 Da; from about 0.5 wt % to about 2 wt % of a photoinitiator; and from about 0.2 wt % to about 2 wt % of an acrylated amine.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
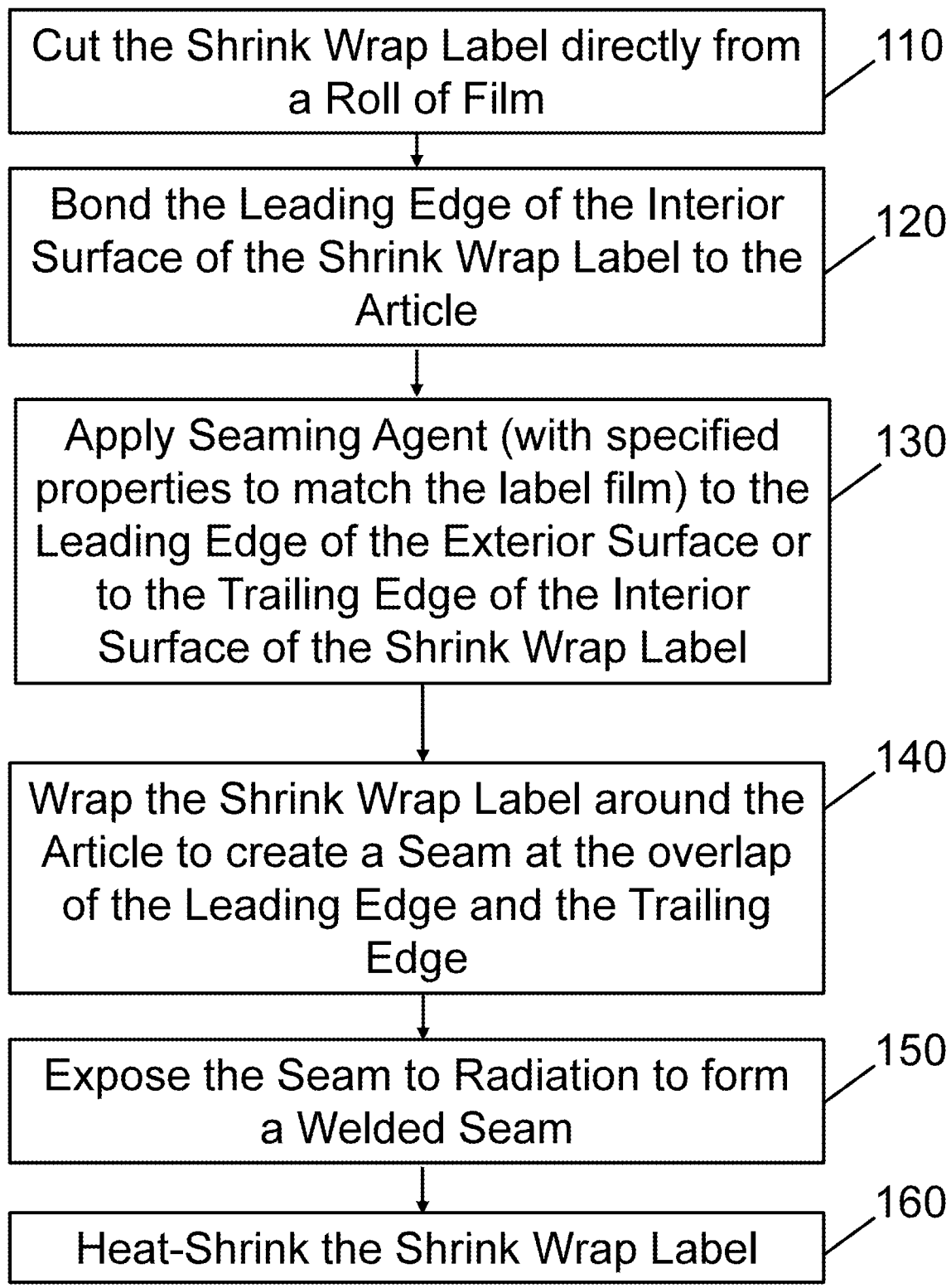
FIG. 1 is a diagram illustrating the methods of the present disclosure.

A more complete understanding of the compositions and methods disclosed herein can be obtained by reference to the accompanying drawings. These figures are merely schematic representations based on convenience and the ease of demonstrating the present disclosure, and are, therefore, not intended to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

Definitions

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

Numerical values in the specification and claims should be understood to include numerical values which are the same when reduced to the same number of significant figures and numerical values which differ from the stated value by less than the experimental error of conventional measurement technique of the type described in the present application to determine the value. When used in relation to polymers, such numerical values should be considered to reflect average values for the polymer, which reflect the fact that individual polymeric molecules can have different characteristics.

All ranges disclosed herein are inclusive of the recited endpoint and independently combinable (for example, the range of "from 2 grams to 10 grams" is inclusive of the endpoints, 2 grams and 10 grams, and all the intermediate values).

As used herein, approximating language such as "about" may be applied to modify any quantitative representation that may vary without resulting in a change in the basic function to which it is related. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number.

The present disclosure may refer to temperatures for certain process steps. It is noted that these generally refer to the temperature at which the heat source (e.g. furnace) is set, and do not necessarily refer to the temperature which must be attained by the material being exposed to the heat.

The term "ambient temperature" refers to a temperature of 20° C. to 25° C.

The term "high shrink label" refers to a label that is applied to an article and then shrunk by at least 25% in the machine direction.

The seam of a high shrink wrap label applied to a shaped article may have "supported" areas and "unsupported" areas. A "supported" area of the seam is in full contact with the body of the article. Application of external pressure to a supported area of a seam will form a tight and even seam. An "unsupported" area of the seam does not contact the body of the article. Application of external pressure to an unsupported area of a seam does not assist in seam formation.

Figure 3:
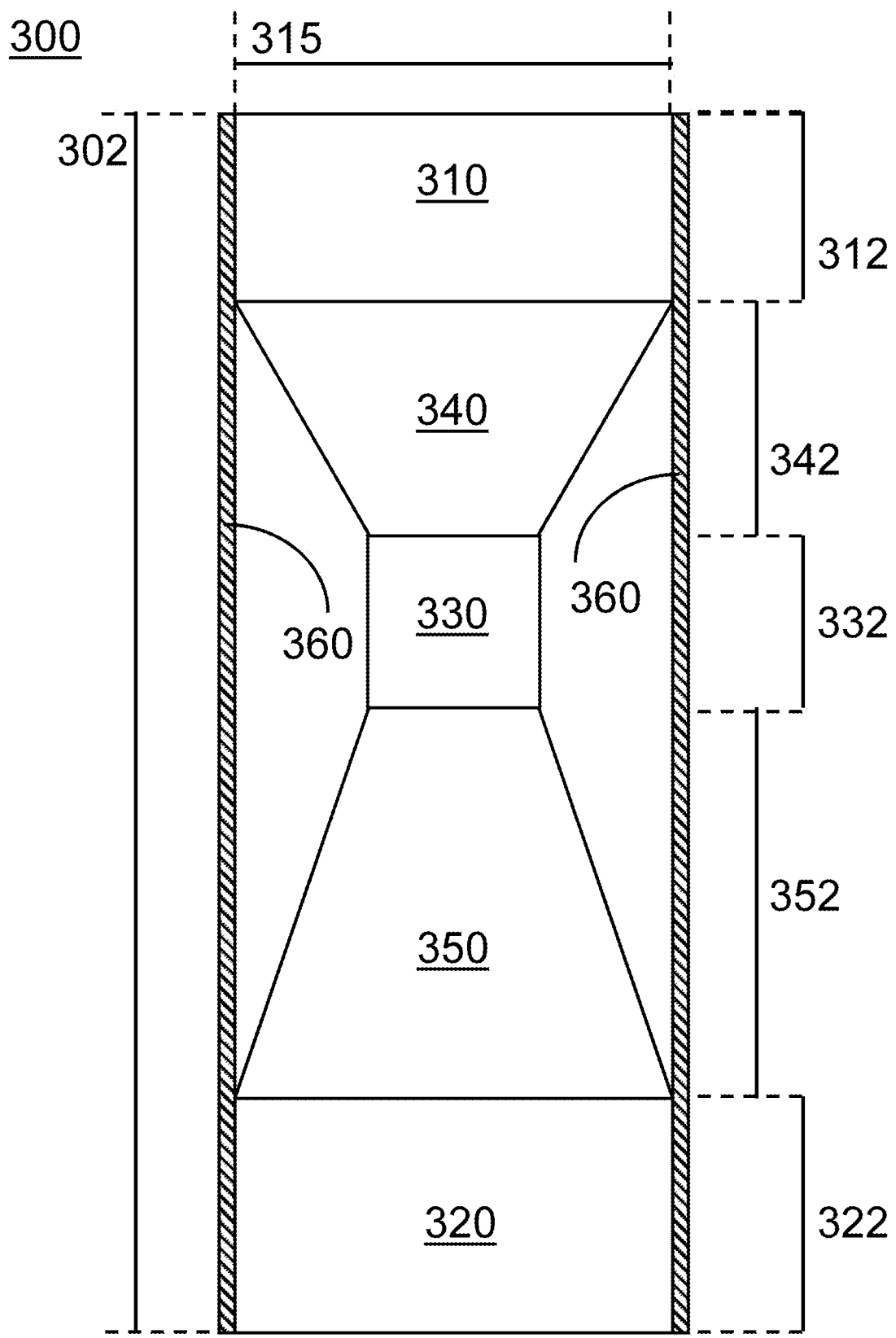
FIG. 3 is a cross-sectional diagram of a shaped mandrel with a label film applied thereto.

As an example, FIG. 3 is a side cross-sectional view of a shaped mandrel 300 with a label 360 wrapped around it. The mandrel has a height 302, and is formed from a top portion 310, a bottom portion 320, a central portion 330, an upper portion 340 joining the top portion 310 to the central portion 330, and a lower portion 350 joining the bottom portion 320 to the central portion 330. The top portion has a height 312 and a top diameter 315. The bottom portion has a height 322 and also has a bottom diameter that is equal to the top diameter 315. The central portion has a height 332, the upper portion has a height 342, and the lower portion has a height 352. The diameters of the mandrel in the central portion, upper portion, and the lower portion are less than the top diameter 315. A high shrink wrap label 360 is wrapped around the mandrel. A seam formed by overlapping the leading and trailing edges of label 360 would have supported areas along top portion height 312 and bottom portion height 322. The seam would have unsupported areas along central portion height 332, upper portion height 342, and lower portion height 352.

Figure 4:
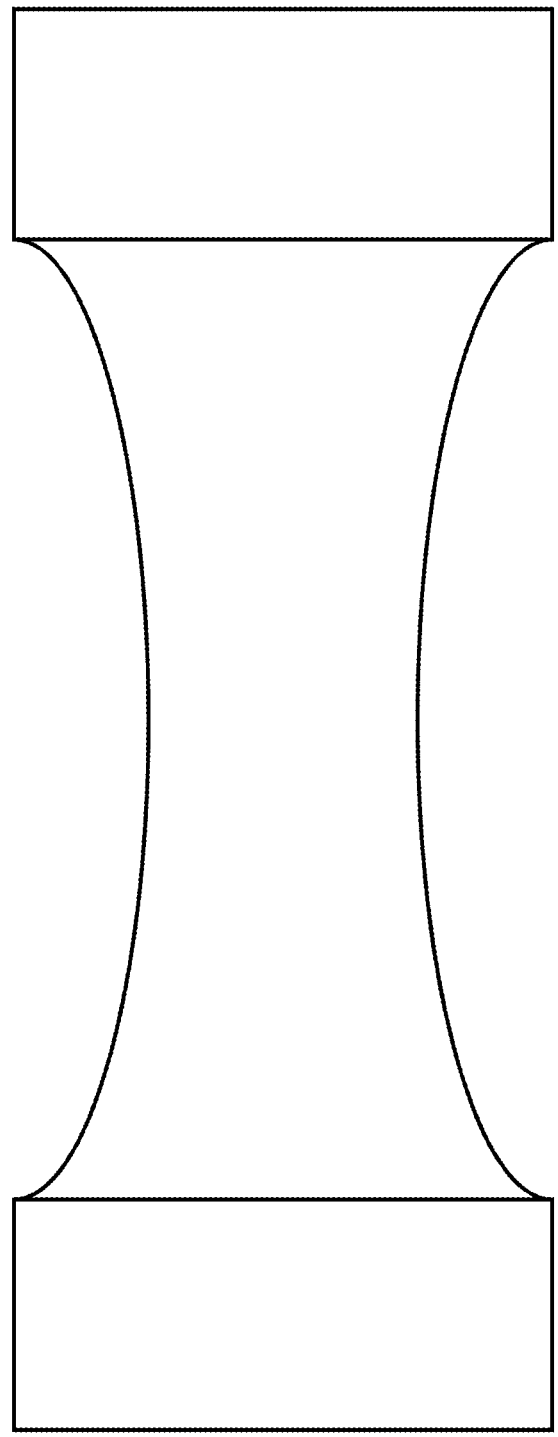
FIG. 4 is a cross-sectional diagram of a shaped mandrel with curved sides.

A "shaped" article is an article that has unsupported areas amounting to at least 10% of the height of the article. Examples of such articles are illustrated in both FIG. 3 and FIG. 4. In FIG. 3, the article is a shaped article if the sum of central portion height 332, upper portion height 342, and lower portion height 352 is at least 10% of the mandrel height 302. FIG. 4 also illustrates a curved article 400, where the unsupported areas are formed by curves or arcs.

The quality of a seam can be described numerically on a scale of 1-4, with 1 being the lowest quality and 4 being the highest quality. A seam quality of 1 indicates the seam has an open seam area with a length greater than 1 inch. A seam quality of 2 indicates the seam does not have any open seam areas with a length greater than 1 inch. A seam quality of 3 indicates the seam does not have any open seam areas with a length greater than 0.5 inches. A seam quality of 4 indicates the seam does not have any open seam areas with a length greater than 0.25 inches. A seam is given the highest quality possible. In other words, a seam that has a seam quality of 4 also meets the requirements for a seam quality of 3 and 2. The phrase "a seam quality of at least X" means the seam quality is X or higher. For example, a seam quality of "at least 2" means the seam can have a seam quality of 2, 3, or 4.

The present disclosure refers to the "immediate welding strength" (IWS). This is the cohesion force developed between two film edges (of an associated film) within a defined period of time. The IWS is measured according to the method described in Example 2.

Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, the aldehyde group —CHO is attached through the carbon of the carbonyl group.

The term "acrylic" or "acrylate" refers to a radical of the formula $R_1R_2C=C-CO-OR_3$, where $R_1$, $R_2$, and $R_3$ are independently hydrogen, alkyl, or aryl, heterocyclic, cycloaliphatic, ether, silicone, hydroxyl, polyhydric alcohol, hydrocarbon, or to a molecule containing such a radical. The term "methacrylic" refers to an acrylic radical or molecule where $R_2$ is methyl.

The term "ether" refers to a radical in which an oxygen atom is covalently bonded to two other carbon atoms (i.e. R—O—R'), or to a molecule containing such a radical.

The term "silicone" refers to a radical of the formula —[(SiO)$R_1R_2$]$_n$, where $R_1$ and $R_2$ are independently hydrogen and alkyl, and n indicates the number of repeating units.

The term "ester" refers to a radical of the formula —CO—O—, wherein the carbon atom and the oxygen atom are both covalently bonded to carbon atoms, or a molecule containing such a radical.

The term "amide" refers to a radical of the formula —CO—NH—, wherein the nitrogen atom and the carbon atom are both covalently bonded to carbon atoms, or to a molecule containing such a radical.

The term "carbamate" refers to a radical of the formula —NH—CO—O—, wherein the nitrogen atom and the oxygen atom are both covalently bonded to carbon atoms, or to a molecule containing such a radical.

The term "polyolefin" refers to a polymer that is prepared by the polymerization of an olefin. Examples of polyolefins include polyethylene and polypropylene. Polyolefins can also be formed from cyclic olefins, including copolymers with ethylene or propylene. It is noted that polyolefins are also hydrocarbons.

The term "derivative" refers to a molecule that contains the named substituent. For example, an "isobornyl derivative" is a molecule that contains an isobornyl group.

The term "aliphatic" refers to a linear or branched or cyclic array of atoms that is not aromatic and is composed exclusively of carbon and hydrogen. The aliphatic group may be substituted or unsubstituted, and any substitutions can be of a carbon atom or a hydrogen atom. Exemplary aliphatic groups include, but are not limited to, methyl, ethyl, isopropyl, hexyl, and cyclohexyl. Alkanes, alkenes, and alkynes are types of aliphatic compounds.

The term "hydrocarbon" refers to a radical which is composed exclusively of carbon and hydrogen, or to such a molecule. Alkyl, cyclic olefin, and aryl groups are considered hydrocarbon groups.

The term "cyclic" refers to a radical having a ring structure, or to a molecule having a ring structure. This term does not require the ring to be aromatic.

The term "heterocyclic" refers to a radical having a ring structure that contains at least one heteroatom, such as nitrogen, sulfur, or oxygen. This term does not require the ring to be aromatic.

The term "aromatic" refers to a radical or molecule having a ring system containing a delocalized conjugated pi system with a number of pi-electrons that obeys Hückel's Rule. The ring system may include heteroatoms such as nitrogen, sulfur, selenium, silicon and oxygen, or may be composed exclusively of carbon and hydrogen. Aromatic groups are not substituted. Exemplary aromatic groups include, but are not limited to, phenyl, pyridyl, furanyl, thienyl, naphthyl and biphenyl.

The term "copolymer" refers to a polymeric molecule derived from two or more structural unit or monomeric species, as opposed to a homopolymer, which is a molecule derived from only one structural unit or monomer. The term "dipolymer" refers to a molecule derived specifically from only two different monomers. The term "terpolymer" refers to a molecule derived specifically from only three different monomers.

The term "urethane" refers to an oligomer or polymer whose monomers are joined together by carbamate linkages.

The term "glycol" refers to a radical that has two hydroxyl groups attached to different carbon atoms, and is a subset of diols, polyols, and polyhydric alcohols.

The term "polyhydric alcohol" refers to an alkane or alkene (linear or cyclic) which contains more than one hydroxyl group. The term "diol" refers to a radical that has two hydroxyl groups. Diols are a subset of polyhydric alcohols.

The term "rosin" refers to a highly viscous substance of plant or synthetic origin, from which volatile terpenes have been removed.

The term "epoxy" refers to a radical which is a cyclic ether (e.g. glycidyl group, oxirane group) with a three-atom ring, or to a molecule containing such a radical.

The term "ketone" refers to a carbonyl radical (—CO—) that is covalently bonded to two other carbon atoms (i.e. R—CO—R'), or to a molecule containing such a radical. The two other carbon atoms can be in an aliphatic group or in an aromatic group. An ester, amide, carbamate and a carboxylic acid are not considered to be a ketone, because their carbonyl carbon atom is bonded to only one carbon atom, as well as to a non-carbon atom.

The term "alkoxy" refers to an alkyl radical which is attached to an oxygen atom, i.e. —O—$C_nH_{2n+1}$, to a molecule containing such a radical.

The term "hydroxyl" refers to a radical of the formula —OH, wherein the oxygen atom is covalently bonded to a carbon atom The terms "carboxy" or "carboxyl" refers to a radical of the formula —COOH, wherein the carbon atom is covalently bonded to another carbon atom. It should be noted that for the purposes of this disclosure, a carboxyl group may be considered as having a hydroxyl group. However, it should be noted that a carboxyl group can participate in certain reactions differently from a hydroxyl group.

The term "alkyl" refers to a radical composed entirely of carbon atoms and hydrogen atoms which is fully saturated. The alkyl radical may be linear, branched, or cyclic.

The term "aryl" refers to an aromatic radical that is composed exclusively of carbon and hydrogen. Exemplary aryl groups include phenyl, naphthyl, and biphenyl. Note that "aryl" is a subset of aromatic.

The term "heteroaryl" refers to an aromatic radical having a ring system that is composed of carbon, hydrogen, and at least one heteroatom. Exemplary heteroaryl groups include pyridyl, furanyl, and thienyl. Note that "heteroaryl" is a subset of aromatic, and is exclusive of "aryl".

The term "halogen" refers to fluorine, chlorine, bromine, and iodine. The prefix "halo" or the term "halogenated" indicates the substituent or molecule has been substituted with a halogen atom.

The term "crosslink" and its variants refer to the formation of a stable bond between two polymers/oligomers. This term is intended to encompass the formation of stable bonds that result in network formation, or the formation of stable bonds that result in chain extension. The term "crosslinkable" refers to the ability of a polymer/oligomer to form such stable bonds.

The present disclosure refers to "polymers," "oligomers", and "compounds". A polymer is a large molecule composed of multiple repeating units chained together, the repeating units being derived from at least one monomer. One characteristic of a polymer is that different molecules of a polymer will have different lengths, and a polymer is described as having a molecular weight that is based on the average value of the chains (e.g. weight average or number average molecular weight). The art also distinguishes between an "oligomer" and a "polymer", with an oligomer having only a few repeating units, while a polymer has many repeating units. For purposes of this disclosure, the term "oligomer" refers to such molecules having a weight average molecular weight of less than 5,000 Daltons, and the term "polymer" refers to molecules having a weight average molecular weight of 5,000 Daltons or more, as measured by GPC using polycarbonate molecular weight standards. In contrast, for a compound, all molecules will have the same molecular weight. Compared to a polymer, a compound is a small molecule. These molecular weights are measured prior to any radiation exposure.

The terms "PS" and "polystyrene" are used herein to refer to any polymer that includes a styrene monomer. This can include polystyrene homopolymers, styrene copolymers and terpolymers, styrene block copolymers, and blends of polystyrene with other polymers. These polymers may be referred to individually by their full name.

The phrase "up to" is used herein to refer to amounts of a particular ingredient or component. This phrase should be construed to set an upper limit of the recited value, and to require that the particular ingredient or component is present (i.e. in an amount greater than zero). If an ingredient is not required, the term "optional" will be used herein to indicate that the amount of that optional ingredient can be zero, or the amount will be expressly disclosed to include zero. Any description of an ingredient or component being optional should be construed to also disclose embodiments where the ingredient or component is present in an amount greater than zero.

Methods

The seam of a high shrink wrap label is the area where the leading edge and the trailing edge of the label overlap each other and are welded together. Desirably, the seam has a seam quality of 2, 3, or 4 (as previously defined). The high shrink wrap label is formed on an article, such as a container.

Low shrink labels have less than 20% shrinkage. In applications that have up to 0-20% shrinkage, a hot melt adhesive can be used in the seam to join the leading edge and trailing edge of the label together. In this range of shrinkage, the forces on the seam are not too high and hot melt adhesive can withstand them.

High shrink labels have greater than 25% shrinkage. In these cases, hot melt adhesives generally cannot withstand the shrinkage forces that arise during shrinkage of the label, especially when steam heating is used. Hot melt adhesives have high internal tack, but the film-glue interface is weak.

Welding is a process where the polymer chains from the leading and trailing edges of the label film diffuse to form a mixed polymer network at the interface with the seaming agent. The polymer chains are either melted or dissolved by a low molecular weight agent in the seaming agent, such as solvent. Only welding is able to provide a durable seam capable of withstanding heat shrink forces, especially during steam heating where both humidity and heat will stress the seam.

Today, there are four welding methods in use for forming high shrink labels on curved articles such as containers: (A) RFS solvent; (B) Heat welded RFS; (C) TD Sleeve; and (D) RF solvent. The RFS solvent and TD sleeve methods have a common process of seam formation. In these two methods, polymer chains from the leading and trailing edges are swollen by a compatible solvent and then pressed to form a mixed polymer network in the interface. The heat welded RFS method uses heat to melt the edges and weld them together into a seam.

In the two RFS methods, a high shrink wrap label is made in the form of a cylindrical sleeve prior to being placed on the article. The label is cut directly from a roll, and then wrapped around a smooth metal mandrel and simultaneously and immediately pressed by a roller against the mandrel to make a tight and even seam. The leading edge and the trailing edge of the label are welded (using solvent or heat, depending on the method) together along a seam to form the sleeve. The individual sleeve is then transferred onto an article, and heat shrunk.

In the TD sleeve method: a long continuous tube is made from a film directly from a roll by solvent welding. The solvent dissolves the polymer of the label film, resulting in a swollen polymer. The two swollen edges are continuously and immediately pressed between rolls to create a mixed polymer network, providing a tight and even seam. The solvent needs time to evaporate before sleeves made from the tube are applied onto a container, otherwise the seam may open or delaminate during the shrinkage process. Usually, the labeling phase (sleeve onto container) occurs days or even weeks after roll of sleeves formation, giving the solvent ample time to evaporate and maximize seam strength.

The tube is wound into a roll of sleeves. This roll of sleeves is then transferred to a second site wherein another dedicated machine is used for labeling. A sleeve is transferred onto an article and then heat shrunk.

In the RF solvent method, a label is wrapped around a shaped article and the seam is solvent welded. Usually, THF solvent is used with a PETG label. This method is limited to speeds lower than 200 containers per minute, because solvent tends to splash out of the seam and damage the label at higher speeds.

The TD sleeve method has many limitations. It is a multi-step process. The roll of sleeves manufacturing process is separated timewise and geographically from the labeling process. VOC emission is very high, and is a major environmental and regulatory limitation. There is a high waste rate (due to the multiple step nature of the manufacturing and labeling processes. The process is low-throughput, i.e. the vast majority of TD sleeve bottlers work at a rate of about 200-350 containers per minute (CPM), whereas RFS methods (non shrink or low shrink) can work at a rate of 600-1000 CPM. In addition, the market is moving towards downgauging film to reduce costs. However, the TD sleeve method requires a relatively rigid sleeve, and if a sleeve is made of thinner film, it may crush during insertion onto the container, leading to increased waste.

The RFS solvent method also has several limitations. VOC emission is very high, and is a major environmental and regulatory limitation. The labeling equipment is very expensive—about 3 times more expensive than the equipment for TD sleeve lines. Since 2006, only 11 RFS machines have been sold worldwide, in comparison to thousands of TD sleeve labeling machines during the same time. Again, the market is moving towards downgauging film, but the RFS solvent method requires a relatively rigid sleeve, and if a sleeve is made of thinner film, it may crush during insertion onto the container, leading to increased waste. Finally, unlike the TD sleeve process, where solvent has many days or weeks to evaporate and maximize the strength of the seam, in the RFS solvent method only a few seconds pass between sleeve formation and heat shrink, and thus if the solvent amount is too high, it does not have sufficient time to evaporate, resulting in a weak seam.

The heat welded RFS method also has many limitations. First, the hot bar must be kept at an elevated temperature. As a result, burned material tends to accumulate. There is the danger of overheating, which leads to local shrinkage near the seam. Finally, there is the need to physically adjust the hot bar with each label to apply heat to the edge of the label.

Solvent welding (used in the RFS solvent and TD sleeve processes) has the following limitations. The viscosity of solvents used for seaming in these processes have very low viscosity. For example, tetrahydrofuran has a viscosity of 0.48 cP; limonene has a viscosity of 0.85 cP; and methyl ethyl ketone has a viscosity of 0.4 cP. Due to these low viscosities, these solvents tend to flow out of the seam, cause discoloration, perforate the label, attack the ink, and tend to splash during application by the labeling machine. These negative aspects increase as production rate increases, which limits production speed. These solvents must also evaporate, meaning that 100% of the seaming solvent contributes to VOC emissions. Due to their low molecular weight, they aggressively penetrate the label and so their impact on label quality is difficult to control. The processing window is very tight and difficult to control. If the solvent amount is too low, the seam is not strong enough. But if the solvent amount is too high, other problems occur, such as label slippage because the two film edges do not contact each other, haze, rupture of film integrity, and/or flow of solvent out of the seam and consequent damage to the label. For PETG films, solvent residue in the film will cause stress cracking of the film even after shrinkage, leading to post-manufacturing failures. In addition, small molecule solvents suitable for use with films such as PETG, PS, PVC, and COC will penetrate the film more quickly, but are also more flammable. For example, THF has a flashpoint of −14° C., dioxane has a flashpoint of 12° C., and pinene has a flashpoint of 33° C. These flashpoints are all below ambient temperatures, which requires dedicated safety equipment and procedures, which complicates and affects the cost of manufacturing. Additionally, the presence of large quantities of solvents in contact with food and beverage packaging facilities is problematic from a regulatory standpoint. Solvent residues can also diffuse through containers into the material therein, which is undesirable for food or drink containers.

Ideally, the formation of a sleeve by a separate process is avoided. Instead, the leading edge of the label is directly affixed to the container, then the label is wrapped around the container, and the trailing edge is then joined to the leading edge to dynamically form the sleeve around the container. By doing so, one can avoid the limitations described above.

However, it is difficult to directly wrap a high shrink label around a shaped container and successfully form the seam/sleeve using prior art adhesives, such as hot melt adhesives (including radiation curing hot melt).

It is important to understand the difference between conventional radiation cured adhesives and the radiation cured seaming agents of the present disclosure. Prior art glues adhere to the surface of a film by tack forces, usually by adding very large molecules that can tack the surface but not swell and migrate into the film matrix. Due to that, the interface between the label film surface and the glue itself is relatively weak—regardless of how strong the cross-linked glue is internally. The outcome of this is a failure (between adhesive and film) at shrinkages greater than 25%. The seaming agents of the present disclosure operate in a completely different manner. First, low molecular weight monomers, selected carefully to have a similar Hildebrand solubility parameter to an external layer of the label film, diffuse very quickly into the polymeric matrix of the film. Due to their low molecular weight, this process takes place within a period of about 0.5 seconds or less, including about 0.2 seconds or less, and may even be about 0.06 seconds or less. Another aspect of the present disclosure is the option to combine monomers and solvents, both carefully selected to match the Hildebrand solubility parameter of the label film. The solvent allows for an improved penetration rate, as well as the ability to closely match the Hildebrand solubility parameter of the label film. The result is establishment of an inter-penetrating network of film molecules and seaming agent molecules in the interface of the film and the seaming agent, so that they unite into one mass.

This occurs without the drawbacks of solvent bonding. Here, the relatively high molecular weight oligomers, polymers, and tackifiers in the seaming agent function as diffusion suppressants, balancing the aggressive attack of solvents and/or monomers on the label film. In addition, lower molecular weight solvents are highly flammable. Surprisingly, when the solvent content in the seaming agent is 50% or less (including 30% or less, more desirably 20% or less, and most desirably 5% or less), the flash point of the seaming agent is more affected by the presence of the monomers and oligomers, and found to be greater than 80° C., and typically even greater than 100 Celsius. Surprisingly, the cross linked seaming agent of the present disclosure has % VOC emissions varying from zero (when no solvent, only monomers and optionally oligomers or polymers are present), through less than 7% VOC emission when the solvent content is up to 15 wt % of the seaming agent, less than 13% VOC emission when the solvent content is up to 24 wt % of the seaming agent, and less than 20% VOC emission when the solvent content is up to 30 wt % of the seaming agent (all % VOC data generated according to a modified ASTM D5403-93, as described in Example 5). Without being limited by theory, it appears the solvent molecules are "caged" in a cross-linked polymeric matrix, said matrix being composed of a blend of polymerized seaming agent ingredient and film polymer molecules present in the seam and formed during the welding phase.

Continuing, the viscosity of conventional adhesives is designed to provide tack, and due to that is usually high viscosity (greater than 1000 cPs at application temperature). A negative aspect of such high viscosity is the inability of the seaming agent to flow and seal the seam area completely, including the edges, especially in unsupported areas. Additionally, air entrapped inside the glue can lead to low seam quality. The high viscosity also makes dispensing and spreading the adhesive by machine more difficult. Due to the inherent high tack of such conventional adhesives, cleaning and maintenance (an important issue in the food industry) is difficult and consumes solvents, generating VOC and hazards related to flammability and disposal. The seaming agents of the present disclosure have a low viscosity at the application temperature to allow the seaming agent to flow along the seam, especially in unsupported areas. This flow, together with swelling, creates a suction force due to diffusion of monomers and/or solvent into the label film, causing negative internal pressure inside the seam. The outcome of the suction is attraction of the leading and trailing edges, one towards the other, without any external forces (labeled herein a zipper mechanism). The resulting seam can have a seam quality of 2, 3, or 4 as previously defined.

The seaming agents can be used at any application temperature between ambient temperature and about 60° C. This range balances safety and ease of operation. In contrast, hot melt adhesives are normally applied at temperatures greater than 60° C., sometimes even greater than 100° C. Due to these high temperatures, hot melt adhesives, when applied to high shrink wrap labels, tend to initiate premature shrinkage near the seam. Such high temperatures also create safety issues for machine operators.

In order to allow high production rates (i.e. immediate welding within about 0.5 seconds, more preferably within about 0.2 seconds, and for high speed lines within about 0.06 seconds), the seaming agents of the present disclosure have a viscosity of at least 1 centipoise (cPs) and about 1000 cPs or less at application temperature. Desirably, the viscosity is about 300 cPs or less, or about 200 cPs or less. In particular embodiments, seaming agents with a viscosity of about 100 cPs or less are particularly useful. The minimum viscosity for the seaming agent is 1 cPs.

Once a seam has been established and the article has been successfully wrapped with the high shrink wrap label, the seam desirably has a seam quality of 2, 3, or 4. The seam has sufficient resistance to shrink forces and especially to shrink forces combined with steam. The polymerization and cross-linking that form the seam desirably occur within less than 5 seconds, or less than 2 seconds, or less than 1 second.

The polymerization and cross-linking occur by exposing the seam to radiation. This radiation may be provided by any number of bulbs or light-emitting diodes (LEDs), including combinations thereof. The radiation may have at least one peak wavelength of about 300 nm to about 500 nm. The seam may be exposed to radiation at an average power density of at least 0.2 W/cm$^2$, preferably at least 0.5 W/cm$^2$, even more preferably at least 1 W/cm$^2$ as measured on the surface of the shaped article.

The present disclosure thus relates to methods for applying a high shrink wrap label to a shaped article, such as a container. FIG. 1 illustrates one example of the methods of the present disclosure, and is described with respect to a container. In step 110, the high shrink wrap label is cut directly from a roll of film. Generally speaking, the high shrink wrap label is a flat film in the shape of a rectangle, having a leading edge and a trailing edge (defined by how the label is applied to the container). The high shrink wrap label has a height and a length. The label can be made from a single-layer film, or can be made from a multi-layer film having two external layers.

Figure 2:
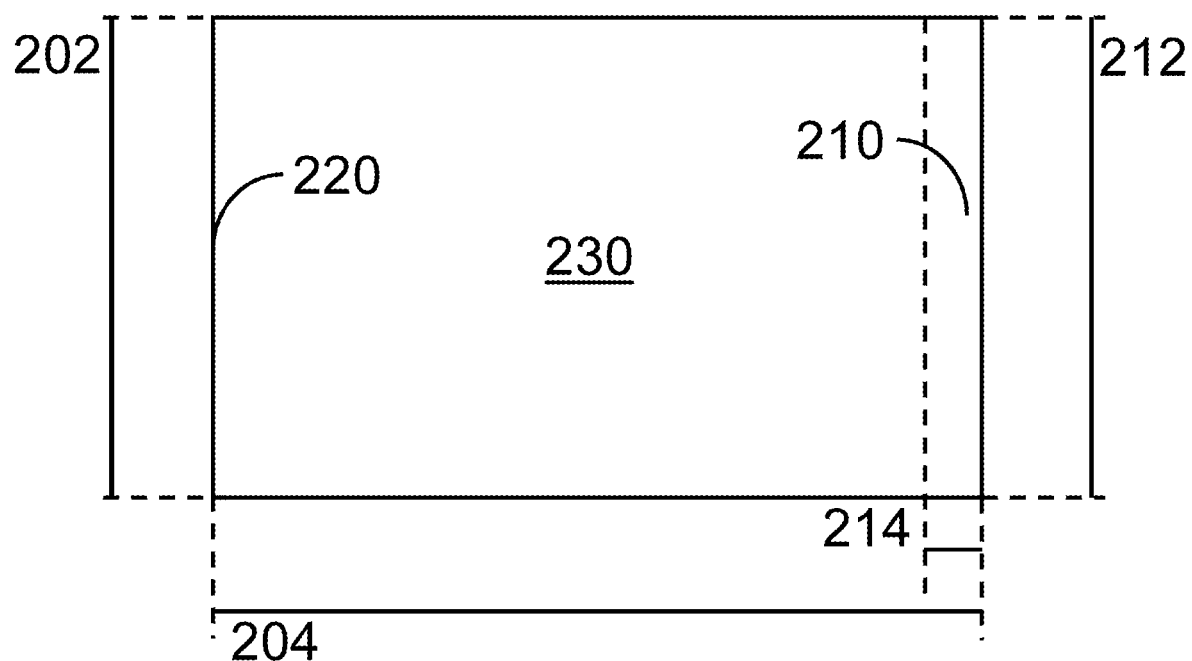
FIG. 2 is a diagram of a high shrink wrap label, with various parts of the label identified for reference.

In step 120, the leading edge of the high shrink wrap label is bonded to the shaped container. The leading edge of the high shrink wrap label may be bonded to the shaped container using a hot melt adhesive, a pressure-sensitive adhesive, or a radiation-curable adhesive. Referring to FIG. 2, the high shrink wrap label 200 has a leading edge 210 and a trailing edge 220. The leading edge 210 of the high shrink wrap label 200 has a height 212, which is measured in the same direction as the height 202 of the overall label, and has a width 214 which is measured in the same direction as the length 204 of the label. The width of the overlap of the trailing edge and the leading edge, which will become the seam, may range from about 3 mm to about 10 mm. The high shrink wrap label may also be considered to have an interior surface 230 and an exterior surface (not visible). The interior surface is the surface adjacent to the shaped container, and the exterior surface is the exposed surface that is visible to the consumer. An adhesive is applied to either (a) the interior surface of the label; or (b) the exterior surface of the container, to bond the leading edge of the label to the shaped container. The adhesive may be a hot melt adhesive, a pressure-sensitive adhesive, or a radiation-curable adhesive.

Referring back to FIG. 1, in step 130, a seaming agent is then applied to the leading edge of the high shrink wrap label or the trailing edge of the high shrink wrap label. More specifically, the seaming agent is applied to the leading edge on the exterior surface of the label, or is applied to the trailing edge on the interior surface of the label. The width of the seam may range from about 3 millimeters (mm) to about 10 mm. The seaming agent is described further herein. The seaming agent may be applied in an amount of about 0.2 milligrams (mg) to about 5 mg per square centimeter of seam area. The seaming agent may be applied by spraying, drop-on-demand jetting, ink jetting, stamping, transfer from a rotating roller, stamping, brushing, injecting from a nozzle or needle, or ultrasonic spraying.

In step 140, the high shrink wrap label is wrapped around the shaped container until the trailing edge contacts the leading edge, creating a seam that joins the trailing edge of the high shrink wrap label to the leading edge of the high shrink wrap label with the seaming agent. The seam may have an immediate welding strength (IWS) of at least 2 grams, obtained within a delta period of about 0.5 seconds to about 0.06 seconds, measured upon a seam that has an area of 250 mm$^2$, prior to exposing the seam to radiation.

In the present disclosure, unlike hot melt technology, the strength of the seam is due to the swelling of the label film with monomers and solvents from the seaming agent, leading to mixing of the polymer molecules of the label film with the seaming agent. The Hildebrand solubility parameter of a seaming agent component (monomer and/or solvent) and at least one outer layer of the high shrink label film material are close to each other. In this regard, the label film can be a single-layer film or a multi-layer film having at least one outer or external layer. The single layer of the single-layer film should also be considered an outer or external layer. If the solubility parameters are not close, then the immediate welding strength will not be high enough, and the seam will not have a seam quality of 2, 3, or 4 after shrinkage or steam heat shrinkage. It is important to note that an immediate welding strength of at least 2 grams only predicts the ability of the seam to remain intact during travel towards the radiation curing tunnel, and does not the ability to withstand heat shrinkage. This is discussed in more detail further herein. On the other hand, if the monomer or solvent content of the seaming agent is too high, the swelling process can affect the clarity of the seam, and the label film may become cloudy, opaque or hazy. This is undesirable. Thus, the seaming agents of the present disclosure generally have a balanced content between monomers+solvent (important for immediate welding and a good seam after shrinkage, but risk of loss of clarity) and oligomers+polymers (which lowers IWS but helps provide a clear seam after shrinkage and suppress loss of clarity), as will be explained further below.

In step 150, the welded seam is then exposed to radiation to form a cross-linked seam. The radiation initiates cross-linking of the seaming agent with the interfaces of the label, resulting in a blend of seaming agent and polymer molecules from the label film. The cross-linked welded seam will contain an interpenetrating polymer network (IPN) of (a) cross-linked seaming agent components and polymerized seaming agent chains and (b) polymeric chains from the label film. The IPN is extremely strong and resistant to cleavage. The forces between the polymerized and cross-linked seaming agent and film polymer chains may be van der Waals, polar, hydrogen, ionic, covalent, coordinative, and combinations thereof. The radiation may be provided by any number of bulbs or light-emitting diodes (LEDs), including combinations thereof. The radiation may have at least one peak wavelength of about 300 nm to about 500 nm. The seam may be exposed to radiation at an average power density of at least 0.2 W/cm$^2$ or preferably at least 0.5 W/cm$^2$, or even more preferably at least 1 W/cm$^2$ as measured on the surface of the shaped article. The seam may be exposed to radiation for a time period of about 0.05 seconds to about 5 seconds, preferably less than 5 seconds, and including about 0.05 seconds to about 2 seconds.

Finally, in step 160, the high shrink wrap label is then heat-shrinked, so that the label conforms to the shaped container. The heat-shrinking may be performed by steam shrink. The heat-shrinking may occur at a temperature of about 80° C. or greater, or from about 95° C. to about 120° C. The high shrink wrap label may shrink by about 25% or greater, including from about 25% to about 75%.

Seaming Agent

Very generally, the seaming agent or composition comprises (A) at least one monomer with a molecular weight lower than 300 daltons (Da); (B) at least one oligomer or polymer or tackifier with a molecular weight greater than 300 daltons (Da) and having good compatibility with the monomer; (C) a photoinitiator; and (D) optionally, a compatible solvent to assist in swelling of the label film. Other ingredients in the seaming agent can include a plasticizer.

The monomer with a molecular weight lower than 300 Da (A) should have good compatibility with an outer layer of the label film, so that the monomer can swell and dissolve the label film material. Additionally, a solvent can be present that dissolves the label film material.

The compatibility between the monomer/solvent and the label film material can be determined by using the Hildebrand solubility parameter, which can be used to estimate whether the label film material will dissolve in the monomer/solvent. The Hildebrand solubility parameter ($\delta$) is the square root of the cohesive energy density, and has the SI unit of $Pa^{1/2}$, and conventional units of $calories^{1/2} \cdot cm^{-3/2}$. A rough conversion between these two units is that the number of $MPa^{1/2}$ is twice the number of $calories^{1/2} \cdot cm^{-3/2}$.

Table A lists several monomers and solvents and their Hildebrand solubility parameter.

TABLE A

| Monomer or Solvent | $\delta$ ($cal^{1/2} \cdot cm^{-3/2}$) | $\delta$ ($MPa^{1/2}$) |
| --- | --- | --- |
| 2,2-dimethylpropane (neopentane) | 6.3 | 12.8 |
| Isobutylene | 6.7 | 13.7 |
| n-butane | | 14.1 |
| n-pentane | 7.0 | 14.4 |
| n-hexane | 7.24 | 14.9 |
| Tetrachlorosilane | 7.4 | 15.1 |
| Diethyl Ether | 7.4-7.6 | 15.1-15.4 |
| n-octane | 7.6 | 15.5 |
| methylcyclohexane | 7.8 | 15.9 |
| Limonene | | 16-17 |
| Isooctyl acrylate | 7.8 | 16.0 |
| Ethyl isobutyrate | 7.9 | 16.1 |
| n-butyl cyclohexane | | 16.2 |
| Hexadiene acrylate | 7.9 | 16.2 |
| di-isopropyl ketone | 8.0 | 16.3 |
| Methyl amyl acetate | 8.0 | 16.3 |
| Turpentine | 8.1 | 16.5 |
| 2,2-dichloropropane | 8.2 | 16.7 |
| cyclohexane | 8.2 | 16.8 |
| Sec-amyl acetate | 8.3 | 16.9 |
| Dipentene | 8.5 | 17.3 |
| Amyl acetate | 8.5 | 17.3 |
| n-butyl benzene | | 17.4 |
| 3-n-butyl toluene | | 17.4 |
| p-n-butyl toluene | | 17.4 |
| o-n-butyl toluene | | 17.6 |
| Methyl n-butyl ketone | 8.6 | 17.6 |
| Pine oil | 8.6 | 17.6 |
| Carbon tetrachloride | 8.6 | 17.6 |
| 1,2-diethyl benzene | | 17.7 |
| Methyl n-propyl ketone | 8.7 | 17.8 |
| Piperidine | 8.7 | 17.8 |
| p-xylene | 8.8 | 17.9 |
| ethyl benzene | | 17.9 |
| 1,3,5-trimethyl benzene | | 18.0 |
| Dimethyl ether | 8.8 | 18.0 |
| o-xylene | | 18.1 |
| toluene | 8.9 | 18.2 |
| Ethyl Acetate | 9.1 | 18.2 |
| 1,2-dichloropropane | 9.0 | 18.3 |

TABLE A-continued

| Monomer or Solvent | $\delta$ ($cal^{1/2} \cdot cm^{-3/2}$) | $\delta$ ($MPa^{1/2}$) |
| --- | --- | --- |
| Mesityl oxide | 9.0 | 18.3 |
| Ethoxy ethoxyethylacrylate | 9.0 | 18.4 |
| Benzene | 9.2 | 18.5 |
| Isophorone | 9.1 | 18.6 |
| Ethyl acetate | 9.1 | 18.6 |
| Diacetone alcohol | 9.2 | 18.7 |
| Chloroform | 9.2-9.3 | 18.7-19 |
| Isobornyl acrylate | 9.2 | 18.8 |
| Trichloro ethylene | | 19.0 |
| Trichloroethylene | 9.3 | 19.0 |
| Tetrahydrofurfuryl acrylate | 9.3 | 19.0 |
| styrene | | 19.1 |
| Tetrachloroethylene | 9.4 | 19.2 |
| Tetrahydrofuran | | 19.4-19.5 |
| Tetrahydro naphthalene (tetralin) | 9.5 | 19.4-19.9 |
| Acetone | 9.8-10 | 19.9-20.4 |
| Methyl chloride | 9.7 | 19.8 |
| Methylene dichloride | 9.7 | 19.8 |
| Ethylene dichloride | 9.8 | 20.0 |
| 1,1,2-trichloro ethane | | 20.1 |
| naphthalene | | 20.2 |
| Dichloromethane | 9.93 | 20.2 |
| Cyclohexanone | 9.9 | 20.2 |
| dioxane | 9.9 | 20.2 |
| Carbon disulfide | 10.0 | 20.4 |
| Acetone | 10.0 | 20.4 |
| n-octanol | 10.3 | 21.0 |
| Butyronitrile | 10.5 | 21.4 |
| biphenyl | | 21.5 |
| 1,1,2,2-tetrachloro ethane | | 21.6 |
| n-hexanol | 10.7 | 21.8 |
| 2-propanol | 11.6 | 23.8 |
| Hydroxyethyl methacrylate | | 25-26 |
| Ethanol | 12.92 | 26.5 |
| Ethylene Glycol | | 29.9 |
| Polydimethyl siloxane | 7.6 | 15.5 |
| Poly(isobutylene) (PIB) | | 15.8 |
| Poly(propylene) | 8.2 | 16.2-16.6 |
| Polyisoprene (PI) | | 16.5 |
| Poly(ethylene) | 7.9 | 16.7 |
| Polybutadiene (PB) | | 17.0 |
| Poly(oxypropylene) (PPG) | | 17.2 |
| Poly(tetrahydrofuran) (PTMO, PTMG) | | 17.5 |
| Poly(n-butyl acrylate) | 8.7 | 17.8 |
| Poly(butyl methacrylate) (PBMA) | | 17.9 |
| Poly(isobutyl methacrylate) (PIBMA) | | 18.0 |
| Poly(2-chloro-1,3-butadiene) (Neoprene) | | 18.1 |
| Poly(isobutyl acrylate) | | 18.2 |
| Poly(butyl vinyl ether) | | 18.2 |
| Poly(methyl vinyl ether) | | 18.3 |
| Poly(styrene) | 9.13 | 18.4 |
| Poly(ethyl methacrylate) (PEMA) | | 18.4 |
| Poly(α-methylstyrene) | | 18.4 |
| Poly(2-ethoxyethyl methacrylate) | | 18.6 |
| Poly(vinyl propionate) | | 18.6 |
| Poly(vinyl butyrate) | | 18.6 |
| Poly(propyl acrylate) (PPA) | | 18.7 |
| Poly(methyl methacrylate) | 9.3 | 19.0 |
| Poly(ethyl acrylate) (PEA) | | 19.1 |
| Poly(methyl vinyl thioether) | | 19.1 |
| PVC | 9.5 | 19.5 |
| Poly(vinyl acetate) (PVA) | | 19.6 |
| Poly(epichlorohydrin) | | 19.7 |
| Poly(methyl acrylate) (PMA) | | 20.0 |
| Polylactic acid (PLA) | | 20.2 |
| Poly(vinylidene chloride) (PVDC) | | 20.6 |
| Polyoxyethylene (PEO, PEG) | | 20.8 |
| Poly(oxymethylene), Polyacetal (POM) | | 21.1 |
| Polysulfone (PSU) | | 21.2 |
| Poly(methacrylonitrile) (PMAN) | | 22.9 |
| Poly(octano-8-lactam) (Nylon 8) | | 24.7 |
| PET | 10.1 | 20.5-21.2 |
| Poly(caprolactam) (Nylon 6) | | 25.5 |
| Poly(hexamethylene adipamide) (Nylon 6,6) | | 26.1 |
| Poly(acrylonitrile) (PAN) | | 26.2 |
| Poly(cyanomethyl acrylate) | | 26.3 |

TABLE A-continued

| Monomer or Solvent | δ (cal$^{1/2}$·cm$^{-3/2}$) | δ (MPa$^{1/2}$) |
|---|---|---|
| poly(hydroxyethyl methacrylate) | | 26.93 |
| Poly(vinyl alcohol) (PVA, PVOH) | | 30.5 |

For example, polystyrene has a solubility parameter of 9.13 cal$^{1/2}$·cm$^{-3/2}$, and thus ethyl acetate or toluene are likely to be good solvents. In the present application, the seaming agent contains at least one component that will dissolve the film material from which the high shrink wrap label is made. The (A) at least one component of the seaming agent and (B) the film material of the high shrink wrap label are compatible if they have Hildebrand solubility parameters that are within 2.2 MPa$^{1/2}$ or within 4.4 calories$^{1/2}$·cm$^{-3/2}$ of each other. The component of the seaming agent that is compatible with the film material is generally a monomer or a solvent.

Whether the at least one oligomer or polymer with a molecular weight greater than 300 daltons (Da) should be compatible with the monomer (A) or the optional solvent can be determined by a method called "OPMC—Oligomer or Polymer monomer compatibility". This is done by blending the oligomer/polymer with the monomer/solvent. They are blended at weight ratios (monomer/solvent to oligomer/polymer) of 10:1, 5:1, and 1:1. If all three of these solutions are clear, then the oligomer/polymer is considered to be compatible with the monomer or solvent, and suitable to be used with the monomer or solvent. The oligomer or polymer may be dissolved in the monomer or the solvent, for ease of blending.

In particular embodiments, the seaming agent comprises (A) from about 20 wt % to about 99 wt % of at least one monomer with a molecular weight lower than 300 daltons (Da); (B) 0 to about 75 wt % of at least one oligomer or polymer with a molecular weight greater than 300 daltons (Da) and having good compatibility with the monomer; (C) up to about 15 wt % of a photoinitiator; and (D) 0 to about 50 wt % of a compatible organic solvent.

In some particular embodiments, the seaming agent comprises: (A) from about 20 wt % to about 99 wt % of at least one acrylic or methacrylic acid ester or amide or carbamate monomer having a molecular weight lower than 300 daltons (Da) and having good compatibility with the label film; (B) 0 to about 50 wt % of at least one acrylic or methacrylic acid ester or amide or carbamate or any other oligomer or polymer having a molecular weight greater than 300 daltons (Da) and having good compatibility with the monomer; (C) a photoinitiator; (D) 0 to about 40 wt % of a tackifying agent or polymer; (E) 0 to about 50 wt % of an organic solvent; and optionally (F) an adhesion promoter.

Examples of monomers with a molecular weight of less than 300 daltons that have a solubility parameter suitable for swelling the PS group; polyethylene terephthalate glycol-modified (PETG); and polyvinyl chloride (PVC) include tetrahydrofurfuryl acrylate (THFA). THFA has a molecular weight of 156.2 Da. Another example is an acrylic acid ester, hexanediol diacrylate, which has a molecular weight of ~226 Da, and is available commercially as MIRAMER M200. Cyclic trimethylolpropane formal acrylate (CTFA) is another suitable monomer, which has a molecular weight of 200 Da. More than one such monomer can be used in the seaming agent.

Examples of oligomers with a molecular weight of greater than 300 daltons include ethoxylated or propoxylated polyhydric alcohols such as MIRAMER M3130 and MIRAMER M600. MIRAMER M3130 is an acrylic acid ester, an ethoxylated trimethylolpropane triacrylate, and has a molecular weight of ~428 Da. MIRAMER M600 is an acrylic acid ester, dipentaerythritol hexaacrylate, and has a molecular weight of ~528 Da. More examples are polyvinyl butyral; oligomers of butyl acrylate; aliphatic polyesters; urethane acrylate; acrylated or methacrylated hyperbranched alcohols; ethoxylated diglycidyl ether of bisphenol A diacrylate; polyacrylates of hyperbranched alcohols; blends of urethane acrylate and monomer, such as Genomer 4188/EHA; blends of inert resin and monomer such as Genomer 6043/M22; hydroxypyvalylpivalate diacrylate (HPPDA); and dipentaerythritol pentaacrylate. More than one such oligomer can be used in the seaming agent.

Examples of monomers with a molecular weight of less than 300 daltons that have a solubility parameter suitable for swelling cyclic olefin polymers (COP) or cyclic olefin copolymers (COC) include isobornyl acrylate (IBOA) (208 Da); cyclohexyl acrylate (154 Da); hexyl acrylate (156 Da); and 4-tert-butylcyclohexyl acrylate (210 Da).

The photoinitiator used in the seaming agent is generally a free-radical generator. Upon absorption of radiation, the photoinitiator undergoes hemolytic cleavage to produce free radicals. Examples of photoinitiators suitable for the seaming agent include phosphine oxides such as diphenyl(2,4,6-trimethylbenzoyl) phosphine oxide (TPO); benzoin ethers; benzyl ketals; alkyl phenones; benzophenones; thioxanthones; titanocenes; and acetophenones such as hydroxyacetophenone. The photoinitiator can be present in amounts up to 10 wt % of the seaming agent, including from about 0.5 wt % to about 2 wt %. Examples of suitable photoinitiators are: 1-Hydroxycyclohexyl phenyl ketone (IRGACURE 184); 2,4,6-Trimethylbenzoyl-diphenyl-phosphineoxide (DAROCUR TPO); and phenyl bis(2,4,6-trimethylbenzoyl) phosphine oxide (IRGACURE 819). In some embodiments, an acrylated amine is also included along with the photoinitiator. This acrylated amine may be present in amount of about 0.2 wt % to about 2 wt % of the seaming agent. Examples of such acrylated amines include GENOMER 5142, which is an acrylated amine synergist.

Tackifying agents increase the tack (i.e. the stickiness of the surface) of the seaming agent. They are usually low-molecular weight compounds with high glass transition temperature. Examples of tackifying agents include rosins and their derivatives; terpenes and modified terpenes; aliphatic, cycloaliphatic and aromatic resins (C5 aliphatic resins, C9 aromatic resins, and C5/C9 aliphatic/aromatic resins); hydrogenated hydrocarbon resins and their mixtures; and terpene-phenol resins (TPR, used often with ethylene-vinyl acetate adhesives). Tackifying agents can be present in amounts up to about 40 wt % of the seaming agent. Desirably, however, very little if any tackifying agent is used. This is because the presence of tackifying agent reduces the amount of monomer/solvent available to swell the label film, which can weaken the resulting welded seam.

Examples of organic solvents which can be used in the seaming agent to swell COC or COP include aliphatic hydrocarbons such as n-pentene, octane, decane, decalin, or n-hexane; aromatic hydrocarbons such as benzene and benzene derivatives such as toluene; cycloaliphatic hydrocarbons such as cyclohexane and tert butyl cyclohexane; limonene; pinene; pine distillates; and turpentine. Examples of organic solvents which have a solubility parameter suitable for swelling PS, PETG, or PVC include ethers such as ditertbutyl ether, dimethoxyethane, 2-methoxyethyl ether, 1,4-dioxane, tetrahydrofuran (THF), morpholine, and the like; amides such as dimethylformamide, dimethylacetamide, N-methylpyrrolidone, 1,2-dimethyl-2-imidazolidinone, and the like; ketones such as acetone, 2-butanone, 2-pentanone, 3-pentanone, ethyl isopropyl ketone, methyl isobutyl ketone, diisobutyl ketone, and the like; halogenated hydrocarbons such as 1,1,2-trichloro ethane or 1,1,2,2-tetrachloro ethane, chloroform, or dichloromethane; halogenated alcohols; and esters. The organic solvent can be present in amounts up to about 50 wt % of the seaming agent, though it is usually much lower (e.g. less than about 30 wt %, less than 20 wt %, or less than 5 wt %).

Particular seaming agents are contemplated for use with specific high shrink wrap label film materials. In this regard, high shrink wrap labels can be made from many different materials. These materials include polyolefins such as a cyclic olefin polymer (COP) or a cyclic olefin copolymer (COC); the PS group previously defined; polyethylene terephthalate glycol-modified (PETG); and polyvinyl chloride (PVC); and blends containing one of these polymers. The label film can be a single-layer film or a multi-layer film. In the multi-layer film, the external layer is desirably compatible with the seaming agent.

When the high shrink wrap label comprises a polyolefin, the seaming agent may comprise an acrylic or methacrylic acid ester or amide or carbamate containing a cyclic hydrocarbon group (such as isobornyl acrylate); an acrylic or methacrylic acid ester or amide or carbamate containing a hydrocarbon having a maximum of 20 carbon atoms; or an acrylic or methacrylic acid ester or amide or carbamate containing an aromatic hydrocarbon or heterocyclic group having a maximum of 20 carbon atoms (such 4-tert-butyl-cyclohexyl acrylate). Examples of cyclic hydrocarbons, aromatic hydrocarbons, and heterocyclic groups that can be present in these esters/amides/carbamates include limonene, pinene, tert butyl cyclohexane, terpinene, monoterpenes, and alkylbenzenes The seaming agent can alternatively comprise terpene alcohols, fatty alcohols, fatty acid esters, and fatty acid amides, and terpenoids.

When the high shrink wrap label comprises a cyclic olefin polymer (COP) or a cyclic olefin copolymer (COC), the seaming agent may comprise a monomer selected from the group consisting of isobornyl acrylate, isobornyl methacrylate, cyclohexyl acrylate, ethyl hexyl acrylate, ethyl hexyl methacrylate, tert-butyl cyclohexyl acrylate, trimethyl cyclohexyl acrylate, alkyl acrylates, alkyl methacrylates, tricyclodecanedimethanol acrylate, styrene, vinyltoluene, benzyl acrylate, lauryl acrylate, isodecyl acrylate, phenoxy benzyl acrylate, ethoxylated aryl acrylate, alkylated phenyl acrylate, and phenyl acrylate. These monomers have a molecular weight lower than 300 daltons (Da).

Continuing, when the high shrink wrap label comprises a cyclic olefin polymer (COP) or a cyclic olefin copolymer (COC), the seaming agent may also comprise an oligomer or polymer selected from the group consisting of urethane acrylate, urethane methacrylate, acrylic esters of glycols or diols or polyhydric alcohols, acrylic or methacrylic esters of alkoxylated diols or polyols or polyhydric alcohols, oligomers of acrylic or methacrylic esters, polyvinylbutyral, hydrocarbon resins, polyterpenes, rosin derivatives, polyesters, polystyrene, styrene block copolymers, epoxy acrylates, epoxy methacrylates, phenoxy resins, and acrylated or methacrylated dendritic alcohols, ethoxylated diglycidyl ether of bisphenol A diacrylate; polyacrylates of hyperbranched alcohols; blends of urethane acrylate and monomer, such as Genomer 4188/EHA; and blends of inert resin and monomer such as Genomer 6043/M22. The oligomer or polymer may be dissolved in the monomer or the solvent, for ease of blending.

When the high shrink wrap label comprises a cyclic olefin polymer (COP) or a cyclic olefin copolymer (COC), the seaming agent may also comprise a solvent selected from the group consisting of a linear or cyclic or aromatic hydrocarbon having a maximum of 20 carbon atoms, a heterocyclic compound, a terpene alcohol, an alkyl ester, an alkyl amide, cycloaliphatic hydrocarbons, aliphatic hydrocarbons, turpentines, isoparaffins, and paraffins. Examples of suitable hydrocarbons include limonene, pinene, cyclohexane, decane, pentane, alkyl cyclohexane, decalin, xylene, and toluene.

In particular specific embodiments for COP or COC films, the seaming agent may comprise: from about 25 wt % to about 98 wt % of at least one monomer; from 0 to about 50 wt % of at least one oligomer; 0 to about 50 wt % of an organic solvent; and from about 0.5 wt % to about 15 wt % of a photoinitiator. These components should be selected from the list of appropriate molecules provided above.

In other specific embodiments for COP or COC films, the seaming agent may comprise: from about 20 wt % to about 98 wt % of a monomer; from 0 wt % to about 45 wt % of an oligomer or polymer; from 0 wt % to about 30 wt % of an organic solvent; from about 1 wt % to about 15 wt % of a photoinitiator; and from 0 wt % to about 20 wt % of a tackifying agent. This seaming agent is especially useful when the high shrink wrap label shrinks more than 25%, but less than 75%. These components should be selected from the list of appropriate molecules provided above for COP and COC films. Seams made with seaming agents according to these specific embodiments will have a seam quality of 2, 3, or 4 (as defined above). Desirably, the monomers and/or solvents dissolve the label film within a period of about 0.5 seconds or less, or about 0.2 seconds or less, or about 0.1 seconds or less, or about 0.06 seconds or less.

In other specific embodiments for COP or COC films, the seaming agent may comprise: from about 20 wt % to about 98 wt % of a monomer; from 0 wt % to about 45 wt % of an oligomer or polymer; from 0 wt % to about 25 wt % of an organic solvent; from about 1 wt % to about 15 wt % of a photoinitiator; and from 0 wt % to about 20 wt % of a tackifying agent. This seaming agent is especially useful when the high shrink wrap label shrinks more than 25%, but less than 50%. These components should be selected from the list of appropriate molecules provided above for COP and COC films. Seams made with seaming agents according to these specific embodiments will have a seam quality of 2, 3, or 4 (as defined above). Desirably, the monomers and/or solvents dissolve the label film within a period of about 0.5 seconds or less, or about 0.2 seconds or less, or about 0.1 seconds or less, or about 0.06 seconds or less.

In other specific embodiments for COP or COC films, the seaming agent may comprise: from about 20 wt % to about 98 wt % of a monomer; from 0 wt % to about 45 wt % of an oligomer or polymer; from 0 wt % to about 15 wt % of an organic solvent; from about 1 wt % to about 15 wt % of a photoinitiator; and from 0 wt % to about 20 wt % of a tackifying agent. This seaming agent is especially useful when the high shrink wrap label shrinks more than 25%, but less than 40%. These components should be selected from the list of appropriate molecules provided above for COP and COC films. Seams made with seaming agents according to these specific embodiments will have a seam quality of 2, 3, or 4 (as defined above). Desirably, the monomers and/or solvents dissolve the label film within a period of about 0.5 seconds or less, or about 0.2 seconds or less, or about 0.1 seconds or less, or about 0.06 seconds or less.

For high shrink wrap labels that comprise polymers in the PS group previously defined, polyethylene terephthalate glycol-modified (PETG), or polyvinyl chloride (PVC), the seaming agent may comprise a monomer that is an acrylic or methacrylic ester, amide, or carbamate having (a) a cyclic ether containing group, such as tetrahydrofurfuryl or dioxane; or (b) an ethoxylated or propoxylated aromatic or aliphatic or cycloaliphatic group, such as alkoxylated phenyl acrylate, ethoxylated glycerol, or ethoxylated trimethylolpropane. The seaming agent can alternatively comprise a monomer that is (c) a monoacrylate or diacrylate or triacrylate or polyacrylate or methacrylate of an alkyl diol or polyol, including hyperbranched alcohols, such as hexanediol diacrylate, butanediol diacrylate, neopentyl glycol diacrylate, or trimethylolpropane mono- or di- or tri-acrylate; (d) a vinyl lactam; (e) an acrylamide or methacrylamide; (f) vinyl pyrrolidone or a similar nitrogen heterocyclic unsaturated monomer; (g) a vinyl morpholine; (h) a lactone or lactam having an acrylate, methacrylate, or vinyl group; (i) a phenyl or alkyl phenol acrylate or methacrylate; (j) an ethoxylated or propoxylated phenyl or alkyl phenol acrylate or methacrylate; (k) a mono- or di- or tri-hydroxyl acid acrylate or methacrylate; (l) an urethane acrylate or methacrylate; (m) an allyl ether; (n) a vinyl ester; (o) a mono-, di-, tri-, tetra-, or poly-acrylate or -methacrylate of a polyhydric alcohol, including an ethoxylated or propoxylated polyhydric alcohol; or (p) 2-(2-ethoxyethoxy)ethyl acrylate (EOEOEA).

Examples of such monomers that can be used with PS, PETG, or PVC films are: tetrahydrofurfuryl acrylate (THFA) or caprolactone-modified THFA; cyclic trimethylol propane formal acrylate (CTFA); isobornyl acrylate; isobornyl methacrylate; alkoxylated phenyl acrylate; hexanediol diacrylate; butanediol diacrylate; butanediol dimethacrylates; alkoxylated aliphatic or cycloaliphatic diol diacrylate or dimethacrylate; acrylamide and derivatives thereof; hydroxyethyl acrylate or methacrylate; hydroxypropyl acrylate or methacrylate; acryloyl morpholine; vinyl pyrrolidone; and tricyclodecanedimethanol diacrylate (TCDDA); ethoxylated cyclohexane dimethanol diacrylate (EO-CHMDA); hydroxy pivalic acid neopentyl glycol diacrylate or caprolactone-modified hydroxy pivalic acid neopentyl glycol diacrylate, hydroxypyvalyl pivalate diacrylate (HPPDA), and caprolactone acrylate. These monomers have a molecular weight lower than 300 daltons (Da).

The seaming agent for PS, PETG, or PVC films may also comprise an oligomer or polymer selected from the group consisting of urethane acrylate; urethane methacrylate; acrylic or methacrylic esters of glycols or diols or polyhydric alcohols (for example acrylic esters of pentaerythritol); acrylic or methacrylic esters of alkoxylated diols or polyols or polyhydric alcohols (for example ethoxylated trimethylolpropane triacrylate, ethoxylated glycerine triacrylate, ethoxylated dipentaerythritol hexaacrylate); oligomers and polymers of acrylic esters or amides; polyvinylbutyral; hydrocarbon resins; polyterpenes; rosin derivatives including esters of rosin; polyesters (especially low Tg grades, such as ADCOTE resins by Dow, or VITEL resins by Bostik); epoxy resins (for example EPON resins by Resolution); epoxy acrylates; and epoxy methacrylates; phenoxy resins; a resin containing a diglycidyl ether of bisphenol-A; polystyrene; styrene block copolymers or terpolymers; terpene phenols; polyester acrylates or methacrylates; polyurethane; polyesteramide; and polymers of acrylic or methacrylic acids or esters or amides (including copolymers and terpolymers thereof); and polyvinyl chloride. The oligomer or polymer may be dissolved in the monomer or the solvent, for ease of blending.

The seaming agent used for PS, PETG, or PVC may comprise a solvent selected from the group consisting of ethers, cyclic ethers, esters, amides, glycol ethers, ketones, aromatics such as toluene, halogenated alcohols, and halogenated hydrocarbons.

In specific embodiments that use PS, PETG, or PVC films for the label, the seaming agent may comprise: from about 25 wt % to about 98 wt % of a monomer; from 0 to about 75 wt % of an oligomer or polymer; 0 to about 50 wt % of an organic solvent; and from about 0.5 wt % to about 15 wt % of a photoinitiator. These components should be selected from the list of appropriate molecules provided above for PS, PETG, and PVC films. Seams made with seaming agents according to these specific embodiments will have a seam quality of 2, 3, or 4. Desirably, the monomers and/or solvents dissolve the label film within a period of about 0.5 seconds or less, or about 0.2 seconds or less, or about 0.1 seconds or less, or about 0.06 seconds or less.

In other embodiments that use PS, PETG, or PVC films for the label, the seaming agent may comprise: from about 15 wt % to about 90 wt % of a monomer; 0 to about 75 wt % of an oligomer or polymer; 0 to about 20 wt % of an organic solvent; from about 0.5 wt % to about 15 wt % of a photoinitiator; and 0 to about 20 wt % of a tackifying agent. This seaming agent is especially useful when the high shrink wrap label shrinks more than 25%, but less than 50%. These components should be selected from the list of appropriate molecules provided above for PS, PETG, and PVC films. Seams made with seaming agents according to these specific embodiments will have a seam quality of 2, 3, or 4 (as defined above). Desirably, the monomers and/or solvents dissolve the label film within a period of about 0.5 seconds or less, or about 0.2 seconds or less, or about 0.1 seconds or less, or about 0.06 seconds or less.

In other embodiments that use PS, PETG, or PVC films for the label, the seaming agent may comprise: from about 10 wt % to about 90 wt % of a monomer; from 0 wt % to about 80 wt % of an oligomer or polymer; 0 to about 10 wt % of an organic solvent; from about 0.5 wt % to about 15 wt % of a photoinitiator; and 0 to about 20 wt % of a tackifying agent. This seaming agent is especially useful when the high shrink wrap label shrinks more than 25%, but less than 40%. These components should be selected from the list of appropriate molecules provided above for PS, PETG, and PVC films. Seams made with seaming agents according to these specific embodiments will have a seam quality of 2, 3, or 4 (as defined above). Desirably, the monomers and/or solvents dissolve the label film within a period of about 0.5 seconds or less, or about 0.2 seconds or less, or about 0.1 seconds or less, or about 0.06 seconds or less.

In still further embodiments that use PS, PETG, or PVC films for the label, the seaming agent comprises: from about 40 wt % to about 98 wt % of at least one monomer having a molecular weight of less than 300 Da; from about 14 wt % to about 59 wt % of at least one oligomer or polymer having a molecular weight of greater than 300 Da; from about 0.5 wt % to about 2 wt % of a photoinitiator; and from about 0.2 wt % to about 2 wt % of an acrylated amine.

Desirably, the monomer(s) and oligomer(s) are acrylic or methacrylic acid esters or amides or carbamates; or are alkyl diol or polyol diacrylates or dimethacrylates; or are polyacrylates of a polyhydric alcohol. Often, a blend of inert resin and monomer is present.

In still more specific embodiments, the seaming agent comprises: from about 40 wt % to about 50 wt % of cyclic trimethylolpropane formal acrylate; from about 25 wt % to about 35 wt % of either hexanediol diacrylate or hydroxypyvalylpivalate diacrylate; from about 6 wt % to about 12 wt % of dipentaerythritol pentaacrylate and/or dipentaerythritol hexaacrylate; from about 8 wt % to about 12 wt % of a blend of inert resin and monomer (e.g. GENOMER 6043/M22); from about 0.5 wt % to about 2 wt % of a photoinitiator; and from about 0.2 wt % to about 2 wt % of an acrylated amine.

Generally, regardless of the film type, the seaming agent desirably contains as little solvent as possible. Ideally, the seaming agent contains less than 15 wt % of solvent, and more preferably less than 10%. This is for the same reasons that solvent bonding is hazardous in TD and RFS high shrink label processes. Because the solvent has to evaporate before the welded seam can develop its full strength, this reduces the speed of the label wrapping operation. In addition, solvents have low flashpoints, with consequent implications for safety, fire regulation, VOC control, etc. Solvent can potentially migrate into the container. Finally, solvents usually have a narrow operating window—too much solvent causes whitening or haze in the seam, but too little solvent results in holes in the seam. Desirably, the monomer dissolves the label film. For example, isobornyl acrylate (IBOA) and tetrahydrofurfuryl acrylate (THFA) both have flashpoints over 100° C. In desirable embodiments, the seaming agents of the present disclosure have a volatile organic content (VOC) of about 50 wt % or less, including about 25 wt % or less, about 20 wt % or less, about 10 wt % or less, and about 2 wt % or less, and zero wt % VOC.

The seaming agent should have a viscosity of at least 1 centipoise (cPs), including at least 5 cPs, or from about 10 cPs to about 1000 cPs, or from about 5 cP to about 300 cP, or from about 10 cPs to about 450 cPs, or from about 10 cPs to about 300 cPs, or from about 10 cPs to about 250 cPs, or below 250 cPs, or below 200 cPs, when measured at any temperature between ambient temperature and about 60° C. This low viscosity allows the seam area to be completely filled in less than about 0.5 seconds (the typical time available for seam in a high speed bottling process), so no voids are present even in unsupported areas on curved containers, and the edges of the seam are completely wetted so that curling is avoided, without the solvent bleeding out of the seam area. The minimum viscosity for the seaming agent is 1 cPs.

The seaming agent combines the ability to swell and dissolve the film of the high shrink wrap label (permitting welding) within less than 0.5 seconds with the ability to polymerize when exposed to radiation. The radiation exposure causes crosslinking and strengthens the mixed seaming agent with the dissolved polymer of the film of the label, so that a welded seam is formed. The bonding of the two edges of the high shrink wrap label is due to co-diffusion of the seaming agent and the film, and is very strong and able to withstand the shrink forces associated with high shrinkage, as well as the heat and humidity of the shrink tunnel. In contrast, with conventional processes, the bonding of the two edges of the label is due to the adhesive layer between them, which is based only on cohesive forces. The adhesive-label interface is weak, and can be easily broken by the shrink forces combined with the heat and humidity of the shrink tunnel.

Each film material for the label has its own compatible seaming agents. This contrasts with conventional processes where a film-agnostic glue is applied that acts as a layer joining two layers of the label (i.e. the leading edge and the trailing edge) together.

Seams from heat-shrunken labels can be tested to determine whether the seam has been welded according to the present disclosure. A strip of the label is removed from a container. The strip should contain the seam itself, along with 5 mm from each side of the seam. As much of the ink as possible should be removed from the strip. For example, the interior and exterior surfaces of the strip can be polished with a slurry of $CeO_2$ (Cerium oxide) in ethanol until all ink from the label is removed. The strip is then rinsed with ethanol and dried with hot air. The seam is then opened to expose its inner surfaces. The sample is then placed in a closed container and heated to a temperature of 200° C. This is done to de-polymerize or cleave the molecules in the seam into volatile (i.e. gas phase) fragments. The volatile fragments are collected and analyzed to determine various properties (e.g. identity, molecular mass, elution time in a column) by gas chromatography, mass spectrometer, and the like. These results can then be compared to a library of "fingerprints" to identify seaming agents according to the present disclosure.

If further desired to reduce false hits, a piece of the label/film which is not a part of the welded seam can also be cleaned to remove any ink or coating, dried to remove volatiles, heated to a temperature of 200° C. to obtain a gas phase derived from the film; and the gas phase derived from the film can be collected and analyzed. This signal derived from the film can be subtracted from the signal derived from the seam to further identify the at least three different signature molecules. Generally, the common materials in the seam and in the label/film should be eliminated to obtain a cleaner signal that can be used to identify whether three signature molecules are present.

It has been found that the gas phase derived from the seam will comprise at least three different signature molecules that each (A) have a molecular weight of 230 Da or less, (B) have an aliphatic alkane or alkene backbone containing at least three carbon atoms, (C) contain only one or two acid groups, only one or two ester groups, only one aldehyde group, or only one epoxide group, and (D) do not contain any aromatic, cyclic, or heterocyclic groups. Please note that requirement (C) should be interpreted as permitting the presence of only one or two of the named group, and would not permit the presence of three of the named group. For example, a molecule having three acid groups or two epoxide groups would not be considered as meeting requirement (C). However, requirement (C) does permit the presence of multiple listed groups. For example, a molecule having two acid groups and two ester groups would be considered to meet requirement (C).

It has also been found that in many instances, at least one of the at least three different signature molecules contains an acrylate group, or is a fatty acid alkyl ester, or is an alkyl aldehyde. Examples of signature molecules include hexamethylene diacrylate; tetradecanal; tridecyl oxirane; 1-butanol-3-methyl acetate; 4-pentenal. Examples of molecules that would not be considered signature molecules include decane and 3-hexanol (do not contain any acid, ester, aldehyde, or epoxide groups); and benzoic acid (contains an aromatic group).

EXAMPLES

The following examples are for purposes of further illustrating the present disclosure. The examples are merely illustrative and are not intended to limit the disclosure to the methods, materials, conditions, or process parameters set forth therein.

Example 1

FIGS. 5-11 are pictures/photographs illustrating a test of the methods of the present disclosure. A high shrink wrap label is wrapped around a mandrel to simulate the methods.

Figure 5:
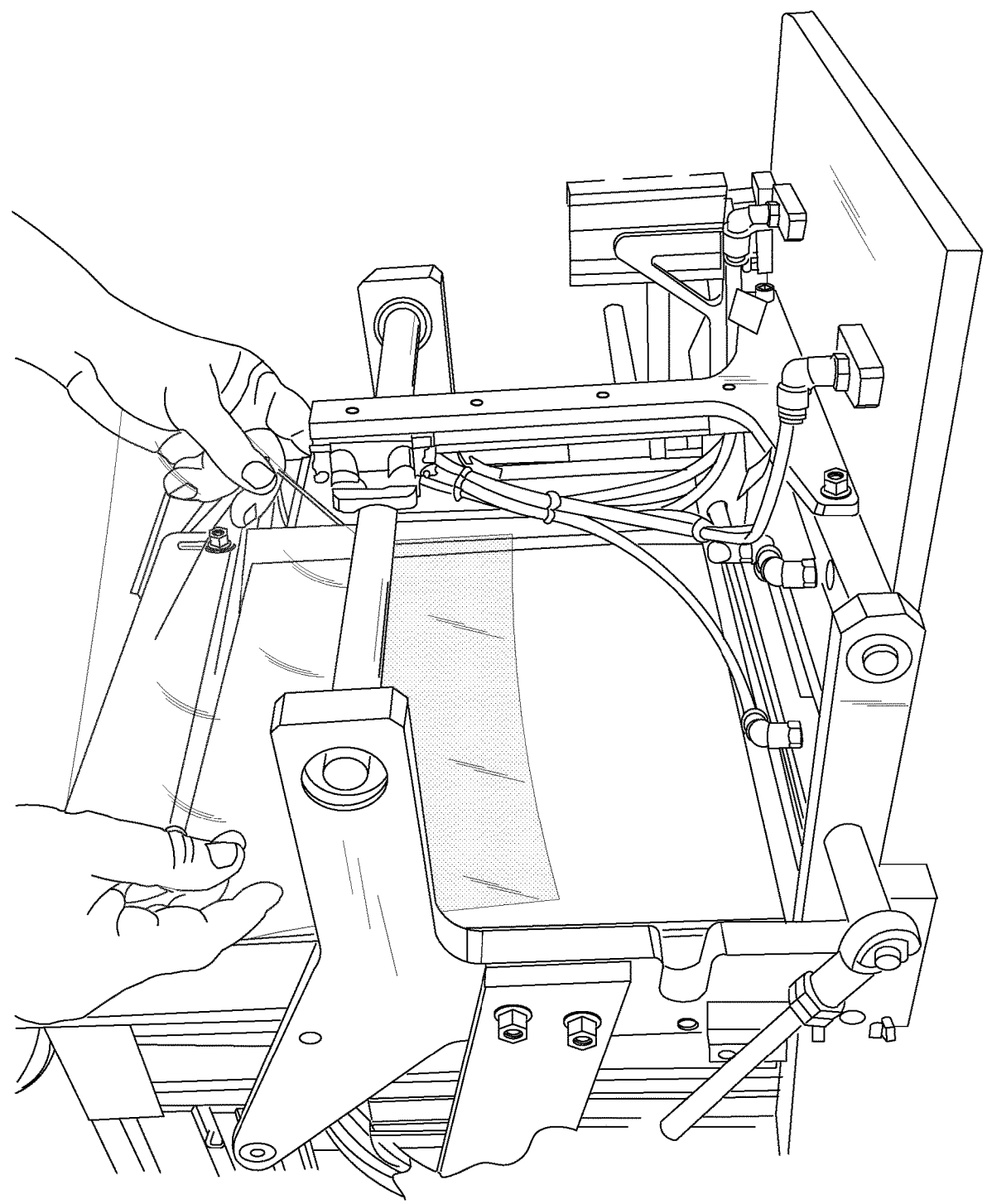
FIG. 5 is a first picture illustrating a test of the present disclosure. A label is cut from a roll. The label is placed on a vacuum plate, which simulates a vacuum drum on roll fed machine.

FIG. 5 is a first picture of the test. The label is placed on a vacuum plate. The vacuum plate simulates the vacuum drum on a roll fed machine.

Figure 6:
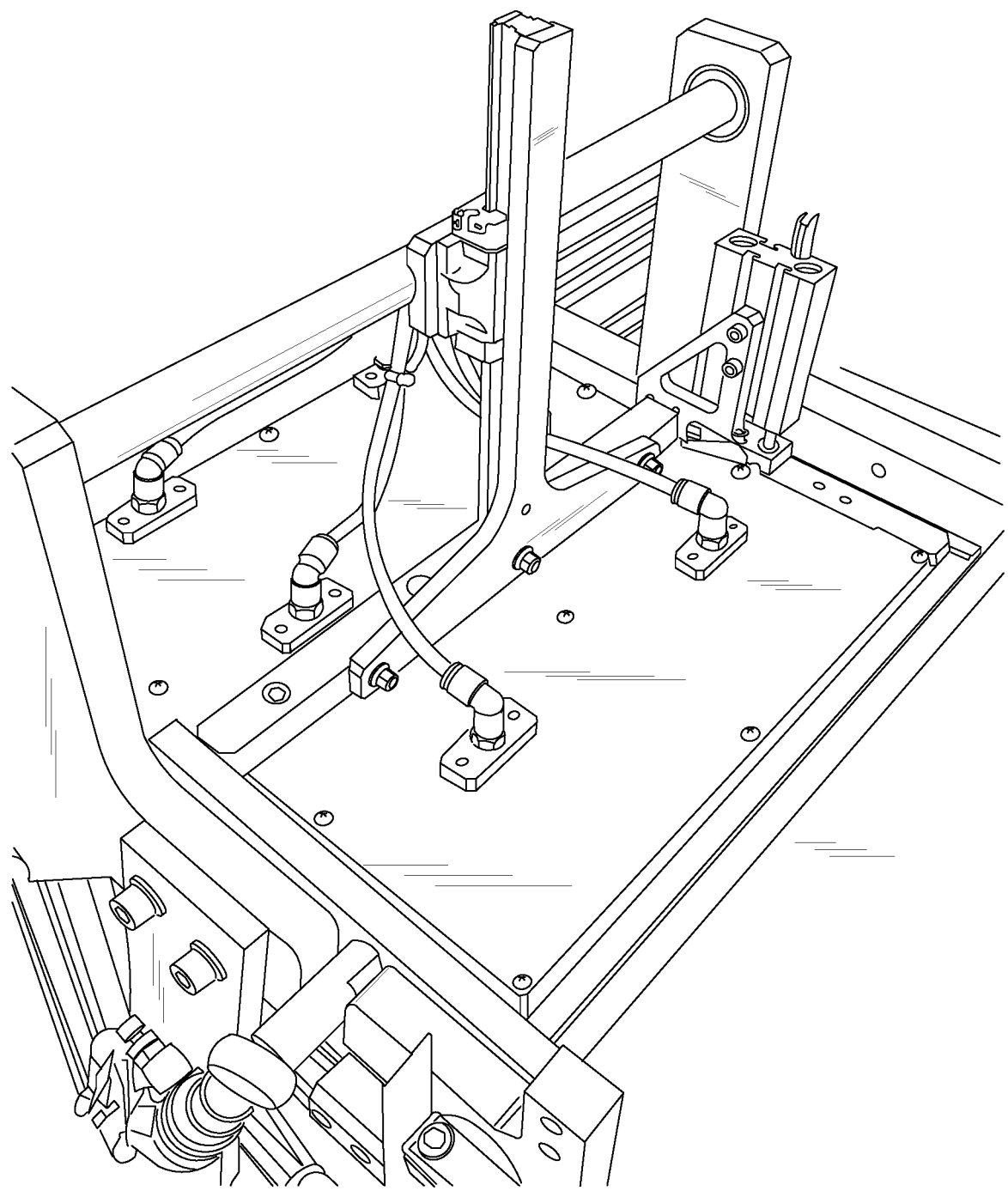
FIG. 6 is a second picture of the test. The label is picked up by the vacuum plate.

FIG. 6 is a second picture of the test. The label is picked by the vacuum plate.

Figure 7:
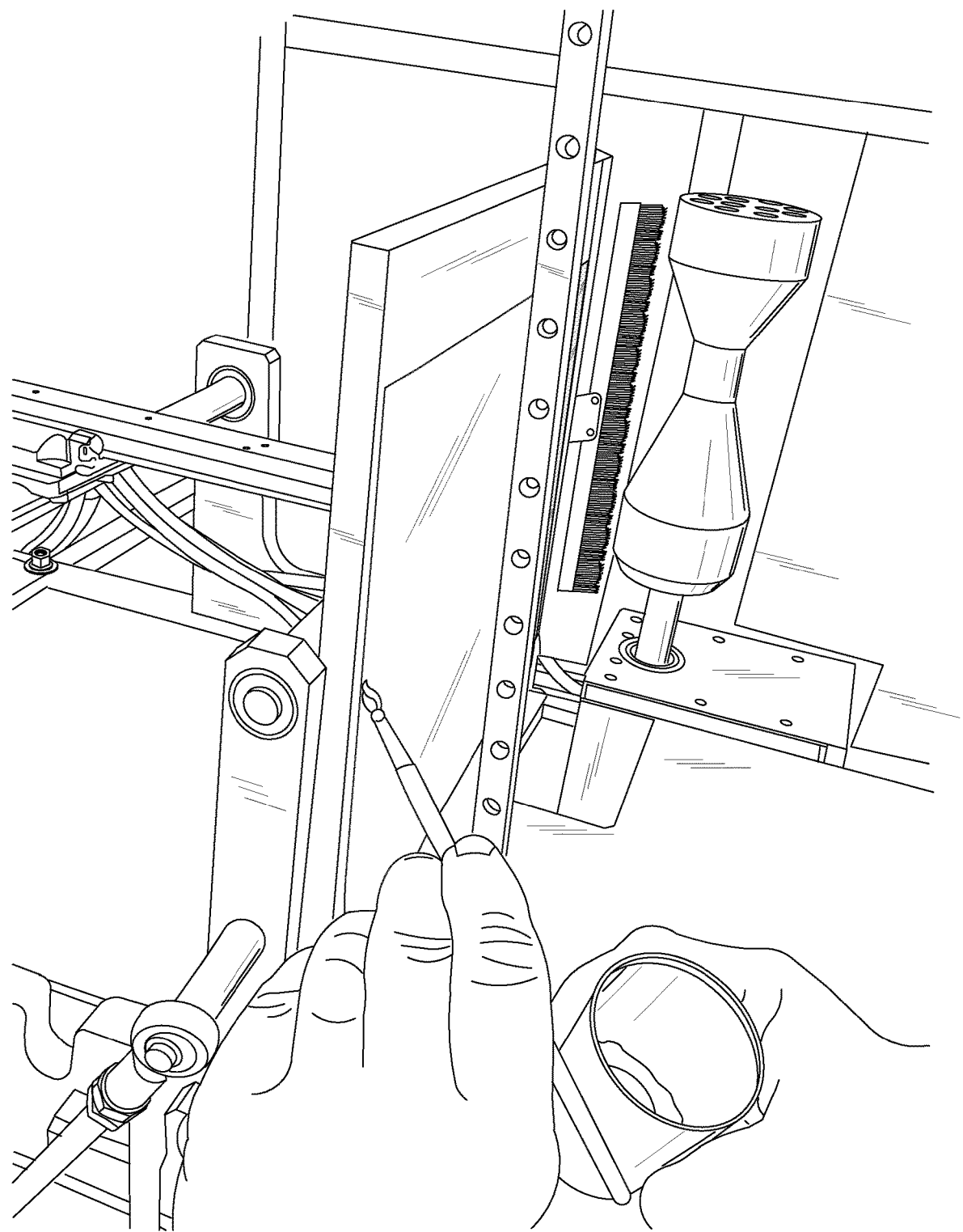
FIG. 7 is a third picture of the test. The seaming agent is applied on the trailing edge by a 6 mm wide brush, calibrated to apply about 0.2 mg to about 2 mg seaming agent per square centimeter of the seam.

FIG. 7 is a third picture of the test. Seaming agent is applied on trailing edge by 6 mm wide brush, calibrated to apply 0.2-2 mg seaming agent per square centimeter seam.

Figure 8:
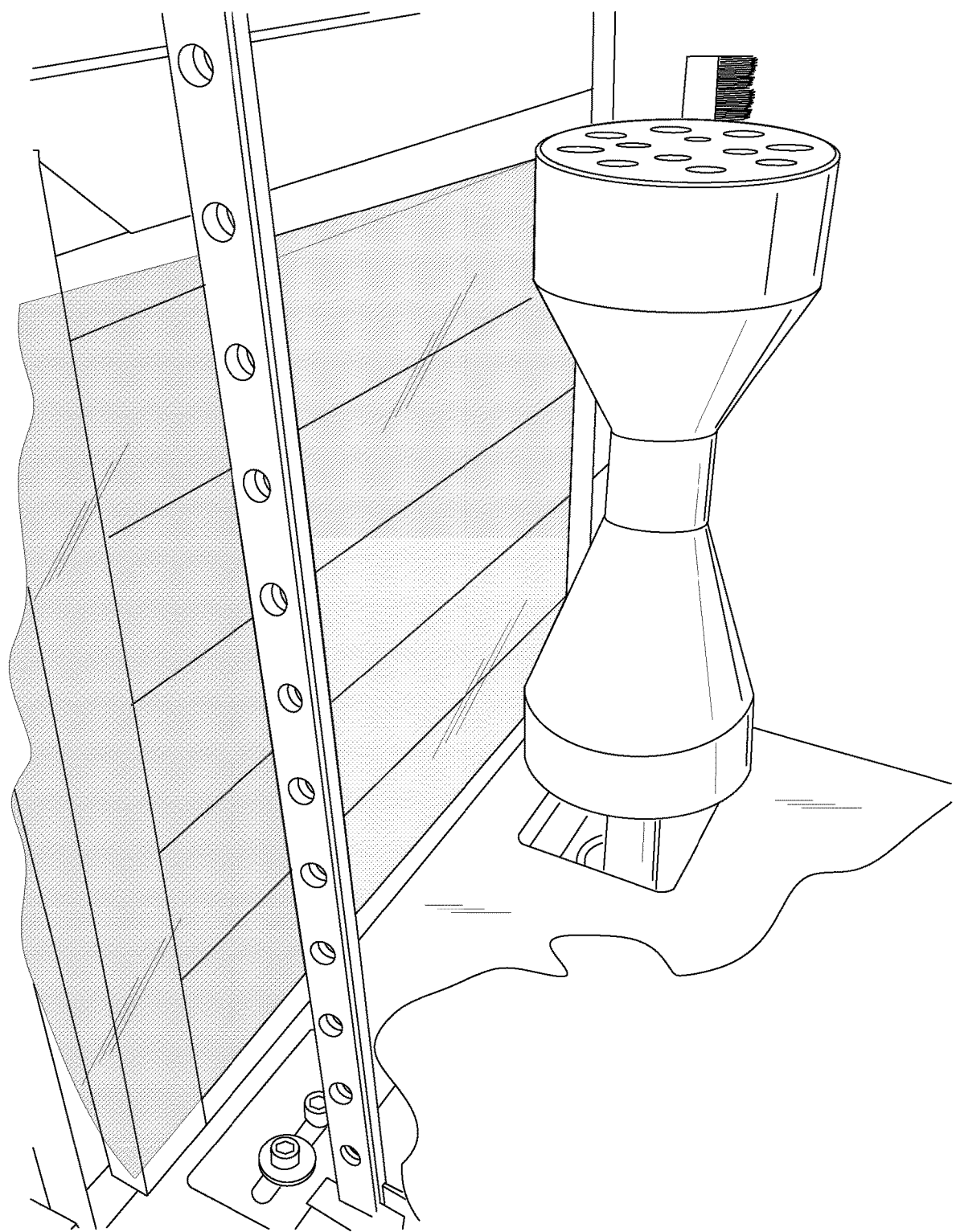
FIG. 8 is a fourth picture of the test. Two dots of tacky low melting point pressure sensitive adhesive (pick-up glue) were deposited on the top and bottom parts of the leading edge of the label. A curved mandrel was then pressed against the leading edge of the label, simulating a ramp on the vacuum drum that presses the pick-up glue onto the roll fed machine. The curved mandrel simulates a curved container.

FIG. 8 is a fourth picture of the test, showing a curved mandrel pressed against the leading edge of the label, simulating the ramp on the vacuum drum pressing the pick-up glue on the roll fed machine. (The mandrel is as illustrated in FIG. 3.) The curved mandrel simulates a curved container. The dimensions of this mandrel (total height of 260 mm, portion of height being unsupported is 170 mm), as well as the shrinkage ratio, are more challenging than typical containers. Two dots of tacky low melting point pressure sensitive adhesive (pick-up glue) were deposited on top and bottom parts of leading edge of label.

Figure 9:
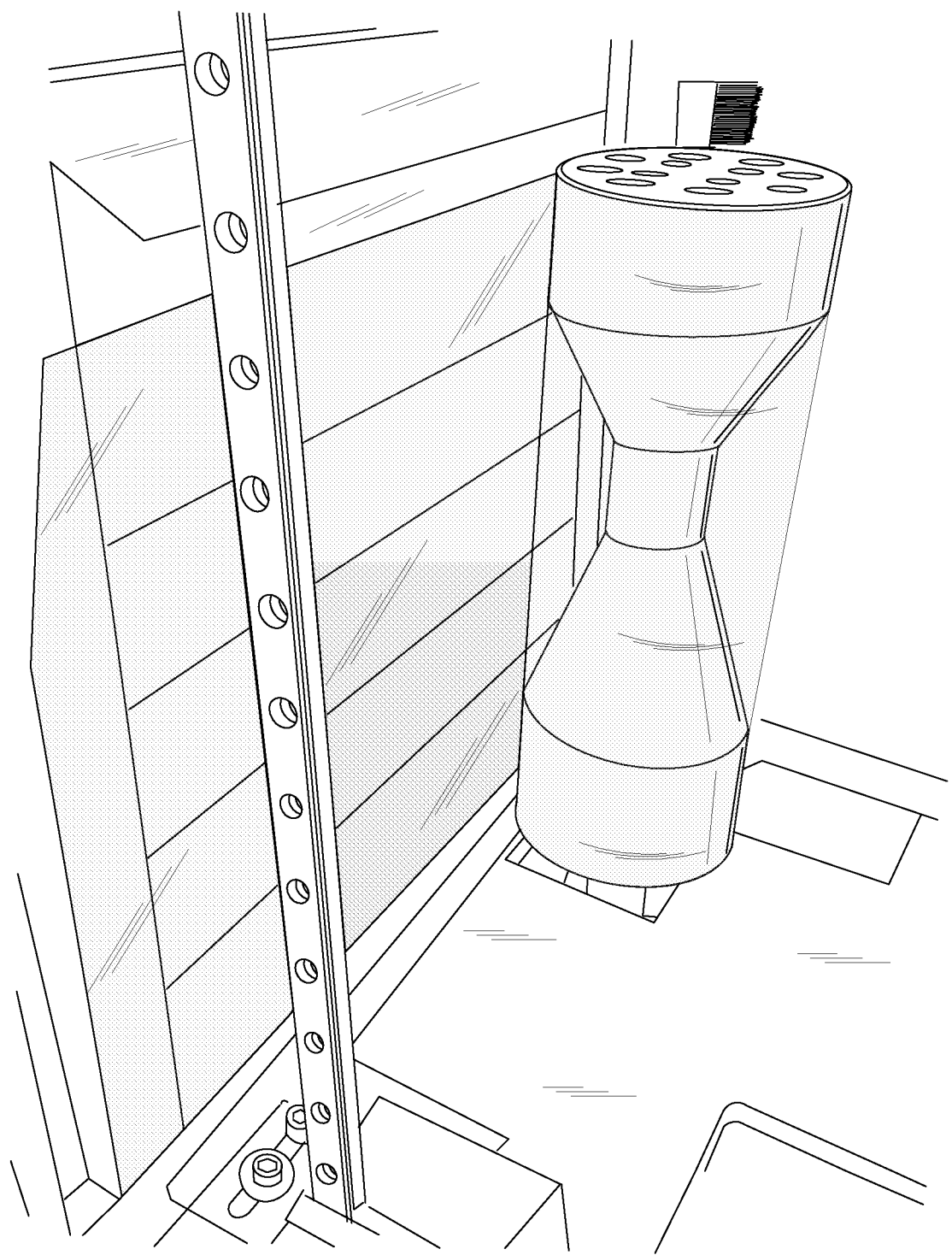
FIG. 9 is a fifth picture of the test, showing the label wrapped around the mandrel. The trailing edge overlaps the leading edge, and the seaming agent seals the seam, forming a clear, straight and low-flaw seam formed via a zipper mechanism as discussed above.

FIG. 9 is a fifth picture of the test, showing the label wrapped around the mandrel. The trailing edge is overlapping the leading edge, and the seaming agent has welded the seam into a good seam with a seam quality of at least 2.

Figure 10:
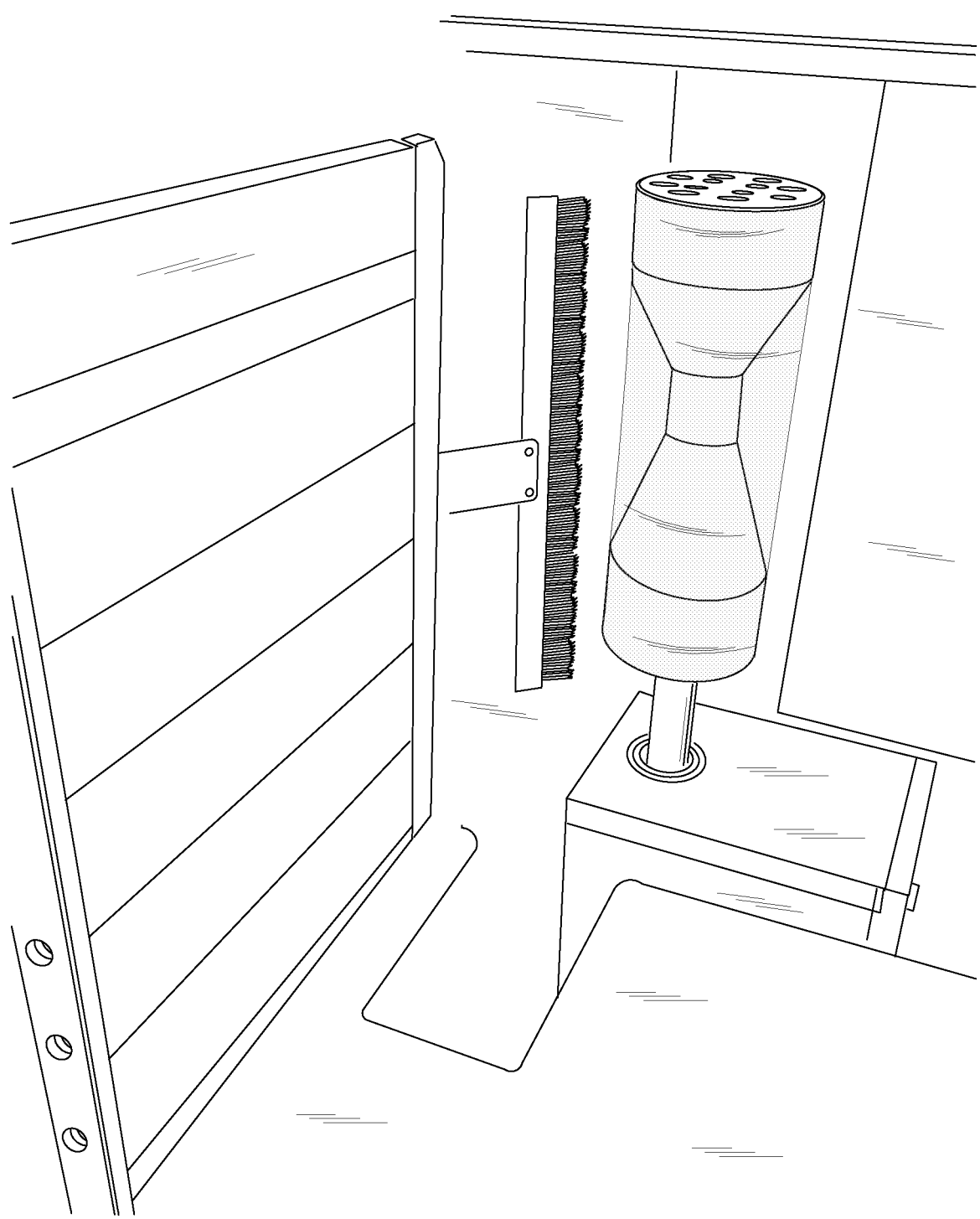
FIG. 10 is a sixth picture of the test, showing the label ready to enter the radiation curing chamber, simulating a radiation curing tunnel.

FIG. 10 is a sixth picture of the test, showing the label being ready to enter the radiation curing chamber, simulating a radiation curing tunnel.

Figure 11:
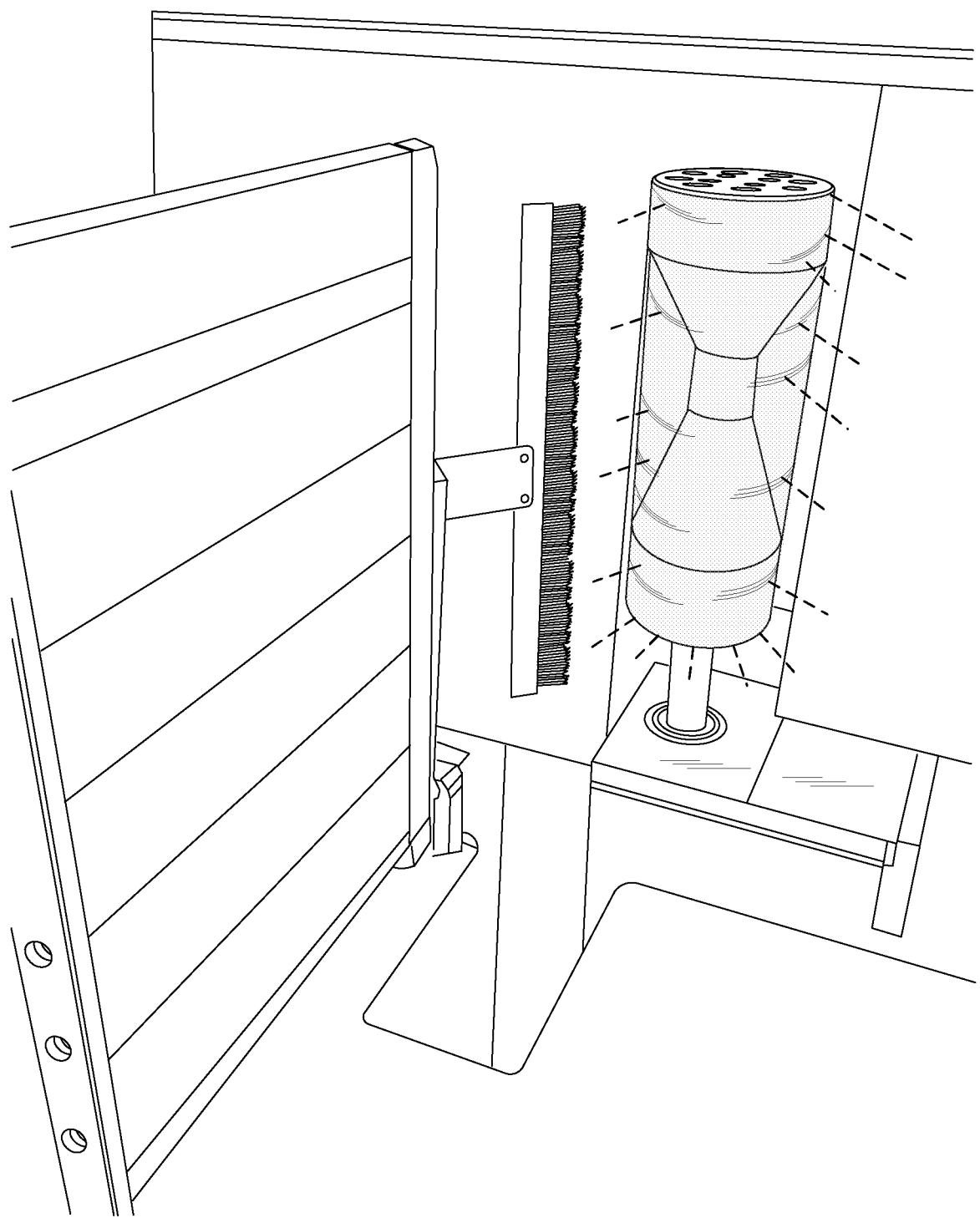
FIG. 11 is a seventh picture of the test, showing the label being exposed to radiation in the curing chamber, simulating a radiation curing tunnel.

FIG. 11 is a seventh picture of the test, showing the label being exposed to radiation in the curing chamber, simulating a radiation curing tunnel.

The mandrel, with the high shrink wrap label wrapped around it, is then removed from the radiation curing chamber. The label is then shrunken using steam at 95° C. to 100° C. for a period of 6 to 12 seconds.

Example 2

Eight different seaming agents E1-E8 were tested for their ability to weld different materials, and for their immediate welding strength, as well as to provide a seam with a seam quality of at least 2 after heat shrinkage at 0-60% shrinkage. They were made with varying amounts of MIRAMER M200, MIRAMER M600, MIRAMER M3130, tetrahydrofurfuryl acrylate (THFA), isobornyl acrylate (IBOA), and GENOMER 6043/M22 (a blend of monomer and saturated polyester blend of oligomers and polymers).

MIRAMER M200 is a semi-polar difunctional monomer (Hexanediol diacrylate) manufactured by Rahn with very low viscosity (6-12 cPs at 23° C. and low molecular weight of 226 Da). MIRAMER M200 has good compatibility with PVC and PS, is partially compatible with PETG, and is incompatible with COC.

MIRAMER M600 manufactured by Rahn is a semi-polar hexafunctional oligomer (dipentaerythritol hexaacrylate) with high viscosity (4000-7000 cPs at 23° C.) and molecular weight of 578 Da. It is useful for controlling cross-linking density, curing speed, and as a barrier to diffusion of monomers and solvents into the film, and is thus useful for reducing haze.

MIRAMER M3130 is a trifunctional oligomer (Trimethylolpropane (EO)n Triacrylate) with medium polarity and medium viscosity (viscosity 50-70 cPs at 23° C. and molecular weight of 428 Da). It is useful for controlling cross-linking density, curing speed, and as a barrier to diffusion of monomers and solvents into the film, and is thus useful for reducing haze.

THFA is a very polar monofunctional monomer with very low viscosity (viscosity 3-12 cPs at 23° C. and molecular weight of 156 Da). THFA has good compatibility with PETG, PVC, and PS, but is incompatible with COC. It is very efficient in providing immediate welding strength and allows swelling of the label and mixing of label molecules with the seaming agent in the interface. However, due to its low molecular weight, it may attack the film during seam formation, even in time periods as short as less than 0.5 seconds, and cause loss of clarity (a hazy and milky film).

Isobornyl acrylate (IBOA) is a non-polar monomer with low viscosity (viscosity 5-15 cPs at 23° C. and molecular weight of 208 Da). IBOA has good compatibility with COC, has some compatibility with PS, and is incompatible with PVC and PETG.

GENOMER 6043/M22 is a blend of urethane acrylate monomer with a thermoplastic polyester resin. It has very high viscosity (30,000 cPs at 23° C.) and is useful as a viscosity adjuster and as a diffusion suppressor to avoid haze in the film during seaming\. It is useful for adjusting cross-linking density (a greater amount of 6043/M22 will soften the cross-linked polymeric matrix and avoid cracks in the seam during shrinkage), and curing speed. It will also act as a barrier to diffusion of monomers and solvents into the film, and thus is useful for reducing haze.

TPO was used as a photoinitiator. This photoinitiator is useful for this application because it absorbs energy not only at 365 nm (like most photoinitiators), but also at 395-430 nm. This is important for three reasons. First, at wavelengths greater than 365 nm, ozone is not generated. This is an important factor because ozone is corrosive and harmful. Second, irradiation at these wavelengths is less harmful to humans. Finally, irradiation at these wavelengths penetrates through aromatic films such as PS and PETG, while shorter wavelengths are blocked.

The solvent used was THF or limonene. THF (Tetrahydrofuran, viscosity 0.48 cPs at 23° C., molecular weight 72 Da) is a very polar solvent, and is suitable for swelling of PVC, PS, and PETG, but is incompatible with COC. Limonene is a hydrocarbon solvent (viscosity 0.9 cPs at 23° C., molecular weight 136 Da) that is compatible with COC but incompatible with PVC, PETG and PS. These solvents are flammable, but surprisingly, when blended with monomers and oligomers according to the present disclosure, the flammability of the seaming agent is more like the flammability of the monomers and oligomers, and the influence of solvent on flammability is minor.

Information on the Examples are listed in Table 1 below.

TABLE 1

| Ingredient | δ (MPa$^{1/2}$) | E1 | E2 | E3 | E4 | E5 | E6 | E7 | E8 |
|---|---|---|---|---|---|---|---|---|---|
| M200 monomer (g) | 17-18 | 1.5 | 1.5 | 1.5 | 1.5 | 1.5 | 1.5 | 1.5 | 1.5 |
| M600 oligomer (g) | | 3.7 | 5.4 | 7.4 | 3.7 | 3.7 | 7.4 | 7.4 | 7.4 |
| M3130 oligomer (g) | | 3.7 | 5.4 | — | 3.7 | 3.7 | — | — | — |
| THFA monomer (g) | 19 | 5.5 | 5.5 | — | 5.5 | 5.5 | — | — | — |
| 6043/M22 oligomer(g) | | 1.3 | 5.0 | 1.3 | 1.3 | 1.3 | 1.3 | 6.0 | 1.3 |
| TPO photoinitiator (g) | | 0.6 | 0.6 | 0.6 | 0.6 | 0.6 | 0.6 | 0.6 | 0.6 |
| IBOA monomer (g) | 18.8 | — | — | 5.5 | — | — | 5.5 | 5.5 | 5.5 |
| THF solvent (g) | 19.4-19.5 | — | — | — | 1.6 | 3.2 | — | — | — |
| Limonene solvent (g) | 16-17 | — | — | — | — | — | 3.0 | 3.0 | 5.5 |
| wt % solvent | | — | — | — | 9.0 | 16.5 | 15.6 | 12.5 | 25.3 |
| wt % monomer | | 33.9 | 23.6 | 34.0 | 30.9 | 28.3 | 28.6 | 23.0 | 25.3 |
| wt % oligomer | | 62.7 | 74.1 | 62.7 | 57.1 | 52.4 | 52.9 | 62.2 | 46.8 |

E1 was measured as having a viscosity at room temperature of 25 to 30 cPs, and a viscosity at 60° C. of 11 to 13 cPs.

E2 was measured as having a viscosity at room temperature of 90 to 120 cPs, and a viscosity at 60° C. of 40 to 60 cPs.

E3 was measured as having a viscosity at room temperature of 25 to 45 cPs, and a viscosity at 60° C. of 20 to 30 cPs.

E4 was measured as having a viscosity at room temperature of 20 to 25 cPs, and a viscosity at 60° C. of 8 to 11 cPs.

E5 was measured as having a viscosity at room temperature of 13 to 20 cPs, and a viscosity at 60° C. of 6 to 10 cPs.

E6 was measured as having a viscosity at room temperature of 20 to 32 cPs, and a viscosity at 60° C. of 14 to 24 cPs.

E7 was measured as having a viscosity at room temperature of 44 to 60 cPs, and a viscosity at 60° C. of 25 to 40 cPs.

E8 was measured as having a viscosity at room temperature of 11 to 20 cPs, and a viscosity at 60° C. of 6 to 11 cPs.

The seaming agents were applied to different films: (a) Polyphane FIT ST, a coextruded film with external layers made of a proprietary blend of styrene polymers and polyolefins, machine direction oriented (MDO), manufactured by Polysack Flexible Packaging LTD, thickness 40 microns; (b) Polyphane FIT STS, a coextruded film with external layers made of a proprietary blend of COC polymers and polyolefins, machine direction oriented (MDO), manufactured by Polysack Flexible Packaging LTD, thickness 40 microns; and (c) Klockner Pentalabel® Rigid PETG LF-LG01F19 M65, a PETG MDO film, thickness 40 microns.

PS has a solubility parameter of 18.4 MPa$^{1/2}$, and polyolefins have an average solubility parameter of 16.5 MPa$^{1/2}$, so the outer layers of Polyphane FIT ST have a solubility parameter somewhere between 18.4 and 16.5 MPa$^{1/2}$. COC has a solubility parameter similar to Polyethylene (~16.3-16.8 MPa$^{1/2}$), so the outer layers of Polyphane FIT STS ST have a solubility parameter somewhere between 18.3 and 16.8. PETG has a solubility parameter similar to PET (~21.2 MPa$^{1/2}$).

The seaming agent, after achieving welding of the leading edge and the trailing edge within a period of about 0.25 seconds, was cross-linked using exposure to LED radiation (LED unit by Baldwin, model Uved) of peak wavelength 395 nm, 3000 W total power (of which about 40% is UV and the rest heat), 1.5 seconds exposure time, non-focused light, chamber with reflective walls. The reflective UV chamber was designed to permit light to approach the seam, regardless of its alignment toward the LED source. This was done because the radiation curing chamber or tunnel in commercial lines is positioned downstream of the roll fed machine where the container is wrapped by the high shrink wrap label, and so the seam position on the conveyor belt relative to the LED source is usually sporadic. Light is transmitted from the LED source at a wide angle, hitting reflective walls and traveling multiple times, so the container is exposed to light over its entire contour. The wrapped curved container was removed from the simulating apparatus and transferred to a model S3 steam chamber (Ryback & Ryback Inc.), and steamed at 95° C. to 100° C. for 7 seconds. The shrinkage was from 0 to 60%, based on the geometry of the curved mandrel (see FIG. 3), with little shrinkage at the top and bottom, and 60% shrinkage in the narrow zone in the center of the mandrel. The quality of seam vs. shrinkage is summarized in Table 2A.

TABLE 2A

| | SEAM QUALITY AFTER 0%-60% SHRINK ON POLYPHANE FIT ST | SEAM QUALITY AFTER 0%-60% SHRINK ON POLYPHANE FIT STS | SEAM QUALITY AFTER 0%-60% SHRINK ON PETG |
|---|---|---|---|
| E1 | seam quality 2 at 0-50% shrinkage (shrinkage over 50% limited by label) | Seam couldn't hold travel to radiation curing chamber | seam quality 2 at 0-30% shrinkage. seam open at shrinkage greater than 30% |
| E2 | seam quality 2 at 0-50% shrinkage (shrinkage over 50% limited by label) | Seam couldn't hold travel to radiation curing chamber | seam quality 2 at 0-20% shrinkage. seam open at shrinkage greater than 20% |
| E3 | seam quality 2 at up to 35% shrinkage. Seam open at shrinkage greater than 35% because of delamination from film. | seam quality 2 at up to 35% shrinkage. Seam open at shrinkage greater than 35% because of seam brittleness combined with delaminations | Seam couldn't hold travel to radiation curing chamber |

TABLE 2A-continued

| | SEAM QUALITY AFTER 0%-60% SHRINK ON POLYPHANE FIT ST | SEAM QUALITY AFTER 0%-60% SHRINK ON POLYPHANE FIT STS | SEAM QUALITY AFTER 0%-60% SHRINK ON PETG |
|---|---|---|---|
| E4 | seam quality 2 at 0-50% shrinkage (shrinkage over 50% limited by label) | Seam couldn't hold travel to radiation curing chamber | seam quality 2 at 0-50% shrinkage, some open seams of about 5 mm at 60% shrinkage |
| E5 | seam quality 2 at 0-50% shrinkage (shrinkage over 50% limited by label). Some minor loss of film clarity | Seam couldn't hold travel to radiation curing chamber | seam quality 2 at 0-60% shrinkage |
| E6 | Seam couldn't hold travel to radiation curing chamber | seam quality 2 at 0-45% shrinkage, some open seams of about 5 mm at greater than 45% shrinkage. Minor loss of film clarity | Seam couldn't hold travel to radiation curing chamber |
| E7 | Seam couldn't hold travel to radiation curing chamber | seam quality 2 at 0-45% shrinkage, some open seams of about 5 mm at greater than 45% shrinkage. Good film clarity | Seam couldn't hold travel to radiation curing chamber |
| E8 | Seam couldn't hold travel to radiation curing chamber | seam quality 2 at 0-50% (limited by film) shrinkage. Minor loss of clarity. | Seam couldn't hold travel to radiation curing chamber |

E1 is rich in THFA monomer. THFA is very suitable to swell the outer layers of the Polyphane FIT ST, and thus a seam with a seam quality of at least 2 was obtained. THFA is able to swell PETG, but not enough to guarantee a seam with a seam quality of at least 2 above 30% shrinkage. THFA is not compatible with COC and polyolefins, and thus Polyphane FIT STS failed to survive even the travel from wrap around aggregate to radiation curing chamber.

E2 is rich in THFA monomer, but less than E1, because it comprises more oligomers. It is yet very suitable for Polyphane FIT ST, not suitable for Polyphane FIT STS, and able to withstand less shrink forces with PETG.

E3 is rich in IBOA. It is able to swell Polyphane FIT ST, but not as well as THFA. Due to that, the seam opened at shrinkage greater than 35% (interfacial failure). It is able to swell Polyphane FIT STS, but not fast enough (interfacial failure), and due to the content of hexafunctional M600, the cross linking density is too high, and the seam itself is brittle (cohesive failure). IBOA is not compatible with PETG and polyolefins, and thus PETG failed to survive even the travel from wrap around aggregate to radiation curing chamber.

E4 is similar to E1 with the addition of THF solvent. THF is more polar than THFA and has a much lower molecular weight. It allows improved immediate welding strength, improved interfacial strength between seaming agent and label, but may harm label clarity with both PETG and Polyphane FIT ST. However, at this level, a seam with a seam quality of at least 2 was obtained with Polyphane FIT ST. THF is able to swell PETG, much stronger and faster than THFA, so a seam with a seam quality of at least 2 up to 50% shrinkage was obtained with PETG. However, more THF required improving the welding strength to withstand shrink forces greater than 50%. THF is not compatible with COC and polyolefins, and thus Polyphane FIT STS failed to survive even the travel from wrap around aggregate to radiation curing chamber.

E5 is similar to E4 with the addition of more THF solvent. At this level, a seam with a seam quality of at least 2 was obtained with Polyphane FIT ST at up to 50% shrinkage. There was minor impact on film clarity, but it was negligible. Addition of THF allowed a seam with a seam quality of at least 2 up to 60% shrinkage with PETG. THF is not compatible with COC and polyolefins, and thus Polyphane FIT STS failed to survive even the travel from wrap around aggregate to radiation curing chamber.

E6 and E7 are variations of E3, with similar amounts of limonene solvent and differences in oligomer content. Both improved ability to hold shrink forces (from 35% to 45%) but not enough to withstand shrink forces up to 50%. Since limonene is more non-polar relative to IBOA, swelling of Polyphane FIT ST and PETG was poor and thus E6 and E7 are not suitable for use with them.

E8 is the same as E6, but with almost double the amount of limonene solvent. The addition of limonene allowed better adhesion, so the seam can withstand shrink forces up to 50%. The addition of limonene affected film clarity as expected, but it was very minor. E8 is a very suitable seaming agent for Polyphane FIT STS, but not for Polyphane FIT ST and PETG.

Overall, Table 2A demonstrated some important conclusions. It is possible to match solubility, swelling rate, cross link density and viscosity so that for each type of label film, an optimal seaming agent could be selected. This requires careful balancing between contradicting factors (swelling vs. haze, cross-linking density vs. brittleness).

In order to demonstrate the correlation between seam quality and immediate welding strength, an immediate welding strength test was conducted on seaming agents E1-E8. FIGS. 12-15 illustrate how an immediate welding strength test was performed using two strips with a width of 25 mm, a length of 200 mm, and a seam made from a 10 mm overlap on the strip. A device with two pistons was used.

Figure 12:
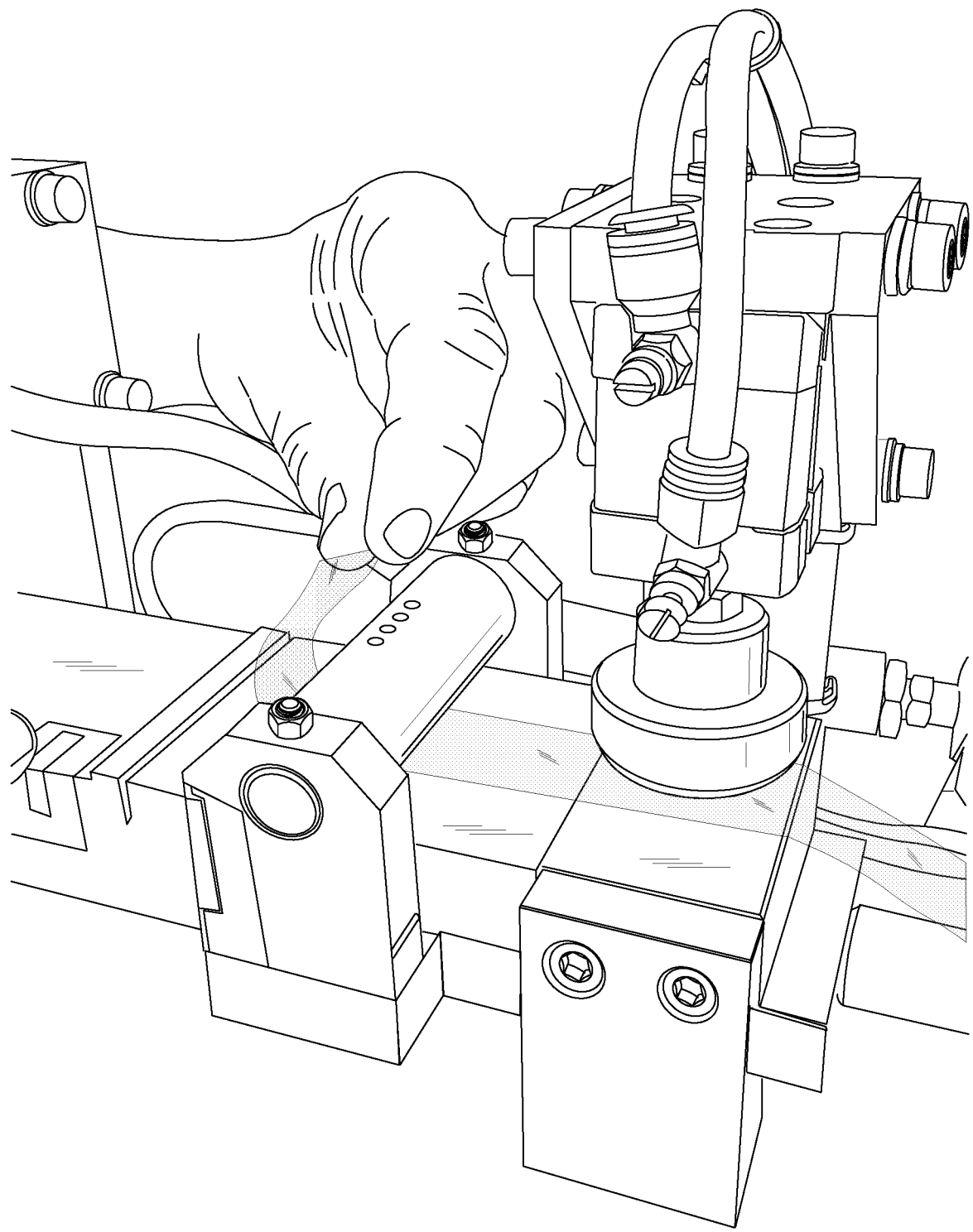
FIG. 12 is a first picture illustrating the test for measuring the immediate welding strength. A first strip of 25 mm width, made of a high shrink label that is compatible with the seaming agent, is used to simulate the leading edge of the label. The first strip is attached to a vacuum drum, and clamped by the right clamp. The right clamp remains "clamped" during the entire test.

FIG. 12 is a first picture illustrating the immediate welding strength test. A first strip of 25 mm wide, made of a high shrink film, is used to simulate leading edge of the label, attached to a vacuum drum and clamped by first right clamp.

Figure 13:
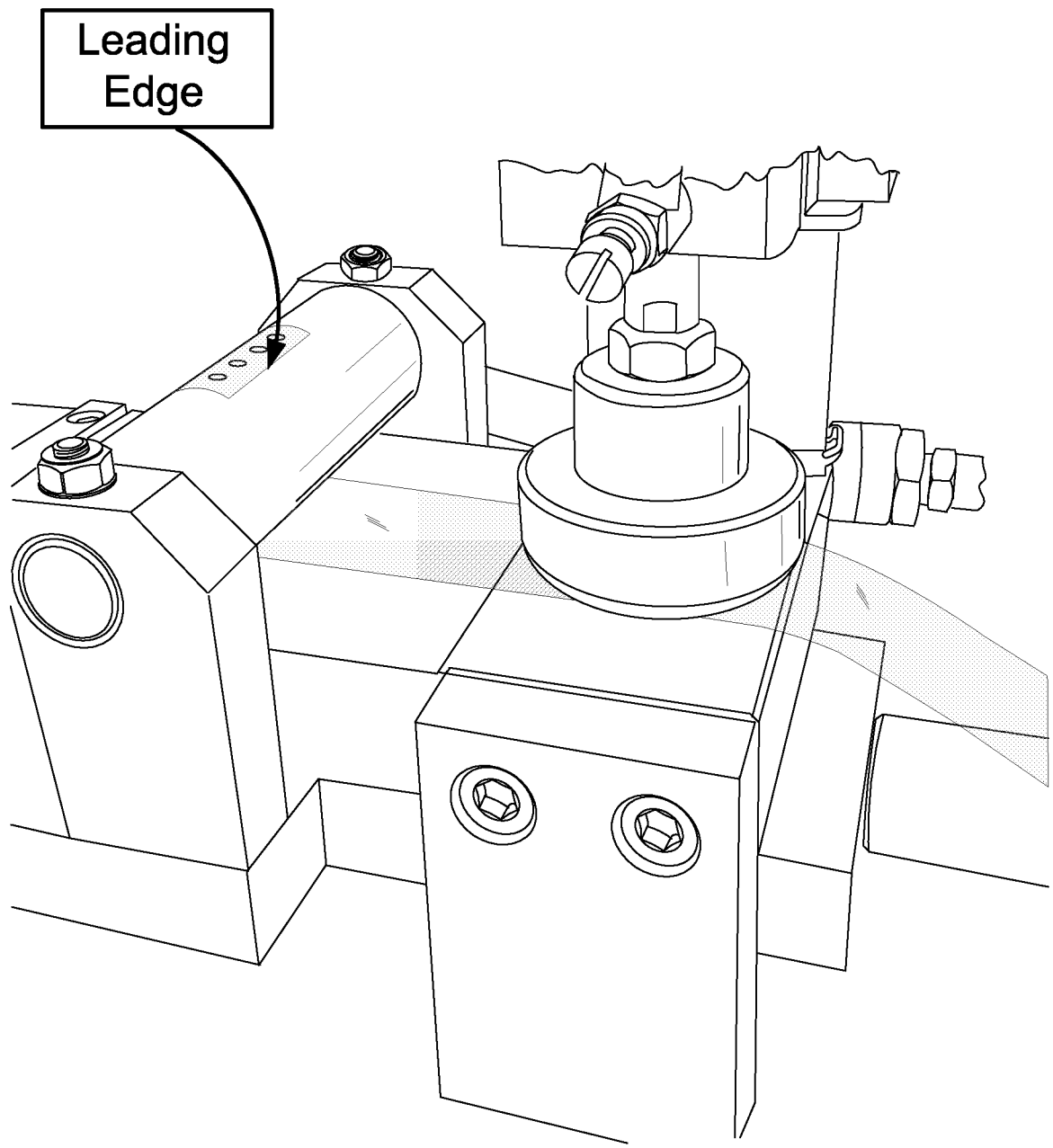
FIG. 13 shows the first strip wrapped onto the vacuum drum and the right clamp pressed down to keep the first strip from moving.

FIG. 13 shows the leading edge wrapped around the vacuum drum and clamp pressed to keep the first strip from moving.

Figure 14:
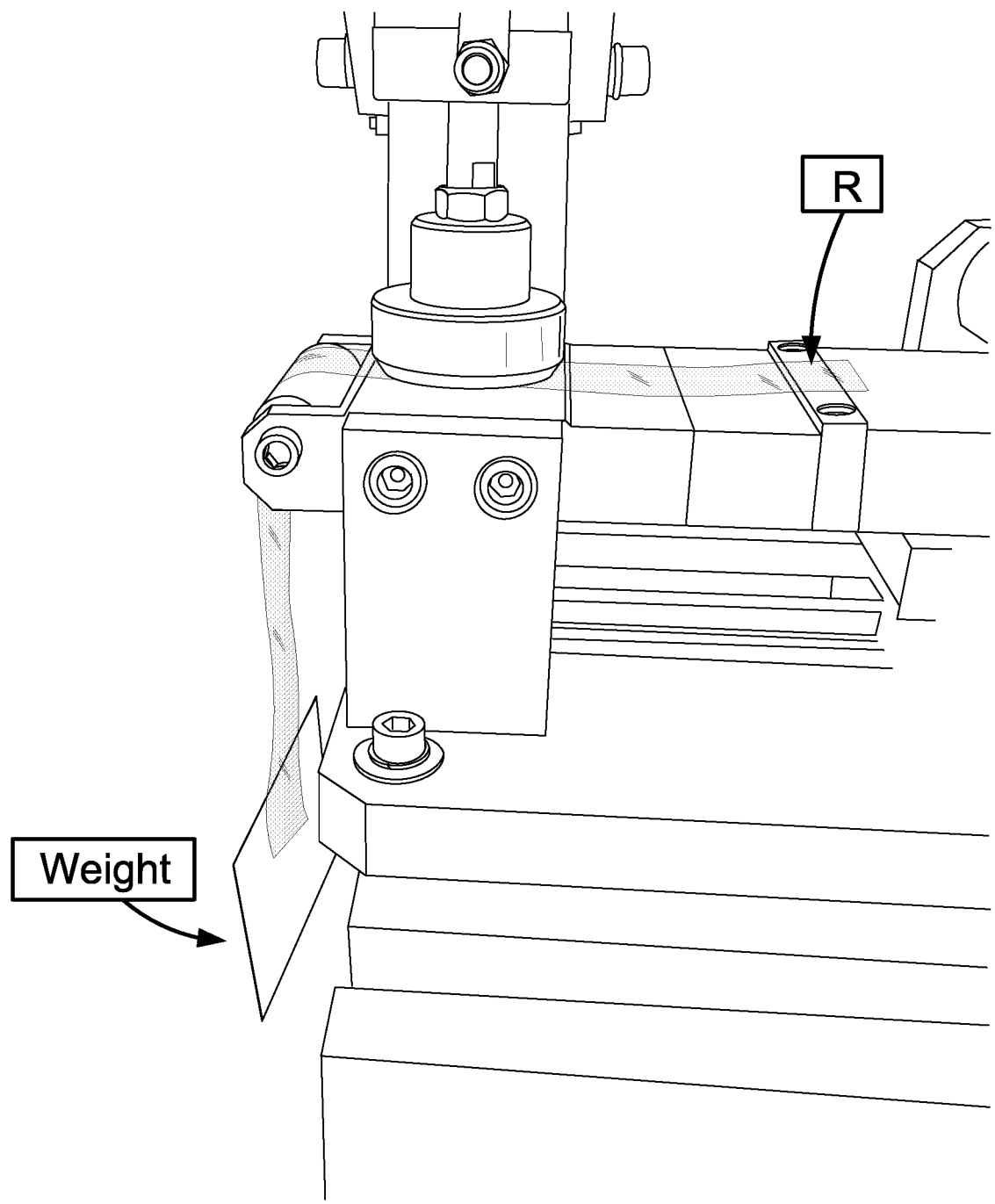
FIG. 14 is a third picture of the immediate welding strength test, showing a second strip (made of the same material as the first strip) having the same width as the first strip (and used to simulate the trailing edge of the label) being held by the left piston of the test device. An upper edge of the second strip is located at a ramp, simulating the ramp on drum that allows the leading and trailing edges to contact each other. Seaming agent is applied to this upper edge by a 6 mm wide brush, dispensing about 1 to about 2 mg of seaming agent on the area on top of ramp R. This amount is equal to about 0.4 to about 0.8 mg per square centimeter of seam area (because the 6 mm wide brush line of seaming agent flows, wetting a total width of 10 mm). The lower edge of the second strip hangs over the edge of the test device. The lower edge passes through a low friction sliding roller, and a load is applied at the lower edge. Different loads are used, and the maximal load that the seam can carry without failure is the "immediate welding strength". The left piston secures the left strip from falling due to the load. When the system is activated by an electrical trigger, the vacuum drum travels toward the ramp, so the first strip (leading edge) contacts the seaming agent on the second strip on the ramp. The seaming agent flows via capillary action to create an overlapping seam with a width of 10 mm (so the surface area of seam is 25 mm×10 mm). The right piston remains closed, while the left piston opens and releases the left strip, within a pre-defined delta time after the first strip is welded to the second strip by the seaming agent. This delta time simulates the time on the wrap around machine that the seam is held by the vacuum drum before being released to a conveyor, where the seam must withstand accelerations on the conveyor when approaching the radiation-curing tunnel. The typical delta time period on a wrap-around machine varies between about 40 milliseconds (ms) for extremely fast production lines and about 500 ms for slow production lines.

FIG. 14 is a third picture of the immediate welding strength test, showing a second strip of same film type and width (simulating the trailing edge) being held by the left piston of the test device. One edge of the second strip is located on a ramp, simulating the ramp on drum that allows the leading edge and the trailing edge to contact each other. Seaming agent was applied to this edge by a 6 mm wide brush, dispensing 1-2 mg of seaming agent on the area on top of ramp R. The other edge of the second strip hangs over the edge, and a load is applied. The left piston secures the left strip from falling due to the applied load. When the system is activated by electrical trigger, the drum rotates toward the ramp, so the leading edge of the first strip contacts the seaming agent on the second strip on the ramp. The seaming agent flows (via capillary action) to fill the complete overlap of 10 mm long (so the surface area of the seam is 25 mm×10 mm). The right piston remains closed, while the left piston opens and releases the left strip, within a pre-defined delta time after the leading edge is released to fall onto the seaming agent. This delta time simulates the time on the wrap around machine when the label is released from the vacuum drum, where the seam must withstand accelerations on the conveyor belt to the radiation-curing tunnel. Typical delta time periods on wrap around machines vary between 40 milliseconds (ms) on extremely fast production lines to 0.5 seconds (500 ms) for slow production lines.

Figure 15:
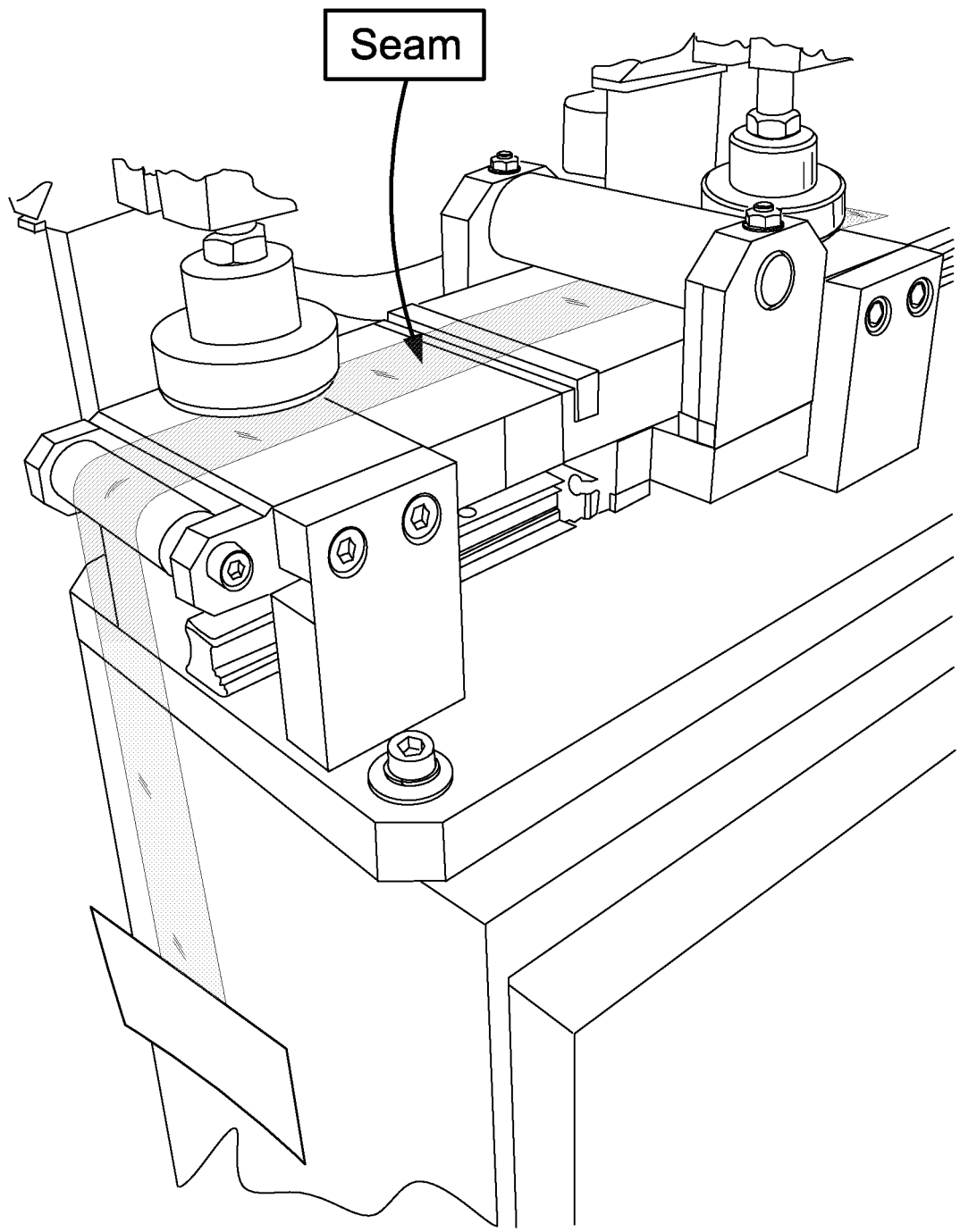
FIG. 15 is a fourth picture of the welding strength test. It shows a seam on testing machine after releasing of left piston. Here, the seaming agent was strong enough to hold against the applied load. The data generated by the immediate welding strength test includes: film composition, seaming agent composition, load, delta time period, and pass or fail.

FIG. 15 is a fourth picture of the immediate welding strength test. This shows the seam on the testing machine after releasing of the left piston. Here, the seaming agent was strong enough to hold against the applied load.

The data generated by this method includes: film type, seaming agent type, load, delta time period, and pass or fail.

The three different films were tested with the different Examples E1-E8. After a delta time delay of 0.2 seconds, the maximal load that the seam could bear before separating was recorded. Table 2B contains information on the results for each of the seaming agents and the three different film types. Any value of 2 or greater is a good result, but values of 4.5 grams or greater are preferred.

TABLE 2B

| | immediate welding strength on Polyphane FIT ST (g) | immediate welding strength on Polyphane FIT STS (g) | immediate welding strength on PETG (g) |
|---|---|---|---|
| E1 | 4.5 | does not weld | 2.0 |
| E2 | 4.5 | does not weld | 2.0 |
| E3 | 3.0 | 4.5 | does not weld |
| E4 | 6.0 | does not weld | 4.5 |
| E5 | 6.0 | does not weld | 6.0 |
| E6 | 2.0 | 4.5 | does not weld |
| E7 | 2.0 | 6.0 | does not weld |
| E8 | 2.0 | 6.0 | does not weld |

It is clear that there is very good agreement between immediate welding strength results and seam quality in the wrap around test. Seaming agents incompatible with the label film failed to provide sufficient immediate welding, as well as resistance against shrink forces. A balance is necessary, because too much solvent or compatible monomer may guarantee immediate welding and resistance against shrink forces, but also negatively affect label seam quality.

Example 3

Example 2 compared different seaming agents at the same delta time period (0.2 seconds) in an immediate welding strength test. In this Example, different delta time periods were tested. Generally, the shorter the delta time period, the less time there is for monomer and solvents to swell the label and establish cohesion between the leading and trailing edges.

Accordingly, the immediate welding strength test described in Example 2 was performed with strips made of Polyphane FIT ST, and using seaming agent E2 and the maximum load was measured for different delta times t1. The results are shown in Table 3 below.

TABLE 3

| Time (sec) | Maximal load (g) |
|---|---|
| 0.04 | 4 |
| 0.06 | 5 |
| 0.08 | 5 |
| 0.1 | 6 |
| 0.2 | 6 |
| 0.5 | 6 |

It is important to note, that when a seaming agent is compatible with the label film, the seam develops immediate welding strength within a period as short as 0.04 seconds, which is much faster than what is needed for the fastest current production lines.

Example 4

To explore the seaming agent performance at higher solvent levels, four additional different seaming agents E9-E11 were tested similarly to Example 2. Information on the formulation of E9-E11 are listed in Table 4A.

TABLE 4A

| Ingredient | $\delta$ ($MPa^{1/2}$) | E9 | E10 | E10 | E11 |
|---|---|---|---|---|---|
| M200 monomer (g) | 17-18 | 1.5 | 1.5 | 1.5 | 1.5 |
| M600 oligomer (g) | | 3.7 | 3.7 | 3.7 | 3.7 |
| M3130 oligomer (g) | | 3.7 | 3.7 | 3.7 | 3.7 |
| THFA monomer (g) | 19 | 5.5 | 5.5 | — | — |
| 6043/M22 oligomer(g) | | 1.3 | 1.3 | 1.3 | 1.3 |
| TPO photoinitiator (g) | | 0.6 | 0.6 | 0.6 | 0.6 |
| IBOA monomer (g) | 18.8 | — | — | 5.5 | 5.5 |
| THF solvent (g) | 19.4-19.5 | 10 | 12 | — | — |
| Limonene solvent (g) | 16-17 | — | — | 10 | 12 |
| wt % solvent | | 38.0 | 42.2 | 38.0 | 42.2 |
| wt % monomer | | 27.1 | 24.7 | 27.1 | 24.7 |
| wt % oligomer | | 49.1 | 45.5 | 49.1 | 45.5 |

TABLE 4B

| | SEAM QUALITY AFTER 0-60% SHRINK ON POLYPHANE FIT ST | SEAM QUALITY AFTER 0-60% SHRINK ON POLYPHANE FIT STS | SEAM QUALITY AFTER 0-60% SHRINK ON PETG |
|---|---|---|---|
| E9 | seam quality 2 at 0-50% shrinkage (shrinkage over 50% limited by label). Some minor loss of film clarity | Seam couldn't hold travel to radiation curing chamber | seam quality 2 at 0-60% shrinkage |

TABLE 4B-continued

| | SEAM QUALITY AFTER 0-60% SHRINK ON POLYPHANE FIT ST | SEAM QUALITY AFTER 0-60% SHRINK ON POLYPHANE FIT STS | SEAM QUALITY AFTER 0-60% SHRINK ON PETG |
|---|---|---|---|
| E10 | seam quality 2 at 0-50% shrinkage (shrinkage over 50% limited by label). moderate loss of film clarity | Seam couldn't hold travel to radiation curing chamber | seam quality 2 at 0-60% shrinkage |
| E11 | Seam couldn't hold travel to radiation curing chamber | seam quality 2 at 0-50% shrinkage (shrinkage over 50% limited by label). Some loss of film clarity | Seam couldn't hold travel to radiation curing chamber |
| E12 | Seam couldn't hold travel to radiation curing chamber | seam quality 2 at 0-50% shrinkage (shrinkage over 50% limited by label). Some loss of film clarity | Seam couldn't hold travel to radiation curing chamber |

TABLE 4C

| | Viscosity (RT, cPs) | Viscosity (60° C., cPs) | immediate welding strength on POLYPHANE FIT ST at 0.2 sec (g) | immediate welding strength on POLYPHANE FIT STS at 0.2 sec (g) | immediate welding strength on PETG at 0.2 sec (g) |
|---|---|---|---|---|---|
| E9 | 20-25 | 3-6 | 6.0 | 0 | 6.0 |
| E10 | 20-25 | 3-6 | 6.0 | 0 | 6.0 |
| E11 | 20-25 | 3-6 | 0 | 6.0 | 0 |
| E12 | 20-25 | 3-6 | 0 | 6.0 | 0 |

E10 and E11 are excellent for POLYPHANE FIT ST and PETG. E12 and E13 are excellent for Polyphane FIT STS.

Example 5

ASTM D5403-93 relates to measurement of volatile content of radiation curable materials. Generally, a film of cured polymer is heated to 110° C. for 60 minutes and the measured weight loss is identified as being due to the volatiles. Because it is difficult to use this method to measure low amounts of volatiles, and because the seaming agent is swollen between two layers of shrink film, a modified method was used.

In the modified method, a film of length 300 mm and height 250 mm is used. A seaming agent is coated by a wire or roller coater to a thickness of 2-12 microns on one end of the film, over an area of 100 mm×250 mm (25,000 mm$^2$). The film is wrapped around a heat resistant cylindrical mandrel having a diameter of 60 mm and a height of 250 mm. The mandrel is exposed to radiation (medium pressure mercury lamp at minimum 0.1 W/cm$^2$ at peak, or LED having peak at 365-430 nm at minimum 0.5 W/cm$^2$ at peak), and then heated in an oven at 110° C. for 60 minutes. In the oven, shrinkage will occur, but the mandrel will suppress the shrinkage and keep the surface of film free for evaporation.

The VOC percentage is calculated according to the following equations:

IFW=initial film weight

IFW+SAAC=weight of film+seaming agent after curing

IFW+SAAH=weight of film+seaming agent after heat treatment at 110° C./60 minutes Seaming agent net weight after curing (SAAC)= (IFW+SAAC)−IFW Seaming agent net weight after heat treatment= (IFW+SAAH)minus IFW Net volatiles (NV)=(IFW+SAAC)−(IFW+SAAH)

% VOC=100×NV/SAAC

Five example formulations VOC-1 through VOC-5, and their VOC content, are given in Table 5A based on wt % and the testing procedure described above.

TABLE 5A

| Ingredient | VOC-1 | VOC-2 | VOC-3 | VOC-4 | VOC-5 |
|---|---|---|---|---|---|
| IBOA monomer | 50% | 40% | 40% | — | — |
| THFA monomer | — | — | — | 30% | 45% |
| Hexanediol diacrylate (M200) | 10% | 10% | 5% | 10% | 15% |
| TMP(EO)$_3$TA triacrylate oligomer (M600) | — | — | 5% | 15% | 10% |
| TPO photoinitiator | 5% | 5% | 5% | 5% | 5% |
| Piccotac 1105-E tackifier | 25% | 25% | 15% | — | — |
| Gum Rosin tackifier | — | — | — | 20% | 25% |
| Limonene solvent | 10% | 20% | 30% | — | — |
| THF solvent | — | — | — | 20% | — |
| % VOC in seam per modified ASTM D5403-93 | 3 | 7 | 17 | 6 | 0 |

Some non-obvious and surprising findings were derived from Table 5A. Example VOC-5 shows a zero % VOC formulation can be provided (useful for Polyphane FIT ST). In all formulations, the measured % VOC was about only 30%-50% of the original solvent amount in the formulation. This surprising finding shows a significant portion of solvent is "caged" during radiation curing and thus not emitted into the environment during manufacturing. Example VOC-4 is a very low % VOC formulation useful for Polyphane FIT ST and PETG, allowing reduction of VOC emission by about 16 times relative to conventional solvent bonding (either RFS solvent or TD machines or RF solvent). For example, assuming a typical container with a seam of 900 mm$^2$, seaming agent of 1 mg per square centimeter, 600 containers per minute, 20 hours per day, and 330 days per year, an RFS or TD machine will emit about 2000 kg VOC per year, but using Example VOC-4 will only emit about 128 kg VOC per year. Example VOC-2, useful for high shrink COC based films such as Polyphane FIT STS, will emit very similar levels of about 130 kg VOC per year.

Examples E1-E8 were also tested for VOC content, and the results are presented in Table 5B.

TABLE 5B

|  | E1 | E2 | E3 | E4 | E5 | E6 | E7 | E8 |
|---|---|---|---|---|---|---|---|---|
| % VOC | 0 | 0 | 0 | 4.2 | 9 | 6.2 | 11 | 12.5 |

Formulations E1-E3 are suitable for zero % VOC seaming of PS and PVC films. Formulations E4-E5 are suitable for low % VOC seaming of PETG films. Formulations E6-E8 are suitable for low % VOC seaming of COC films.

Example 6

A method for quantitative measurement time to haze initiation was used, taking advantage of a high-speed camera capable of shooting at least 300 frames per second (fps). The film was placed on dark surface to enable easy recognition of haze. The camera was focused on the film, and continuous photography mode was started at least 5 seconds before applying liquid to the film. A 5 mm wide line of liquid (solvent or seaming agent) was applied to the film. After identifying the moment where first evidence of haze was observed, the time elapsed from the moment the liquid was applied to the moment of haze start was calculated.

Formulations VOC-1 through VOC-5 were tested for time to haze, along with 100% THF and 100% limonene solvent for comparison.

VOC-1 to VOC-3 and 100% limonene were applied on Polyphane FIT STS. VOC-4 to VOC-5 and 100% THF were applied on Polyphane FIT ST. Results are shown in Table 6A.

TABLE 6A

| Ingredient | VOC-1 | VOC-2 | VOC-3 | VOC-4 | VOC-5 | 100% THF | 100% limonene |
|---|---|---|---|---|---|---|---|
| Time to haze, milliseconds | 1800 | 1200 | 850 | 330 | 2400 | 20 | 120 |

The two 100% solvents had very fast time to haze. This illustrates why it is so difficult to seam on a curved container. Time is needed for the solvent to flow and zip up the seam (zip=swell and bond the two adjacent edges of the film), and it is only possible to do so without haze if the solvent is trapped and pressed between two films within less than about 20 milliseconds.

Formulas VOC-5 hazed very slowly, even when the film was polystyrene. This was because no solvent is present in this formulation. This is advantageous, because haze is not related to line speed.

Formula VOC-4 hazed faster than VOC-5, but still 15 times slower than 100% THF.

Formulas VOC-1 to VOC-3 hazed even slower, because the penetration of limonene into COC is much slower than THF into PS. All three formulations have a wide and safe process window.

Examples E1-E8 were also tested for haze, and the results are presented in Table 6B.

TABLE 6B

|  | E1 | E2 | E3 | E4 | E5 | E6 | E7 | E8 |
|---|---|---|---|---|---|---|---|---|
| Time to haze, milliseconds | 8250 | 12350 | 15500 | 3225 | 2200 | 1600 | 2650 | 1180 |

Because the manufacturing speed of roll fed machines suitable for the present disclosure varies from 300 containers per minute (cpm) to 1200 cpm, the theoretical maximum residence time of the container, from seam formation to curing, is 41 milliseconds to 166 milliseconds. Thus, E1-E8 all have a comfortable and safe process window in which no haze will form during the container travel from seam formation to curing.

Example 7

Several samples of high shrink labels using different seaming agents were analyzed to identify seaming agents made according to the present disclosure.

Where appropriate, the film around the seam was first cleaned to remove any ink or coating, and the two edges of the seam were separated from each other. The film and the seam were dried to remove volatiles. Each sample was heated to 200° C., a temperature where both the label film and the seaming agent decomposed. The head space (i.e. gases arising from decomposition) was collected and analyzed using gas chromatography and mass spectrometry (GC-MS).

An Agilent 5890 GC-MS device was used. The head space sample was introduced at 200° C. with 1 milliliter (mL) injection volume. The injector temperature was 250° C. The column was an RXi-5MS, 30 meters length, 0.25 mm internal diameter, with a 0.25 μm film. The helium flow rate through the column was 1 mL/min. The oven was started at 60° C. for 3 minutes, then ramped to 310° C. at a rate of 15°/minute, and held for 3 minutes. The oven was maintained post run at 280° C. for 2.5 minutes. The total analysis time was 19 minutes. The mass range was m/z 30-600. The detector was an Agilent quadrupole detector. The data analysis software was Agilent Chemstation.

The following nine samples were tested:

LO4: two films bonded by a blend that is about 70% monofunctional acrylic esters having a MW less than 300, which falls within the scope of the present disclosure;

F1: a blend of 1,6-hexanediol diacrylate (65%), dipentaerythritol hexa-acrylate (33%), and photoinitiator (2%);

F3: a blend of cyclic trimethylpropane formal acrylate (65%), dipentaerythritol hexa-acrylate (33%), and photoinitiator (2%);

F5: a blend of cyclic trimethylpropane formal acrylate (65%), ethoxylated trimethylpropane triacrylate (33%), and photoinitiator (2%);

Film: a proprietary multi-layer film comprising styrene-ethylene copolymer and sold as POLYPHANE ST by Polysack;

Solvent: Two POLYPHANE ST films bonded together by Methyl Ethyl ketone (MEK) solvent, wherein the solvent was removed at ambient for at least one week prior to testing;

PETG: Two PETG films bonded with THF solvent, wherein the solvent was removed at ambient for at least one week prior to testing;

Film #1: Two POLYPHANE ST films bonded together with a high oligomer content blend of GENOMER 4622 high molecular weight urethane acrylate resin (57%), isobornyl acrylate (42%), and photoinitiator (1%);

Film #2: Two POLYPHANE ST films bonded together with a high oligomer content blend of GENOMER 4622 high molecular weight urethane acrylate resin (57%), isobornyl acrylate (42%), and photoinitiator (1%);

The Film, Solvent, PETG, Film #1, and Film #2 samples were used as controls. Ideally, the LO4, F1, F3, and F5 samples could be distinguished from these controls.

The following nine tables 7A-7I show the GC-MS results for each sample.

After review, it was determined that seaming agents of the present disclosure could be identified if the gas phase derived from the seam comprises at least three different signature molecules that each (A) have a molecular weight of 230 Da or less, (B) have an aliphatic alkane or alkene backbone containing at least three carbon atoms, (C) contain only one or two acid groups, only one or two ester groups, only one aldehyde group, or only one epoxide group, and (D) do not contain any aromatic, cyclic, or heterocyclic groups. In other words, each molecule meets requirements (A)-(D), and there are three such molecules in the gas phase. In each table, those molecules are indicated by bold font.

TABLE 7A

| | | LO4 | |
|---|---|---|---|
| No. | Time (sec) | Molecule | MW |
| 1 | 5.09 | 1,3-propanediol, 2,2-dimethyl | 104 |
| 2 | 7.218 | decane | 142 |
| 3 | 7.617 | butylated hydroxytoluene | 220 |
| 4 | 7.791 | phenol, 2,4-bis(1,1-dimethylethyl)- | 206 |
| 5 | 8.600 | 3-hexanol | 102 |
| 6 | 8.911 | 2-butenedioic acid (z)-,dimethyl ester | 144 |
| 7 | 9.521 | hexamethylene diacrylate | 226 |
| 8 | 9.857 | tetradecanal | 212 |
| 9 | 9.969 | benzoic acid, 2,4,6-trimethyl | 164 |
| 10 | 11.139 | oxirane, tridecyl | 226 |
| 11 | 11.499 | 2-propenoic acid, (1-methyl-1,2-ethanediyl)bis[oxy(methyl-2,1-ethanediyl)]ester | 300 |
| 12 | 12.931 | 7,9-di-tert-butyl-1-oxaspiro(4,5)deca-6,9-diene-2,8-dione | 276 |

TABLE 7B

| | | F1 | |
|---|---|---|---|
| No. | Time (Sec) | Molecule | MW |
| 1 | 5.654 | Benzene, 1,3,5-trimethyl- | 120 |
| 2 | 7.57 | 1,6-Hexanediol (Hexamethylene glycol) | 118 |
| 3 | 7.906 | Benzene, 2-chloro-1,3,5-trimethyl- | 154 |
| 4 | 8.043 | 1-Penten-3-ol (Ethyl vinyl carbinol) | 86 |
| 5 | 8.230 | Phenol, 2,4,6-trimethyl- | 136 |
| 6 | 8.304 | Mequinol | 124 |
| 7 | 9.151 | Benzaldehyde, 2,4,6-trimethyl- | 148 |
| 8 | 9.736 | 2-Propenoic acid, 1,7,7-trimethylbicyclo[2.2.1]hept-2-yl ester, exo- | 208 |
| 9 | 10.097 | Benzoic acid, 2,4,6-trimethyl- | 164 |
| 10 | 10.607 | Phosphonic acid, phenyl-, diethyl ester | 214 |
| 11 | 10.905 | 1,3-Isobenzofurandione, 4,7-dimethyl- | 176 |
| 12 | 10.980 | Dimethyl-3H-isobenzofuranone | 162 |
| 13 | 11.092 | Hexamethylene diacrylate | 226 |
| 14 | 12.735 | 3,3,5,5-Tetramethyl-6-(2,4,6-trimethyl-benzoyl)-dihydro-pyran-2,4-dione | 316 |
| 15 | 12.872 | 1,2-Benzenedicarboxylic acid, bis(2-methylpropyl) ester | 278 |
| 16 | 13.108 | Hexadecanoic acid, methyl ester | 270 |
| 17 | 13.220 | 7,9-Di-tert-butyl-1-oxaspiro(4,5)deca-6,9-diene-2,8-dione | 276 |
| 18 | 14.863 | Benzoic acid, 2,4,6-trimethyl-, 2,4,6-trimethylphenyl ester | 282 |
| 19 | 15.311 | Benzoic acid, 2,4,6-trimethyl-, 2,4,6-trimethylphenyl ester | 282 |

TABLE 7C

| | | F3 | |
|---|---|---|---|
| No. | Time (sec) | Molecule | MW |
| 1 | 5.419 | camphene | 136 |
| 2 | 5.643 | benzene, 1,2,3-trimethyl- | 120 |
| 3 | 7.908 | benzene, 2-chloro, 1,3,5-trimethyl- | 154 |
| 4 | 8.58 | 1,3-propanediol, 2-ethyl-2-(hydroxymethyl)- | 134 |
| 5 | 9.202 | benzaldehyde, 2,4,5-trimethyl- | 148 |
| 6 | 9.738 | 2-propenoic acid, 1,7,7-trimethylbicyclo[2.2.1]hept-2-yl ester, exo | 208 |

TABLE 7C-continued

| | F3 | | |
|---|---|---|---|
| No. | Time (sec) | Molecule | MW |
| 7 | 9.999 | phenylphosphonous acid | 142 |
| 8 | 10.148 | benzoic acid, 2,4,6-trimethyl- | 164 |
| 9 | 10.621 | benzoic acid, phenyl, diethyl ester | 214 |
| 10 | 10.696 | butylated hydroxytoluene | 220 |
| 11 | 10.995 | benzenesulfonic acid, 4-methyl-ethyl ester | 200 |
| 12 | 11.069 | hexamethylene diacrylate | 226 |
| 13 | 12.364 | 3,5-di-tert-butyl-4-hydroxybenzaldehyde | 234 |
| 14 | 12.724 | benzoic acid, 2,4,6-trimethyl, 2,4,6-trimethylphenyl ester | 282 |
| 15 | 13.098 | pentadecanoic acid, 14-methyl, methyl ester | 270 |

TABLE 7D

| | F5 | | |
|---|---|---|---|
| No. | Time (sec) | Molecule | MW |
| 1 | 4.803 | 1,3,6-trioxocane | 118 |
| 2 | 5.152 | 1-butanol, 3-methyl acetate | 130 |
| 3 | 5.288 | 4-pentenal | 84 |
| 4 | 5.413 | camphen | 136 |
| 5 | 5.562 | propane, 1,3-dimethoxy | 104 |
| 6 | 5.649 | benzene, 1,2,3-trimethyl | 120 |
| 7 | 6.583 | 2-propanol, 1,3-dimethoxy | 120 |
| 8 | 7.143 | borane, diethylmethyl | 84 |
| 9 | 7.914 | benzene, 2-chloro, 1,3,5-trimethyl | 154 |
| 10 | 8.711 | 2-buten-1-ol-3-methyl, formate | 114 |
| 11 | 9.196 | benzaldehyde, 2,4,5-trimethyl | 148 |
| 12 | 9.744 | 2-propenoic acid, 1,7,7-trimethylbicyclo[2.2.1]hept-2-yl ester, exo | 208 |
| 13 | 10.080 | ethyl, 2,4,6-trimethylbenzoate | 192 |
| 14 | 10.105 | benzoic acid, 2,4,6-trimethyl | 164 |
| 15 | 10.217 | benzoic acid, 2,4,6-trimethyl | 164 |
| 16 | 10.690 | phosphonic acid, phenyl,-diethyl ester | 214 |
| 17 | 11.001 | 4,5-dimethyl-3H-isobenzofuran-1-one | 162 |

TABLE 7E

| | Film | | |
|---|---|---|---|
| No. | Time (sec) | Molecule | MW |
| 1 | 1.738 | 2-methylpentene | 84 |
| 2 | 2.136 | propylene glycol | 76 |
| 3 | 4.645 | bicyclo[3.2.0]-hept-2-ene,2-methyl | 108 |
| 4 | 4.695 | bicyclo[2.2.2]-oct-5-ene,2-one | 122 |
| 5 | 4.957 | tricyclo[2.2.1.0 (2,6)]heptane, 1,7,7-trimethyl | 136 |
| 6 | 5.181 | bicyclo[2.2.1]heptane, 2,2-dimethyl, 5-methylene | 136 |
| 7 | 5.355 | camphene | 136 |
| 8 | 5.455 | benzaldehyde | 106 |
| 9 | 5.579 | benzene, 1,2,3-trimethyl | 120 |
| 10 | 5.665 | phenol | 94 |
| 11 | 6.774 | acetophenone | 120 |
| 12 | 7.658 | bicyclo[2.2.1]heptane-2-one, 1,7,7-trimethyl | 152 |
| 13 | 7.807 | isoborneol | 154 |
| 14 | 8.517 | isobornyl formate | 182 |
| 15 | 8.940 | isobornyl acetate | 196 |
| 16 | 9.077 | benzaldehyde. 2,4,5-trimethyl | 148 |
| 17 | 9.274 | 2-propenoic acid, 1,7,7-trimethylbicyclo | 208 |
| 18 | 10.003 | ethyl-2,4,6-trimethylbenzoate | 192 |
| 19 | 10.072 | benzoic acid, 2,4,6-trimethyl | 164 |
| 20 | 10.558 | phosphonic acid, phenyl, diethyl ester | 214 |
| 21 | 10.919 | 6,7-dimethyl-3H-isobenzofurane-1-one | 162 |
| 22 | 11.093 | hexadecane | 229 |
| 23 | 11.130 | isobornyl acetate | 196 |
| 24 | 11.317 | bicyclo[2.2.1]heptan-2-ol, 1,7,7-trimethyl | 196 |
| 25 | 11.728 | heptadecane | 240 |
| 26 | 12.325 | octadecane | 254 |
| 27 | 12.462 | isopropyl myristate | 270 |
| 28 | 13.047 | pentadecanoic acid, 14-methyl, methyl ester | 270 |
| 29 | 13.433 | heptacosane | 380 |

TABLE 7E-continued

| | Film | | |
|---|---|---|---|
| No. | Time (sec) | Molecule | MW |
| 30 | 14.466 | docosane | 310 |
| 31 | 15.611 | octadecane | 254 |

TABLE 7F

| | Solvent | | |
|---|---|---|---|
| No. | Time (sec) | Molecule | MW |
| 1 | 4.193 | 1-methoxy-2-propyl acetate | 132 |
| 2 | 4.579 | bicyclo[4,2,0]octa-1,3,5-triene | 104 |
| 5 | 6.010 | decane | 142 |
| 6 | 6.408 | 2,3,-dihydro-2-methyl-5-ethylfurane | 112 |
| 7 | 6.446 | benzyl alcohol | 108 |
| 8 | 7.205 | nonanal | 142 |
| 9 | 7.528 | octen | 112 |
| 10 | 7.952 | benzoic acid | 122 |
| 11 | 8.895 | tridecane | 184 |
| 12 | 9.134 | benzaldehyde, 2,4,5-trimethyl- | 148 |
| 13 | 9.781 | tetradecane | 198 |
| 14 | 10.478 | pentadecane | 212 |
| 15 | 10.627 | phenol, 2,4-bis(1,1-dimethylethyl)- | 206 |
| 16 | 10.677 | butylated hydroxytoluene | 220 |
| 17 | 11.075 | hexamethylene diacrylate | 226 |
| 18 | 12.332 | benzene, 1,1'-(1,2-cyclobutanediyl)bis-,trans- | 208 |
| 19 | 12.954 | tridecane | 184 |
| 20 | 13.216 | 7,9-di-tert-butyl-1-oxapiro(4,5)deca-6,9-diene-2,8-dione | 276 |
| 21 | 13.502 | dodecane, 2-methyl-6-propyl- | 226 |

TABLE 7G

| | PETG | | |
|---|---|---|---|
| No. | Time (sec) | Molecule | MW |
| 1 | 4.556 | ethanol-2-butoxy | 118 |
| 2 | 5.427 | benzaldehyde | 106 |
| 3 | 5.937 | ethanol-2-(2-ethoxyethoxy) | 134 |
| 4 | 6.186 | cyanocyclohexene | 107 |
| 5 | 6.410 | 2-pyrrolidone, 1-methyl | 99 |
| 6 | 6.771 | acetophenone | 120 |
| 7 | 8.838 | 2-decanal | 154 |
| 8 | 9.373 | phenol,2-(1,1-dimethyl)-methyl | 164 |
| 9 | 9.796 | 1,1-dodecanediol, diacetate | 286 |
| 10 | 10.257 | cyclooctane, 1,2-dimethyl | 140 |
| 11 | 10.617 | butylated hydroxytoluene | 220 |
| 12 | 11.003 | hexamethylene diacrylate | 226 |
| 13 | 11.700 | cyclododecane | 168 |
| 14 | 12.621 | 2-pentadecanone, 6,10,14-trimethyl | 268 |
| 15 | 12.821 | cyclotetradecane | 196 |

TABLE 7H

Film #1

| No. | Time (sec) | Molecule | MW |
|---|---|---|---|
| 1 | 5.325 | camphene | 136 |
| 2 | 5.462 | benzaldehyde | 106 |
| 3 | 6.197 | cyanocyclohexane | 107 |
| 4 | 6.769 | acetophenone | 120 |
| 5 | 7.665 | bicyclo-[2,2,1]-heptan-2-one-1,7,7-trimethyl | 152 |
| 6 | 7.790 | isoborneol | 154 |
| 7 | 8.064 | dodecane | 170 |
| 8 | 8.512 | isobornyl formate | 182 |
| 9 | 8.947 | isobornyl acetate | 196 |
| 10 | 9.084 | benzaldehyde, 2,4,5-trimethyl | 148 |
| 11 | 9.744 | propenoic acid, 1,7,7-trimethylbicyclo[2,2,1]hept-2-yl ester, exo | 208 |
| 12 | 10.566 | phenol, 2,4-bis-[1,1-dimethylethyl] | 206 |
| 13 | 10.628 | butylated hydroxytoluene | 220 |
| 14 | 11.101 | hexadecane | 226 |
| 15 | 12.333 | octadecane | 254 |
| 16 | 13.167 | 7,9-ditertbutyl-1-oxapiro(4,5)deca-6,9-diene-2,8-dione | 276 |
| 17 | 13.453 | eicosane | 282 |
| 18 | 14.486 | docosane | 310 |

TABLE 7I

Film #2

| No. | Time (sec) | Molecule | MW |
|---|---|---|---|
| 1 | 5.451 | benzaldehyde | 106 |
| 2 | 6.783 | acetophenone | 120 |
| 3 | 7.866 | benzoic acid | 122 |
| 4 | 9.073 | benzaldehyde, 2,4,6-trimethyl | 148 |
| 5 | 9.932 | benzoic acid, 2,4,6-trimethyl | 164 |
| 6 | 10.567 | phenol, 2,4-bis[1,1-dimethylethyl] | 206 |
| 7 | 10.629 | bytylated hydroxytoluene | 220 |
| 8 | 11.102 | bacchtricuneatin c | 342 |
| 9 | 12.334 | octadecane | 254 |
| 10 | 13.442 | eicosane | 282 |
| 11 | 14.457 | dodecane, 2-methyl, 6-propyl | 226 |
| 12 | 15.620 | heptadecane | 240 |

Comparative Example

For comparative purposes, a seaming agent was made from 30 grams of GENOMER 4256, 10 grams of isobornyl acrylate (IBOA), 40 grams of MIRAMER M3130, and 2.5 grams of TPO photoinitiator. GENOMER 4256 is an aliphatic urethane methacrylate. 20 milligrams of the seaming agent was applied to three different high shrink wrap labels having a height of 170 mm and a seam width of 6 mm: (a) Polyphane FIT ST; (b) Polyphane FIT STS; and (c) Klockner Pentalabel® Rigid PETG LF-LG01F19 M65 (previously described).

The labels were each applied to a curved container according to FIG. 3. The seaming agent was then cured with a 395 nm LED, power of 3000 W total power illumination in a reflective wall chamber. The label was cured for 1.5 seconds.

The seam on the Polyphane FIT STS film was poor. The edges remained free of seaming agent. A lot of bubbles and voids were present. The same results were present on the Polyphane FIT ST film and the PETG film. The major reason was the high viscosity of the seaming agent. The second reason was mismatch of the monomer and the film from a solubility standpoint. Even with Polyphane FIT STS, which is partially compatible with IBOA, the high content of high molecular weight oligomer GENOMER 4256 slowed the diffusion of IBOA into the film so much that welding did not occur.

The visual quality of the seam after 7 seconds in steam at 95°-100° C. was also examined. For the Polyphane FIT STS film, the Polyphane FIT ST film, and the PETG film, the seam opened and adhesion was completely lost (interfacial failure, regardless the fact seaming agent polymerized well). The reason was the inability to weld the film, either because of incompatibility (PS and PETG) or due to insufficient time to diffuse (because dissolved in high molecular weight oligomer).

The present disclosure has been described with reference to exemplary embodiments. Modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A liquid radiation-curable seaming agent for bonding an associated high shrink label film containing polystyrene (PS), polyethylene terephthalate glycol-modified (PETG), or polyvinyl chloride (PVC) to itself, the seaming agent having an immediate welding strength of greater than 2 grams within less than 0.5 seconds on the associated high shrink label film, and having at least one component with a Hildebrand solubility parameter that is within 2.2 $MPa^{1/2}$ or within 4.4 $calories^{1/2} \cdot cm^{-3/2}$ Hildebrand solubility parameter of an external layer of the associated high shrink label film, and having the ability to form a seam that has a seam quality of at least 2 after heat shrinkage of the film of greater than 25%, and having a viscosity of 1 centipoise (cP) to 100 cP when measured at any temperature between ambient temperature and 60° C.; and comprising at least one monomer which is tetrahydrofurfuryl acrylate (THFA) or caprolactone-modified THFA; cyclic trimethylol propane formal acrylate (CTFA); isobornyl acrylate; isobornyl methacrylate; alkoxylated phenyl acrylate; hexanediol diacrylate; butanediol diacrylate; butanediol dimethacrylates; alkoxylated aliphatic or cycloaliphatic diol diacrylate or dimethacrylate; tricyclodecanedimethanol diacrylate (TCDDA); ethoxylated cyclohexane dimethanol diacrylate (EO-CHMDA); hydroxy pivalic acid neopentyl glycol diacrylate or caprolactone-modified hydroxy pivalic acid neopentyl glycol diacrylate, hydroxypyvalyl pivalate diacrylate (HPPDA), or caprolactone acrylate.

2. The seaming agent of claim 1, wherein the seaming agent further comprises an oligomer or polymer selected from the group consisting of urethane acrylate, urethane methacrylate, acrylic or methacrylic esters of glycols or diols or polyhydric alcohols, acrylic or methacrylic esters of alkoxylated diols or polyols or polyhydric alcohols, oligomers of acrylic esters, polyvinylbutyral, hydrocarbon resins, polyterpenes, rosin derivatives, polyesters, epoxy resins, epoxy acrylates, epoxy methacrylates, phenoxy resins, a resin containing a diglycidyl ether of bisphenol-A, polystyrene, styrene block copolymers or terpolymers, terpene phenols, polyester acrylates or methacrylates, polyurethane, polyesteramide, oligomers of acrylic or methacrylic acids or esters or amides; homopolymers, copolymers, terpolymers, or block copolymers of an acrylic acid ester or methacrylic ester; ethoxylated diglycidyl ether of bisphenol A diacrylate; polyacrylates of hyperbranched alcohols; blends of urethane acrylate and monomer; and blends of inert resin and monomer.

3. The seaming agent of claim 1, wherein the seaming agent further comprises a solvent selected from the group consisting of ethers, cyclic ethers, esters, amides, glycol ethers, ketones, toluene, halogenated alcohols, and halogenated hydrocarbons.

4. The seaming agent of claim 1, wherein the seaming agent comprises:
   from about 25 wt % to about 98 wt % of the at least one monomer;
   up to 75 wt % of an oligomer or polymer;
   0 to about 50 wt % of an organic solvent; and
   from about 0.5 wt % to about 15 wt % of a photoinitiator.

5. The seaming agent of claim 1, wherein the seaming agent comprises:
   from about 15 wt % to about 90 wt % of the at least one monomer;
   up to 75 wt % of an oligomer or polymer;
   0 to about 20 wt % of an organic solvent;
   from about 0.5 wt % to about 15 wt % of a photoinitiator; and
   0 to about 20 wt % of a tackifying agent.

6. The seaming agent of claim 1, wherein the seaming agent comprises:
   from about 10 wt % to about 90 wt % of the at least one monomer;
   up to 80 wt % of an oligomer or polymer;
   0 to about 10 wt % of an organic solvent;
   from about 0.5 wt % to about 15 wt % of a photoinitiator; and
   0 to about 20 wt % of a tackifying agent.

7. The seaming agent of claim 1, wherein the seaming agent has a VOC content of less than 25 wt %.

8. The seaming agent of claim 1, wherein the seaming agent has the ability to cross-link or polymerize when exposed to radiation having at least one peak wavelength of about 300 nm to about 500 nm.

9. The seaming agent of claim 1, wherein the seaming agent has a flashpoint of about 65° C. or greater.

10. A liquid radiation-curable seaming agent for bonding an associated high shrink label film containing a polyolefin or a cyclic olefin polymer (COP) or a cyclic olefin copolymer (COC) to itself, the seaming agent having an immediate welding strength of greater than 2 grams within less than 0.5 seconds on the associated high shrink label film, and having at least one component with a Hildebrand solubility parameter that is within 2.2 $MPa^{1/2}$ or within 4.4 $calories^{1/2} \cdot cm^{-3/2}$ of a Hildebrand solubility parameter of an external layer of the associated high shrink label film, and having the ability to form a seam that has a seam quality of at least 2 after heat shrinkage of the film of greater than 25%, and having a viscosity of 1 centipoise (cP) to 100 cP when measured at any temperature between ambient temperature and 60° C.; and
   comprising at least one monomer which is isobornyl acrylate, isobornyl methacrylate, cyclohexyl acrylate, ethyl hexyl acrylate, ethyl hexyl methacrylate, tert-butyl cyclohexyl acrylate, trimethyl cyclohexyl acrylate, alkyl acrylates, alkyl methacrylates, tricyclodecanedimethanol acrylate, styrene, vinyltoluene, benzyl acrylate, lauryl acrylate, isodecyl acrylate, phenoxy benzyl acrylate, ethoxylated aryl acrylate, alkylated phenyl acrylate, or phenyl acrylate.

11. The seaming agent of claim 10, wherein the seaming agent further comprises an oligomer or polymer having a molecular weight of more than 300 Da selected from the group consisting of urethane acrylate, urethane methacrylate, acrylic or methacrylic esters of glycols or diols or polyhydric alcohols, acrylic or methacrylic esters of alkoxylated diols or polyols or polyhydric alcohols, oligomers of acrylic or methacrylic esters, polyvinylbutyral, hydrocarbon resins, polyterpenes, rosin derivatives, polyesters, polystyrene, styrene block copolymers, epoxy acrylates, epoxy methacrylates, phenoxy resins, acrylated or methacrylated dendritic alcohols, ethoxylated diglycidyl ether of bisphenol A diacrylate; polyacrylates of hyperbranched alcohols; blends of urethane acrylate and monomer; and (T) blends of inert resin and monomer.

12. The seaming agent of claim 10, wherein the seaming agent further comprises a solvent selected from the group consisting of a linear or cyclic or aromatic hydrocarbon having a maximum of 20 carbon atoms, a terpene alcohol, an alkyl ester, an alkyl amide, turpentines, isoparaffins, and paraffins.

13. The seaming agent of claim 10, wherein the seaming agent comprises:
   from about 25 wt % to about 98 wt % of the at least one monomer;
   up to 50 wt % of an oligomer or polymer;
   from 0 to about 50 wt % of an organic solvent; and
   from about 0.5 wt % to about 15 wt % of a photoinitiator.

14. The seaming agent of claim 10, wherein the seaming agent comprises:
   from about 20 wt % to about 98 wt % of the at least one monomer;
   up to 45 wt % of an oligomer or polymer;
   from 0 wt % to about 30 wt % of an organic solvent;
   from about 1 wt % to about 15 wt % of a photoinitiator; and
   from 0 wt % to about 20 wt % of a tackifying agent.

15. The seaming agent of claim 10, wherein the seaming agent comprises
   from about 20 wt % to about 98 wt % of the at least one monomer;
   up to 45 wt % of an oligomer or polymer;
   from 0 wt % to about 25 wt % of an organic solvent; and
   from 1 wt % to about 15 wt % of a photoinitiator.

16. The seaming agent of claim 10, wherein the seaming agent has a VOC content of less than 25 wt %.

17. The seaming agent of claim 10, wherein the seaming agent has the ability to cross-link or polymerize when exposed to radiation having at least one peak wavelength of about 300 nm to about 500 nm.

18. The seaming agent of claim 10, wherein the seaming agent has a flashpoint of about 65° C. or greater.

19. A liquid radiation-curable seaming agent for bonding an associated high shrink label film containing polystyrene (PS), polyethylene terephthalate glycol-modified (PETG), or polyvinyl chloride (PVC) to itself, the seaming agent having an immediate welding strength of greater than 2 grams within less than 0.5 seconds on the associated high shrink label film, and having at least one component with a Hildebrand solubility parameter that is within 2.2 $MPa^{112}$ or within 4.4 $calories^{1/2} \cdot cm^{-3/2}$ of a Hildebrand solubility parameter of an external layer of the associated high shrink label film, and having the ability to form a seam that has a seam quality of at least 2 after heat shrinkage of the film of greater than 25%, and having a viscosity of 1 centipoise (cP) to 100 cP when measured at any temperature between ambient temperature and 60° C.;
   wherein the seaming agent comprises:
      from about 10 wt % to about 98 wt % of at least one monomer;
      up to 80 wt % of at least one oligomer or polymer;
      0 to about 50 wt % of an organic solvent;
      from about 0.5 wt % to about 15 wt % of a photoinitiator; and from about 0.2 wt % to about 2 wt % of an acrylated amine.

20. The seaming agent of claim 19, wherein the seaming agent comprises:
   from about 40 wt % to about 98 wt % of at least one monomer having a molecular weight of less than 300 Da;
   from about 14 wt % to about 59 wt % of at least one oligomer or polymer having a molecular weight of greater than 300 Da;
   from about 0.5 wt % to about 2 wt % of a photoinitiator; and
   from about 0.2 wt % to about 2 wt % of an acrylated amine.

21. The seaming agent of claim 20, wherein:
   the at least one monomer having a molecular weight of less than 300 Da comprises tetrahydrofurfuryl acrylate (THFA); hexanediol diacrylate; or cyclic trimethylolpropane formal acrylate; and
   the at least one oligomer or polymer having a molecular weight of greater than 300 Da comprises ethoxylated trimethylolpropane triacrylate, dipentaerythritol hexaacrylate; polyvinyl butyral; oligomers of butyl acrylate; aliphatic polyesters; urethane acrylate; acrylated or methacrylated hyperbranched alcohols; ethoxylated diglycidyl ether of bisphenol A diacrylate; polyacrylates of hyperbranched alcohols; blends of urethane acrylate and monomer; blends of inert resin and monomer; hydroxypyvalylpivalate diacrylate (HPPDA); and dipentaerythritol pentaacrylate.

22. The seaming agent of claim 19, wherein the seaming agent comprises:
   from about 40 wt % to about 50 wt % of cyclic trimethylolpropane formal acrylate;
   from about 25 wt % to about 35 wt % of either hexanediol diacrylate or hydroxypyvalylpivalate diacrylate;
   from about 6 wt % to about 12 wt % of dipentaerythritol pentaacrylate and/or dipentaerythritol hexaacrylate;
   from about 8 wt % to about 12 wt % of a blend of inert resin and monomer;
   from about 0.5 wt % to about 2 wt % of a photoinitiator; and
   from about 0.2 wt % to about 2 wt % of an acrylated amine.

\* \* \* \* \*